United States Patent
Bixon et al.

(10) Patent No.: US 12,285,009 B2
(45) Date of Patent: Apr. 29, 2025

(54) WORKSTATION AND APPARATUS TO FACILITATE TRANSFER OF BIOLOGICAL SPECIMENS STORED AT CRYOGENIC CONDITIONS

(71) Applicant: TMRW Life Sciences, Inc., New York, NY (US)

(72) Inventors: Brian Joseph Bixon, Jersey City, NJ (US); Cynthia Hudson, New York, NY (US); Alan Leroy Murray, New York, NY (US)

(73) Assignee: TMRW Life Sciences, Inc., New York, NY (US)

( * ) Notice: Subject to any disclaimer, the term of this patent is extended or adjusted under 35 U.S.C. 154(b) by 889 days.

(21) Appl. No.: 17/483,603

(22) Filed: Sep. 23, 2021

(65) Prior Publication Data
US 2022/0087254 A1    Mar. 24, 2022

Related U.S. Application Data

(60) Provisional application No. 63/082,789, filed on Sep. 24, 2020.

(51) Int. Cl.
*A01N 1/02* (2006.01)
*G01N 1/42* (2006.01)
*G01N 35/00* (2006.01)

(52) U.S. Cl.
CPC ............. *A01N 1/0273* (2013.01); *G01N 1/42* (2013.01); *G01N 35/00722* (2013.01); *G01N 2035/00445* (2013.01)

(58) Field of Classification Search
CPC .. A01N 1/0273; A01N 1/0236; A01N 1/0268; A01N 1/0257; G01N 1/42; G01N 35/00722; G01N 2035/00445
See application file for complete search history.

(56) References Cited

U.S. PATENT DOCUMENTS

| 4,573,581 A | 3/1986 | Galloway et al. |
| D300,583 S | 4/1989 | Smith |
| (Continued) | | |

FOREIGN PATENT DOCUMENTS

| AU | 2011357590 B2 | 9/2015 |
| AU | 2017287017 A1 | 1/2019 |
| (Continued) | | |

OTHER PUBLICATIONS

"Secure Your Future with Cryofuture", Https://cryofuture.com, 2004, 13 pages.

(Continued)

*Primary Examiner* — Michael L Hobbs
(74) *Attorney, Agent, or Firm* — Cozen O'Connor

(57) ABSTRACT

A system and method facilitates transfers of specimen containers (e.g., vials with caps) between storage cassettes and carrier cassettes. The storage cassettes are designed to be stored in cryogenic refrigerators while the carrier cassettes are designed to be temporarily stored in a portable carrier. A workstation includes a well and removable buckets positioned in the well. The buckets are sized to hold the storage cassettes and carrier cassettes. One or more arrays of antennas underlie the well to allow interrogation of wireless transponders carried by the specimen containers. Improved storage cassettes and carrier cassettes are also described.

37 Claims, 33 Drawing Sheets

(56) References Cited

U.S. PATENT DOCUMENTS

| | | | |
|---|---|---|---|
| D310,264 S | 8/1990 | Leoncavallo et al. |
| 5,024,830 A | 6/1991 | Linner |
| 5,176,202 A | 1/1993 | Richard |
| 5,355,684 A | 10/1994 | Guice |
| 5,545,562 A | 8/1996 | Cassou et al. |
| D382,809 S | 8/1997 | Aldrich et al. |
| D382,810 S | 8/1997 | Aldrich et al. |
| 5,711,446 A | 1/1998 | Jeffs et al. |
| 5,741,462 A | 4/1998 | Nova et al. |
| 5,751,629 A | 5/1998 | Nova et al. |
| 5,874,214 A | 2/1999 | Nova et al. |
| D408,145 S | 4/1999 | Au |
| 5,921,102 A | 7/1999 | Vago |
| 5,925,562 A | 7/1999 | Nova et al. |
| 5,964,095 A | 10/1999 | Coelho et al. |
| 6,066,300 A | 5/2000 | Carey et al. |
| 6,100,026 A | 8/2000 | Nova et al. |
| 6,141,975 A | 11/2000 | Tatsumi |
| 6,156,566 A | 12/2000 | Bryant |
| 6,302,327 B1 | 10/2001 | Coelho et al. |
| 6,329,139 B1 | 12/2001 | Nova et al. |
| 6,564,120 B1 | 5/2003 | Richard et al. |
| D484,797 S | 1/2004 | Kipperman et al. |
| 6,701,743 B1 | 3/2004 | Durst et al. |
| D496,398 S | 9/2004 | Greenberg |
| 6,888,063 B1 | 5/2005 | Lien et al. |
| D506,550 S | 6/2005 | Greenberg |
| 7,070,053 B1 | 7/2006 | Abrams et al. |
| 7,091,864 B2 | 8/2006 | Veitch et al. |
| D535,478 S | 1/2007 | Uffner et al. |
| 7,278,328 B2 | 10/2007 | Massaro |
| 7,316,896 B2 | 1/2008 | Kuwayama et al. |
| 7,350,703 B2 | 4/2008 | Ambartsoumian |
| 7,411,508 B2 | 8/2008 | Harazin et al. |
| D576,488 S | 9/2008 | Miota et al. |
| D592,966 S | 5/2009 | Nissen |
| 7,661,591 B2 | 2/2010 | Dearing et al. |
| 7,694,886 B2 | 4/2010 | Tan et al. |
| 7,861,540 B2 | 1/2011 | Cloutier et al. |
| 7,870,748 B2 | 1/2011 | Byrne |
| D642,697 S | 8/2011 | Gaefvert |
| 8,097,199 B2 | 1/2012 | Abbott et al. |
| 8,098,162 B2 | 1/2012 | Abbott et al. |
| 8,115,599 B2 | 2/2012 | Harazin et al. |
| 8,168,138 B2 | 5/2012 | Che et al. |
| 8,378,827 B2 | 2/2013 | Davidowitz et al. |
| D682,045 S | 5/2013 | Myoung |
| 8,502,645 B2 | 8/2013 | Thomas et al. |
| 8,710,958 B2 | 4/2014 | Yang et al. |
| 8,852,536 B2 | 10/2014 | Davidowitz et al. |
| 8,872,627 B2 | 10/2014 | Davidowitz |
| 8,884,743 B2 | 11/2014 | Chaffey et al. |
| 8,919,532 B2 | 12/2014 | Buergermeister et al. |
| 8,937,550 B2 | 1/2015 | Phaneuf et al. |
| 9,028,754 B2 | 5/2015 | Winter et al. |
| 9,033,251 B2 | 5/2015 | Weisshaupt et al. |
| D733,314 S | 6/2015 | Lui |
| 9,140,487 B2 | 9/2015 | Chaffey et al. |
| 9,163,869 B2 | 10/2015 | Warhurst et al. |
| 9,211,540 B2 | 12/2015 | Lansdowne |
| 9,280,738 B2 | 3/2016 | Dor et al. |
| 9,289,770 B2 | 3/2016 | Lavi |
| 9,297,499 B2 | 3/2016 | Jimenez-Rios et al. |
| 9,418,265 B2 * | 8/2016 | Morris ............... G06K 7/10336 |
| 9,431,692 B2 | 8/2016 | Davidowitz et al. |
| D768,868 S | 10/2016 | Inoue |
| D771,271 S | 11/2016 | Zingre |
| 9,501,734 B2 | 11/2016 | Morris |
| 9,516,876 B2 | 12/2016 | Inoue |
| D777,941 S | 1/2017 | Piramoon |
| 9,538,746 B2 | 1/2017 | Inoue |
| 9,538,747 B2 | 1/2017 | Inoue |
| 9,547,782 B2 | 1/2017 | Lansdowne |
| 9,551,649 B2 | 1/2017 | Houghton et al. |
| 9,589,225 B2 | 3/2017 | Morris |
| 9,619,678 B2 | 4/2017 | Morris et al. |
| 9,697,457 B2 | 7/2017 | Morris |
| 9,723,832 B2 | 8/2017 | Camenisch et al. |
| 9,736,890 B2 | 8/2017 | Chaffey et al. |
| 9,764,325 B2 | 9/2017 | Davidowitz |
| 9,796,574 B2 | 10/2017 | Frey et al. |
| 9,928,457 B2 | 3/2018 | Mcdowell |
| D816,165 S | 4/2018 | Haug |
| D835,472 S | 12/2018 | Seiders et al. |
| 10,156,386 B2 | 12/2018 | Bartlett et al. |
| D840,684 S | 2/2019 | Luburic |
| 10,207,270 B2 | 2/2019 | Lansdowne |
| 10,241,015 B2 | 3/2019 | Hollabaugh et al. |
| D845,139 S | 4/2019 | Wilson et al. |
| 10,328,431 B2 | 6/2019 | Davidowitz |
| 10,401,082 B2 | 9/2019 | Coradetti et al. |
| 10,493,457 B2 | 12/2019 | Croquette et al. |
| 10,531,657 B2 | 1/2020 | Farrington et al. |
| D874,875 S | 2/2020 | Huang |
| 10,561,141 B2 | 2/2020 | Suzuki et al. |
| D881,568 S | 4/2020 | Luburic |
| 10,677,810 B2 | 6/2020 | Grimwood et al. |
| D890,948 S | 7/2020 | Figueredo et al. |
| 10,748,050 B2 | 8/2020 | Morris et al. |
| D910,836 S | 2/2021 | Sandberg et al. |
| 10,973,226 B2 | 4/2021 | Blair et al. |
| 10,989,636 B2 | 4/2021 | Gutelius et al. |
| D928,343 S | 8/2021 | Bonnoitt et al. |
| D930,186 S | 9/2021 | Kim |
| D931,128 S | 9/2021 | Li |
| D932,906 S | 10/2021 | Schulz |
| 11,148,143 B2 | 10/2021 | Davidowitz et al. |
| 11,175,298 B2 | 11/2021 | Neeper et al. |
| D938,053 S | 12/2021 | Xiao |
| D945,271 S | 3/2022 | Halgren et al. |
| D963,194 S | 9/2022 | Bixon et al. |
| D981,801 S | 3/2023 | Wu |
| 2002/0190845 A1 | 12/2002 | Moore |
| 2002/0196146 A1 | 12/2002 | Moore |
| 2003/0017082 A1 | 1/2003 | Van et al. |
| 2003/0174046 A1 | 9/2003 | Abrams |
| 2004/0100415 A1 | 5/2004 | Veitch et al. |
| 2005/0058483 A1 | 3/2005 | Chapman et al. |
| 2005/0237195 A1 | 10/2005 | Urban |
| 2005/0247782 A1 | 11/2005 | Ambartsoumian |
| 2006/0051239 A1 | 3/2006 | Massaro |
| 2006/0283945 A1 | 12/2006 | Excoffier et al. |
| 2007/0068208 A1 | 3/2007 | Norman et al. |
| 2007/0172396 A1 | 7/2007 | Neeper et al. |
| 2008/0012687 A1 | 1/2008 | Rubinstein |
| 2008/0024301 A1 | 1/2008 | Fritchie et al. |
| 2008/0121700 A1 | 5/2008 | Dearing et al. |
| 2008/0239478 A1 | 10/2008 | Tafas et al. |
| 2009/0015430 A1 | 1/2009 | Harazin et al. |
| 2009/0026907 A1 | 1/2009 | Davidowitz et al. |
| 2009/0029341 A1 | 1/2009 | Fuhr et al. |
| 2009/0188272 A1 | 7/2009 | Cloutier et al. |
| 2009/0318751 A1 | 12/2009 | Lansdowne |
| 2009/0322486 A1 | 12/2009 | Gerstel |
| 2010/0028214 A1 | 2/2010 | Howard et al. |
| 2010/0123551 A1 | 5/2010 | Fritchie |
| 2010/0141384 A1 | 6/2010 | Chen et al. |
| 2010/0281886 A1 | 11/2010 | Shaham et al. |
| 2010/0302040 A1 | 12/2010 | Davidowitz et al. |
| 2010/0318217 A1 | 12/2010 | Ferrer et al. |
| 2011/0088424 A1 | 4/2011 | Cloutier et al. |
| 2011/0088517 A1 | 4/2011 | Tsujimura et al. |
| 2011/0137812 A1 | 6/2011 | Sherga |
| 2011/0143452 A1 | 6/2011 | Che et al. |
| 2011/0181875 A1 | 7/2011 | Nakahana et al. |
| 2011/0199187 A1 | 8/2011 | Davidowitz |
| 2011/0199188 A1 | 8/2011 | Dickson |
| 2011/0308271 A1 | 12/2011 | Schryver |
| 2011/0312102 A1 | 12/2011 | Jo |
| 2012/0060514 A1 | 3/2012 | Warhurst et al. |
| 2012/0060520 A1 | 3/2012 | Collins et al. |
| 2012/0060539 A1 | 3/2012 | Hunt et al. |
| 2012/0060541 A1 | 3/2012 | Hunt et al. |
| 2012/0064603 A1 | 3/2012 | Childs et al. |

(56) References Cited

U.S. PATENT DOCUMENTS

| | | |
|---|---|---|
| 2012/0167786 A1 | 7/2012 | Laugharn, Jr. |
| 2012/0187197 A1 | 7/2012 | Masin |
| 2012/0256806 A1 | 10/2012 | Davidowitz et al. |
| 2012/0272500 A1 | 11/2012 | Reuteler |
| 2012/0293338 A1 | 11/2012 | Chaffey et al. |
| 2013/0011226 A1 | 1/2013 | Camenisch et al. |
| 2013/0048711 A1 | 2/2013 | Burns et al. |
| 2013/0076215 A1 | 3/2013 | Davidowitz et al. |
| 2013/0106579 A1 | 5/2013 | Aubert et al. |
| 2013/0119562 A1 | 5/2013 | Shimizu et al. |
| 2013/0151004 A1 | 6/2013 | Winter et al. |
| 2013/0152710 A1 | 6/2013 | Laugharn et al. |
| 2013/0217107 A1 | 8/2013 | Pederson et al. |
| 2013/0342320 A1 | 12/2013 | Hinman et al. |
| 2014/0008042 A1 | 1/2014 | Schryver et al. |
| 2014/0008355 A1 | 1/2014 | Chaffey et al. |
| 2014/0157798 A1 | 6/2014 | Jimenez-Rios et al. |
| 2014/0171829 A1 | 6/2014 | Holmes et al. |
| 2014/0230472 A1 | 8/2014 | Coradetti et al. |
| 2014/0352456 A1 | 12/2014 | Davidowitz |
| 2015/0045782 A1 | 2/2015 | Ottanelli |
| 2015/0084771 A1 | 3/2015 | Nikitin et al. |
| 2015/0122887 A1 | 5/2015 | Morris et al. |
| 2015/0125574 A1 | 5/2015 | Arent et al. |
| 2015/0153369 A1 | 6/2015 | Giovanoli |
| 2015/0204598 A1 | 7/2015 | Affleck et al. |
| 2015/0205986 A1 | 7/2015 | Morris et al. |
| 2015/0273468 A1 | 10/2015 | Croquette et al. |
| 2015/0295328 A1 | 10/2015 | Fireaizen |
| 2015/0356398 A1 | 12/2015 | Morris |
| 2015/0379390 A1 | 12/2015 | Morris |
| 2016/0026911 A1 | 1/2016 | Morris et al. |
| 2016/0063287 A1 | 3/2016 | Birrer et al. |
| 2016/0085913 A1 | 3/2016 | Evans et al. |
| 2016/0086003 A1 | 3/2016 | Nikitin |
| 2016/0095309 A1 | 4/2016 | Reuteler |
| 2016/0101908 A1 | 4/2016 | Minnette et al. |
| 2016/0143270 A1 | 5/2016 | Schryver |
| 2016/0175837 A1 | 6/2016 | Chaffey et al. |
| 2016/0236387 A1 | 8/2016 | Carroll et al. |
| 2016/0288999 A1 | 10/2016 | Caveney et al. |
| 2016/0289000 A1 | 10/2016 | Caveney et al. |
| 2016/0341464 A1 | 11/2016 | Bagwell |
| 2016/0349172 A1 | 12/2016 | Houghton et al. |
| 2016/0353730 A1 | 12/2016 | Harston et al. |
| 2016/0358062 A1 | 12/2016 | Morris |
| 2017/0113909 A1 | 4/2017 | Frey et al. |
| 2017/0122846 A1 | 5/2017 | Holmes et al. |
| 2017/0166865 A1 | 6/2017 | Peng |
| 2017/0184479 A1 | 6/2017 | Schryver et al. |
| 2017/0190056 A1 | 7/2017 | Lapham et al. |
| 2017/0320054 A1* | 11/2017 | Crum ................. B01L 9/06 |
| 2018/0020659 A1 | 1/2018 | Camenisch et al. |
| 2018/0043364 A1 | 2/2018 | Davidowitz |
| 2018/0055042 A1 | 3/2018 | Sarmentero Ortiz |
| 2018/0086533 A1 | 3/2018 | Kjelland |
| 2018/0100868 A1 | 4/2018 | Grimwood et al. |
| 2018/0128210 A1 | 5/2018 | Garner |
| 2018/0135806 A1 | 5/2018 | Qu et al. |
| 2018/0137315 A1 | 5/2018 | Johns et al. |
| 2018/0154359 A1 | 6/2018 | Ueyama |
| 2018/0202908 A1 | 7/2018 | Croquette et al. |
| 2018/0313498 A1 | 11/2018 | Antola et al. |
| 2018/0368394 A1 | 12/2018 | Nelland et al. |
| 2019/0000073 A1 | 1/2019 | Pedersen et al. |
| 2019/0025280 A1 | 1/2019 | Kaditz et al. |
| 2019/0060892 A1 | 2/2019 | Davidowitz et al. |
| 2019/0092555 A1 | 3/2019 | Ma et al. |
| 2019/0162639 A1 | 5/2019 | Gutelius et al. |
| 2019/0193078 A1 | 6/2019 | Fiondella et al. |
| 2019/0250181 A1 | 8/2019 | Seeber |
| 2019/0276233 A1 | 9/2019 | Caveney et al. |
| 2019/0293344 A1 | 9/2019 | Sun et al. |
| 2019/0297877 A1 | 10/2019 | Komatsu et al. |
| 2020/0093122 A1 | 3/2020 | Lin et al. |
| 2020/0097788 A1 | 3/2020 | Pedersen et al. |
| 2020/0107541 A1* | 4/2020 | Blair ................. B01L 3/5082 |
| 2020/0143930 A1 | 5/2020 | Catchings et al. |
| 2020/0229430 A1 | 7/2020 | Blair et al. |
| 2020/0229431 A1 | 7/2020 | Blair et al. |
| 2020/0248638 A1 | 8/2020 | Engfehr et al. |
| 2020/0281191 A1 | 9/2020 | Ally et al. |
| 2020/0319625 A1 | 10/2020 | Morris et al. |
| 2021/0039937 A1 | 2/2021 | Tansey et al. |
| 2021/0121876 A1 | 4/2021 | Blair et al. |
| 2021/0135061 A1 | 5/2021 | Navabi |
| 2021/0244018 A1 | 8/2021 | Sandy et al. |
| 2022/0087253 A1 | 3/2022 | Gupta et al. |
| 2022/0136656 A1 | 5/2022 | Clarke et al. |
| 2022/0192182 A1 | 6/2022 | Bixon et al. |
| 2022/0221476 A1 | 7/2022 | Craven et al. |
| 2023/0329230 A1 | 10/2023 | Li et al. |

FOREIGN PATENT DOCUMENTS

| | | |
|---|---|---|
| CA | 2972315 A1 | 8/2016 |
| CN | 105857932 A | 8/2016 |
| CN | 105890965 A | 8/2016 |
| CN | 106102460 A | 11/2016 |
| CN | 205815766 U | 12/2016 |
| CN | 106370879 A | 2/2017 |
| CN | 106871546 A | 6/2017 |
| CN | 107624751 A | 1/2018 |
| CN | 108112576 A | 6/2018 |
| CN | 207595583 U | 7/2018 |
| CN | 207663251 U | 7/2018 |
| CN | 207675193 U | 7/2018 |
| CN | 108541702 A | 9/2018 |
| CN | 109258627 A | 1/2019 |
| CN | 208425434 U | 1/2019 |
| CN | 109922887 A | 6/2019 |
| CN | 110476952 A | 11/2019 |
| CN | 110517737 A | 11/2019 |
| CN | 110550327 A | 12/2019 |
| CN | 110583618 A | 12/2019 |
| CN | 110589332 A | 12/2019 |
| CN | 110645752 A | 1/2020 |
| CN | 110667986 A | 1/2020 |
| CN | 210614415 U | 5/2020 |
| CN | 210709605 U | 6/2020 |
| CN | 210709624 U | 6/2020 |
| CN | 210711515 U | 6/2020 |
| CN | 111771211 A | 10/2020 |
| CN | 112090469 A | 12/2020 |
| CN | 112189657 A | 1/2021 |
| CN | 112325976 A | 2/2021 |
| CN | 112325978 A | 2/2021 |
| CN | 112340334 A | 2/2021 |
| CN | 112841172 A | 5/2021 |
| CN | 213274464 U | 5/2021 |
| CN | 112894791 A | 6/2021 |
| CN | 213863260 U | 8/2021 |
| CN | 213863569 U | 8/2021 |
| CN | 213872207 U | 8/2021 |
| CN | 213874569 U | 8/2021 |
| CN | 213995979 U | 8/2021 |
| CN | 214006820 U | 8/2021 |
| CN | 214216855 U | 9/2021 |
| CN | 214358041 U | 10/2021 |
| CN | 214398091 U | 10/2021 |
| CN | 214758843 U | 11/2021 |
| CN | 115352743 A | 11/2022 |
| CN | 219596677 U | 8/2023 |
| DE | 102011012887 A1 | 8/2012 |
| DE | 102016008869 A1 | 1/2018 |
| EP | 0411224 A2 | 2/1991 |
| EP | 0706825 A1 | 4/1996 |
| EP | 0811140 A1 | 12/1997 |
| EP | 1002211 A2 | 5/2000 |
| EP | 1366998 A3 | 3/2004 |
| EP | 1366998 B1 | 1/2006 |
| EP | 1916492 A1 | 4/2008 |
| EP | 2301857 A1 | 3/2011 |
| EP | 2315163 A1 | 4/2011 |

(56) References Cited

FOREIGN PATENT DOCUMENTS

| | | |
|---|---|---|
| EP | 2358196 A1 | 8/2011 |
| EP | 2124171 B1 | 8/2012 |
| EP | 2666694 B1 | 7/2014 |
| EP | 1888239 B1 | 10/2014 |
| EP | 1981692 B1 | 6/2015 |
| EP | 2498968 B1 | 9/2015 |
| EP | 2335182 B1 | 10/2015 |
| EP | 2297736 B1 | 2/2016 |
| EP | 2292332 B1 | 7/2016 |
| EP | 2765183 B1 | 7/2016 |
| EP | 2614320 B1 | 10/2016 |
| EP | 2354729 B1 | 12/2016 |
| EP | 2873497 B1 | 5/2017 |
| EP | 2948247 B1 | 11/2017 |
| EP | 2743865 B1 | 6/2019 |
| EP | 2866938 B1 | 6/2019 |
| EP | 2232175 B1 | 8/2019 |
| EP | 3539899 A1 | 9/2019 |
| EP | 2965266 B1 | 10/2019 |
| EP | 2492663 B1 | 12/2019 |
| EP | 3655892 A1 | 5/2020 |
| EP | 3228191 B1 | 8/2020 |
| EP | 4252009 A4 | 4/2024 |
| ES | 2467465 A2 | 6/2014 |
| ES | 2595984 T3 | 1/2017 |
| JP | 2000137031 A | 5/2000 |
| JP | 2001142861 A | 5/2001 |
| JP | 2004028595 A | 1/2004 |
| JP | 2005009863 A | 1/2005 |
| JP | 2005239366 A | 9/2005 |
| JP | 2005321935 A | 11/2005 |
| JP | 2007235905 A | 9/2007 |
| JP | 2007532867 A | 11/2007 |
| JP | 2008021082 A | 1/2008 |
| JP | 2008522184 A | 6/2008 |
| JP | 2010521725 A | 6/2010 |
| JP | 2012526966 A | 11/2012 |
| JP | 5278978 B2 | 5/2013 |
| JP | 2014174647 A | 9/2014 |
| JP | 2015019244 A | 1/2015 |
| JP | 2015087306 A | 5/2015 |
| JP | 2017508984 A | 3/2017 |
| JP | 2017514499 A | 6/2017 |
| JP | 2017165487 A | 9/2017 |
| JP | 2018511782 A | 4/2018 |
| JP | 6343934 B2 | 6/2018 |
| JP | 2018136246 A | 8/2018 |
| JP | 2018529062 A | 10/2018 |
| JP | 2019505042 A | 2/2019 |
| JP | 2019518974 A | 7/2019 |
| JP | 2019529938 A | 10/2019 |
| JP | 2019536973 A | 12/2019 |
| KR | 20080070015 A | 7/2008 |
| KR | 102368093 B1 | 2/2022 |
| WO | 9216800 A1 | 10/1992 |
| WO | 0105687 A1 | 1/2001 |
| WO | 0194016 A1 | 12/2001 |
| WO | 02081743 A2 | 10/2002 |
| WO | 03061381 A1 | 7/2003 |
| WO | 2004026661 A1 | 4/2004 |
| WO | 2005093641 A1 | 10/2005 |
| WO | 2005109332 A1 | 11/2005 |
| WO | 2005115621 A1 | 12/2005 |
| WO | 2006029110 A1 | 3/2006 |
| WO | 2007024540 A1 | 3/2007 |
| WO | 2007049039 A1 | 5/2007 |
| WO | 2007075253 A2 | 7/2007 |
| WO | 2007092119 A1 | 8/2007 |
| WO | 2008024471 A2 | 2/2008 |
| WO | 2008057150 A1 | 5/2008 |
| WO | 2009004366 A1 | 1/2009 |
| WO | 2009017558 A1 | 2/2009 |
| WO | 2009094071 A3 | 10/2009 |
| WO | 2009120596 A1 | 10/2009 |
| WO | 2009155638 A1 | 12/2009 |
| WO | 2010037166 A1 | 4/2010 |
| WO | 2011069190 A1 | 6/2011 |
| WO | 2012083396 A1 | 6/2012 |
| WO | 2012100281 A1 | 8/2012 |
| WO | 2012033605 A3 | 11/2012 |
| WO | 2012033994 A3 | 12/2012 |
| WO | 2012033992 A3 | 4/2013 |
| WO | 2013053011 A1 | 4/2013 |
| WO | 2010014656 A3 | 5/2013 |
| WO | 2012034037 A3 | 5/2013 |
| WO | 2014001819 A1 | 1/2014 |
| WO | 2014006417 A1 | 1/2014 |
| WO | 2014009729 A1 | 1/2014 |
| WO | 2014114938 A2 | 7/2014 |
| WO | 2014135890 A1 | 9/2014 |
| WO | 2014157798 A1 | 10/2014 |
| WO | 2014191757 A1 | 12/2014 |
| WO | 2015073964 A1 | 5/2015 |
| WO | 2015109315 A3 | 10/2015 |
| WO | 2015162680 A1 | 10/2015 |
| WO | 2016081755 A1 | 5/2016 |
| WO | 2016120224 A1 | 8/2016 |
| WO | 2016160984 A1 | 10/2016 |
| WO | 2016160986 A3 | 11/2016 |
| WO | 2016200519 A1 | 12/2016 |
| WO | 2017014999 A1 | 1/2017 |
| WO | 2017075144 A1 | 5/2017 |
| WO | 2017109153 A1 | 6/2017 |
| WO | 2017149468 A1 | 9/2017 |
| WO | 2017215957 A1 | 12/2017 |
| WO | 2018000051 A1 | 1/2018 |
| WO | 2018002287 A1 | 1/2018 |
| WO | 2018005129 A1 | 1/2018 |
| WO | 2018025053 A1 | 2/2018 |
| WO | 2018039727 A1 | 3/2018 |
| WO | 2018041516 A1 | 3/2018 |
| WO | 2018097267 A1 | 5/2018 |
| WO | 2018215588 A1 | 11/2018 |
| WO | 2019005450 A1 | 1/2019 |
| WO | 2019182900 A1 | 9/2019 |
| WO | 2020033578 A1 | 2/2020 |
| WO | 2020072945 A1 | 4/2020 |
| WO | 2022155225 A1 | 7/2022 |

OTHER PUBLICATIONS

"Your Partner for Local and Secure Cryostorage and Transportation", http://cryofuture.com, Clinic's workflow, 2024, 12 pages.

Australian Examination Report mailed Feb. 26, 2024, Application No. 2021348066, 8 pages.

Notice of Reasons for Refusal, Japanese Application No. 2023-541871, dated Apr. 24, 2024, 3 pages.

Office Action Issued in U.S. Appl. No. 18/113,297, mailed May 14, 2024, 41 pages.

Notice of Reasons for Refusal, Japanese Application No. 2023-534389, dated May 28, 2024, 9 pages.

Notice of Reasons for Refusal, Japanese Application No. 2023-535428, dated May 30, 2024, 11 pages.

EP Search Report mailed Mar. 6, 2024 in EP App No. 22739992.0, 7 pages.

Japanese Office Action, dated Mar. 19, 2024, for corresponding Japanese Application No. 2023-519519, 15 pages.

Non Final Office Action for U.S. Appl. No. 17/083,179, mailed Sep. 1, 2022, 8 pages.

Non Final Office Action for U.S. Appl. No. 17/321,174, mailed Nov. 22, 2022, 26 pages.

Non-Final Office Action Issued in U.S. Appl. No. 18/100,977, mailed Jan. 19, 2024, 29 pages.

Final Office Action mailed Jul. 15, 2024, for U.S. Appl. No. 18/100,977 in 22 pages.

Notice of Allowance for U.S. Appl. No. 17/490,274, mailed Jun. 26, 2024, 13 pages.

Notice of Reasons for Refusal. Japanese Application No. 2023-518185, dated Jun. 17, 2024, 8 pages.

Final Office Action Issued in U.S. Appl. No. 18/113,297, mailed Aug. 27, 2024, 54 pages.

(56) References Cited

OTHER PUBLICATIONS

Extended European Search Report dated Jun. 30, 2022, for European Application No. 19869478.8, 9 pages.
International Search Report and Written Opinion for PCT/US2022/028185, mailed Aug. 26, 2022, 11 pages.
CX100 Cryo Express Dry Shipper With Shipping Case. Online, published date unknown. Retrieved on Apr. 6, 2022 from URL:https://www.mitegen.com/product/cryo-express-dry-shipper-cx 100-with-case, 1 page.
International Search Report and Written Opinion for PCT/US2021/062676, mailed Apr. 1, 2022, 9 pages.
International Search Report and Written Opinion for PCT/US2021/063608, mailed Apr. 12, 2022, 11 pages.
International Search Report and Written Opinion for PCT/US2022/012151, mailed Apr. 29, 2022, 9 pages.
OXO Airtight Pet Food Storage POP Container. Online published date unknown. Retrieved on Apr. 6, 2022 from URL: https:// www.wal mart. com/i p/oxo-pet-food-storage-pop-contai ner/623284606, 1 page.
EP Search Report mailed Nov. 7, 2023, in EP App No. 21808453.1, Nov. 11, 2023.
Japanese Office Action for Japanese Patent Application No. 2022-525678, mailed Oct. 12, 2023 (with English Translation) 12 pages.
Japanese Office Action for JP 2022-569516, mailed Nov. 8, 2023, 6 pages {with English Translation).
Cryogenic Vials, Standard. Online, published date unknown. Retrieved on Dec. 8, 2021 from URL: https://www.nextdayscience.com/cryogenic-vials-standard.htm.
International Search Report and Written Opinion of the International Searching Authority, mailed Jan. 12, 2022, for International Application No. PCT/US2021/051803, 8 pages.
Notice of Allowance mailed Jan. 4, 2022, for "Cryogenic Vial", U.S. Appl. No. 29/748,815, 9 pages.
"S840 Lab Mover", Large Volume LNS Dry Vapor Shipper, Products Shipping, Jul. 6, Abeyance Cry Solutions—Abeyateck, LLC, 2021, 3 pages.
"Simple, Secure—190° C. LN2 Vapor Storage", Products Shipping, Jul. 6, Abeyance Cry Solutions—Abeyateck, LLC, 2021, 7 pages.
International Search Report for PCT/US2021/032600, mailed Sep. 3, 2021, 4 pages.
"Abeyance Web App / Stay Connected", Jul. 6, Abeyance Cry Solutions—Abeyateck, LLC, 2021, 3 pages.
"IVF Witness System: RI Witness TM ART Management System", Confidence, Efficiency and Trust, IVF Witness System—RI Witness—CooperSurgical Fertility Companies https//fertility.coopersurgical.com/equipment/ri-witness—Apr. 19, 2021, 28 pages.
"IVF Witness System: RI Witness TM ART Management System", CooperSurgical Fertility Company 2021, 24 pages.
"RI Witness—Confidence, Efficiency and Trust", CooperSurgical, Fertility and Genomic Solutions, Order No. WIT_BRO_001_V13_ROW—Oct. 13, 2020, 13 pages.
"RI Witness—Product guide", CooperSurgical Fertility and Genomic Solutions, Order No. EQU_BRO_004, V1: ROW Oct. 24, 2018, 12 pages.
Brady printer Range, "Everyone is Unique" Continual cryopreservation monitoring from RI Witness, CooperSurgical, Inc. Order No. WIT_FLY_010_V2_US Oct. 14, 2020, 3 pages.
Comley, J., "New approaches to sample identification tracking and technologies for maintaining the quality of stored samples," Drug Discovery World Summer 2017, 11 pages.
CooperSurgical, RI Witness, Order No. CE 60010312 Version 3-ROW: Oct. 24, 2018, 12 pages.
FluidX Tri-Coded Jacket: 0.7ml Sample Storage Tube with External Thread; Brooks Life Sciences; https://bioinventory.biostorage.com.
HID Beyond Cool: RFID disentangles cryopreservation storage and management, 2015, 4 pages.
Ihmig et al., "Frozen cells and bits," IEEE Pulse, Sep. 2013, 9 pages.
International Preliminary Report on Patentability and Written Opinion from PCT Application No. PCT/GB2005/002048 dated Aug. 23, 2005, 9 pages.
International Search Report and Written Opinion for International Application No. PCT/US2020/057779, Mailed on Jun. 17, 2021, 12 pages.
International Search Report and Written Opinion for PCT/US2020/057764, Mailed Date: Feb. 19, 2021, 14 pages.
International Search Report and Written Opinion for PCT/US2020/060565, mailed Mar. 8, 2021, 11 pages.
Office Action dated Sep. 3, 2020, for U.S. Appl. No. 16/840,718, 46 pages.
Maggiulli, Roberta , et al., "Implementing an electronic witnessing system into a busy IVF clinic—one clinic's experience", Genera Center for Reproductive Medicine, Rome, Italy, 2 pages.
Rienzi, Laura , et al., Poster Witness "Electronic Witness System makes patients less concerned about biological sample mix-up errors and comfortable with IOVF clinical practice", Genera Center for Reproductive Medicine, Via de Notaris 2b, 00197, Rome, Italy. 2015, 1 page.
Swedberg, Claire , "Hitachi Chemical Markets Tiny UHF Tag", https://www.rfidjournal.com/hitachi-chemical-markets-tiny-uhf-tag, Sep. 12, 2010, 4 pages.
Thornhill, A. R, et al., Measuring human error in the IVF laboratory using an electronic witnessing system, Monduzzi Editoriale, Proceedings, 17th World Congress on Controversies in Obstetrics, Genecology & Infertility (GOGI), Nov. 8-11, 2012 Lisbon, Portugal, 6 pages.
International Search Report and Written Opinion for PCT/US2022/077741, mailed date Feb. 1, 2023, 12 pages.
European Search Report dated Aug. 7, 2023, for European Application No. 19869478.8, 5 pages.
Fontaine, "Automated Visual Tracking for Behavioral Analysis of Biological Model Organisms," Dissertation (Ph.D.), California Institute of Technology, ProQuest Dissertations Publishing (2008), 156 pages.
Japanese Office Action for Japanese Patent Application No. 2022-525678, mailed May 29, 2023 (with English Translation) 12 pages.
Japanese Office Action, dated Jun. 6, 2023, for corresponding Japanese Application No. 2022-525679, 16 pages.
Notice of Allowance for U.S. Appl. No. 17/321,174, mailed Jul. 12, 2023, 13 pages.
Notice of Allowance for U.S. Appl. No. 29/847,793, mailed Jul. 27, 2023, 2 pages.
Notice of Reasons for Refusal for Japanese Patent Application No. 2021-518707, mailed May 11, 2022, 11 pages.
Chinese Notice of Allowance for Application No. 2023-541871 mailed Oct. 8, 2024, 3 pages.
Comiso, S. et al., "Biot cryocarrier-standardized cryogenic temperature handling of biospecimens"; Biopreservation and Biobanking 13.3: A15. Mary Ann Liebert Inc. (Jun. 2015) (Year: 2015).
Non Final Office Action for U.S. Appl. No. 18/487,878, mailed Sep. 16, 2024, 25 pages.
Thermo Fisher Scientific Introduces System to Double Cryogenic Storage Capacity; M2 Presswire Oct. 27, 2011: NA (Year: 2011).
Zachman, "High-Resolution Studies of Intact Solid-Liquid Interfaces and Reactive Materials by Cryogenic Electron Microscopy"; Cornell University. ProQuest Dissertations & Theses, 2018. 10845397. (Year: 2018).
Canadian Office Action, for Canadian Application No. 3,202,347 , dated Nov. 7, 2024 4 pages.

* cited by examiner

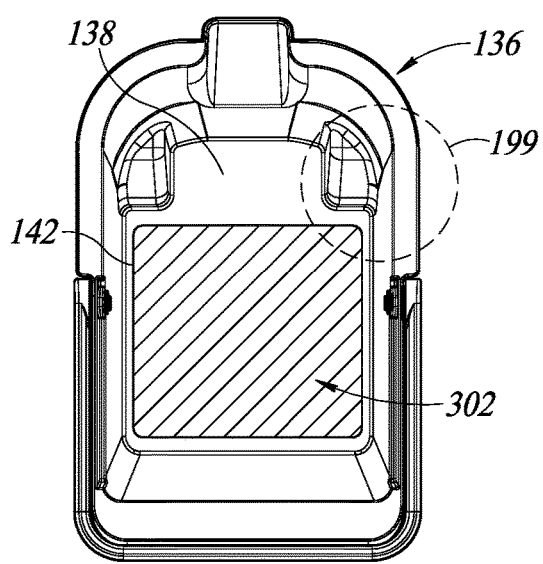 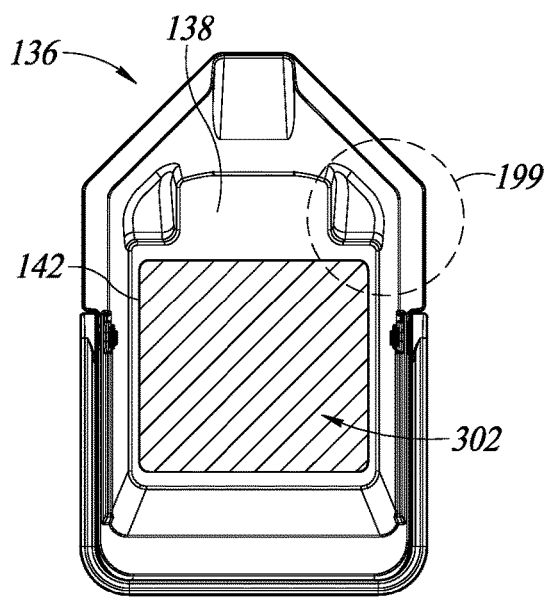
FIG. 30　　　　　　　　FIG. 31
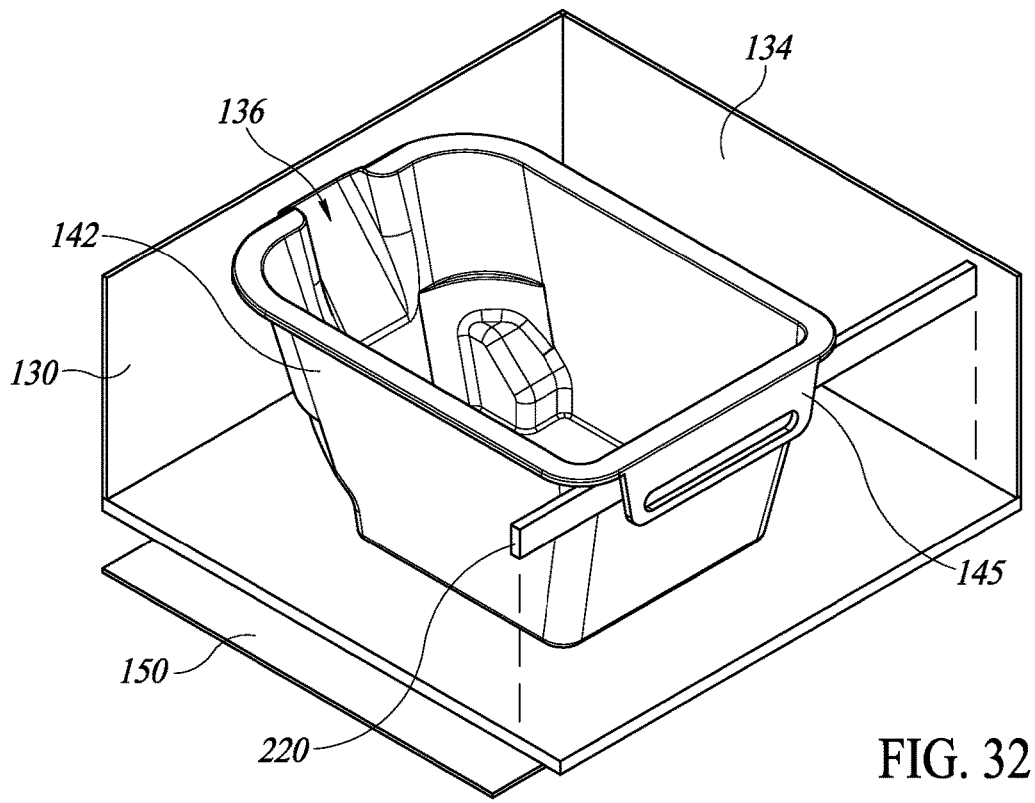
FIG. 32

WORKSTATION AND APPARATUS TO FACILITATE TRANSFER OF BIOLOGICAL SPECIMENS STORED AT CRYOGENIC CONDITIONS

TECHNICAL FIELD

The present disclosure generally relates to a workstation, apparatus and methods to transfer biological specimens (e.g., eggs, sperm, embryos, other biological tissue) between a cryogenic freezer (e.g., cryogenic storage tank or liquid nitrogen bath), which is typically fixed or stationary, and a portable thermally insulated carrier or cassette, and to facilitate identification of stored biological specimens and evidence chain-of-custody during handling.

BACKGROUND

Description of the Related Art

Long-term preservation of cells and tissues through cryopreservation has broad impacts in multiple fields including tissue engineering, fertility and reproductive medicine, regenerative medicine, stem cells, blood banking, animal strain preservation, clinical sample storage, transplantation medicine, and in vitro drug testing. This can include the process of vitrification in which a biological specimen or sample (e.g., an oocyte, an embryo, a biopsy) contained in or on a storage device (e.g., a cryopreservation straw, cryopreservation tube, stick or spatula) is rapidly cooled by placing the biological specimen and the storage device in a substance, such as liquid nitrogen. This results in a glass-like solidification or glassy state of the biological specimen (e.g., a glass structure at the molecular level), which maintains the absence of intracellular and extracellular ice (e.g., reducing cell damage and/or death) and, upon thawing, improves post-thaw cell viability. To ensure viability, the vitrified biological specimens must then be continuously stored in a liquid nitrogen dewar or other container containing the liquid nitrogen, which is at a temperature of negative 190 degrees Celsius.

There are, however, a number of concerns in how these biological specimens are being stored, identified, managed, inventoried, retrieved, etc.

For example, each harvested embryo is loaded on a rigid specimen holder (e.g., embryo straw, stick or spatula). In the case of a tubular specimen holder, the tube may be closed (e.g., plugged) at one end and open at the other end. The cryopreservation storage devices (e.g., specimen holders) containing or holding the embryos are cooled as quickly as possible by plunging the cryopreservation storage device with the biological material into a liquid nitrogen bath in a cryogenic freezer at a temperature of approximately negative 190 degrees Celsius, for example to achieve vitrification. More particularly, multiple cryopreservation storage devices are placed in a goblet for placement in the liquid nitrogen storage tank or freezer. The goblet attaches to the liquid nitrogen storage tank such that the multiple cryopreservation storage devices are suspended in the liquid nitrogen. Labels that are manually written-on using a suitable marker pen or printed using a custom printer are attached to the straw and/or the goblet. Such labels can include identification information corresponding to the individual that the embryo was harvested from and other suitable information (e.g., a cryopreservation storage device number, a practitioner number, etc.).

Access to the biological specimens are required during normal operation. For example, a particular biological specimen or specimens may be required to perform a procedure (e.g., implantation of a fertilized egg). Retrieval of cryopreservation storage devices and associated biological specimens from the cryogenic refrigerator or cryogenic tank in which the biological specimens are stored exposes the retrieved biological specimens to non-cryogenic conditions (e.g., temperatures above negative 190° C., and depending on a duration of the exposure places the biological specimens at risk. Due to the way biological specimens are stored (e.g., cryopreservation storage devices arrayed in cassettes, cassettes arrayed in stacks), retrieval of one or more desired biological specimens often requires retrieval of additional biological specimens that are not needed at that time, exposing such to risk. Additionally, transport of biological specimens from a cryogenic refrigerator to a site of an intended use (e.g., fertilization, implantation) exposes the biological specimens to risk.

With regard to storage and management of these biological specimens, facilities employ personnel that are required to maintain the liquid nitrogen storage tanks (e.g., by refilling them with liquid nitrogen when needed) and manage the inventory of stored biological specimens (e.g., by performing periodic accountings). There is, however, little recordkeeping with regard to the proper storage of these biological specimens. For example, subsequent identification or otherwise handling of the vitrified biological specimen or sample can involve removal of the specimen from temperature-controlled storage and exposure of the sample to ambient temperature, thus potentially risking the viability of the sample.

BRIEF SUMMARY

Accordingly, it is desirable to provide new work stations, apparatus and methods for transferring biological specimens (e.g., eggs, sperm, embryos) between a cryogenic freezer or storage tank that holds a liquid nitrogen bath, which is typically a large, heavy piece of equipment and hence stationary, and a portable thermally insulated carrier. It is also desirable to provide new work stations, apparatus and methods to facilitate identification of stored biological specimens or samples and evidence chain-of-custody during handling.

A work station facilitates transfers of specimen containers (e.g., vials with caps) into and out of a cryogenic freezer or dewar. A plurality of the specimen containers may be carried by a storage cassette, which is designed to be stored in a cryogenic refrigerator or dewar. Identification information is read from wireless transponders carried by the specimen containers, and optionally carried by storage cassette. Inventories of specimen containers and even specific specimen holders may be maintained, as or with proof of chain of custody. Automated storage and retrieval may be provided.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

FIG. 30 is a top, plan view of the bucket of the workstation supporting the storage cassette according to one embodiment.

FIG. 31 is a top, plan view of the bucket of the workstation supporting the storage cassette according to one embodiment.

FIG. 32 is an isometric view of a bucket positioned in the well using an alignment structure according to one embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, actuator systems, and/or communications networks have not been shown or described in detail to avoid unnecessarily obscuring descriptions of the embodiments. In other instances, well-known computer vision methods and techniques for generating perception data and volumetric representations of one or more objects and the like have not been described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
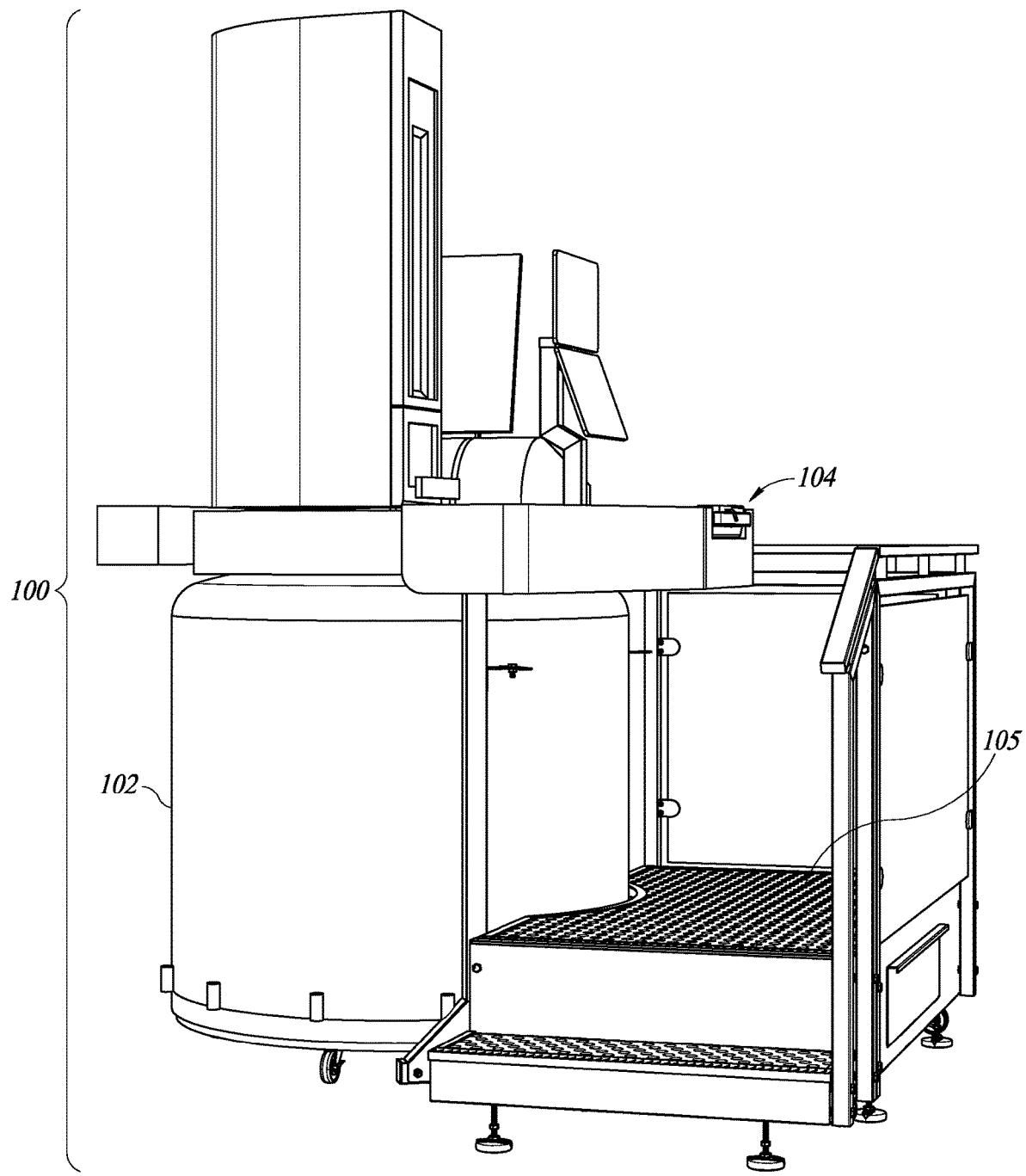
FIG. 1 is a left side, front isometric view of a cryogenic storage system including a cryogenic freezer or storage tank that holds a liquid nitrogen bath, a robotic transfer system operable to transfer of biological specimens (e.g., eggs, sperm, embryos) into and out of the cryogenic freezer or storage tank, and a workstation including an interface to handle and track the transfer of biological specimens into and out of the cryogenic freezer or storage tank and to maintain a chain of custody for the biological specimens, according to at least one illustrated embodiment.

FIG. 1 shows a cryogenic storage system 100, according to at least one illustrated embodiment.

The cryogenic storage system 100 may take a large variety of forms, typically including cryogenic storage tank or freezer 102 which can store specimen containers in a cryogenic environment, for example immersed in a bath of liquid nitrogen at a temperature at or below about negative 190° C. The cryogenic storage tank or freezer 102 is typically highly thermally insulated, and may include stainless steel interior and exterior walls with a vacuum and/or other thermal insulating material therebetween.

The cryogenic storage system 100 may include a workstation 104 to facilitate identification of stored biological specimen and evidence chain-of-custody during handling of said stored biological specimen. According to one implementation, the workstation may be located adjacent, for example immediately adjacent, the cryogenic storage tank or freezer 102. The workstation 104 may include an elevated floor 105, which facilitates a shorter distance to a top of the cryogenic storage tank or freezer 102 for a user standing on the elevated floor 105 as opposed to standing on a non-elevated floor (e.g. the floor upon which the cryogenic storage tank or freezer 102 rests).

Figure 2:
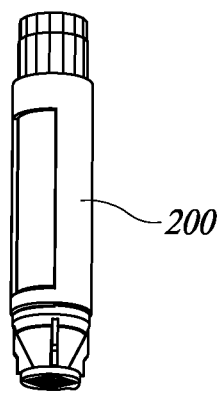
FIG. 2 is a front, elevation view of a specimen container, according to one embodiment.
Figure 3:
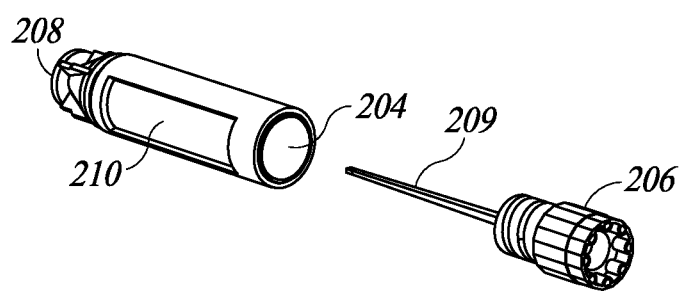
FIG. 3 is an exploded isometric view of the specimen container of FIG. 2.

Referring to FIGS. 2 and 3, the cryogenic storage system 100 may include a specimen container 200, which is typically stored for long term storage via a cryogenic refrigerator. Each of the specimen containers 200 may include a vial 204, a cap 206, one or more wireless transponders (e.g., radio frequency identification (RFID) transponders) 208, and an elongated specimen holder 209 (e.g., straw, rod, spatula). Additionally, the specimen containers 200 may include one or more machine-readable symbols 210. The specimen containers 200, according to one example, may store specimens of biological tissue, for instance eggs, sperm or embryos. Various implementations of specimen containers are described in U.S. patent application 62/900,281, filed Sep. 13, 2019; U.S. patent application 62/880,786, filed Jul. 31, 2019; U.S. patent application 62/879,160, filed Jul. 26, 2019; U.S. patent application 62/741,986, filed Oct. 5, 2018; and U.S. patent application 62/741,998, filed Oct. 5, 2018.

Figure 4:
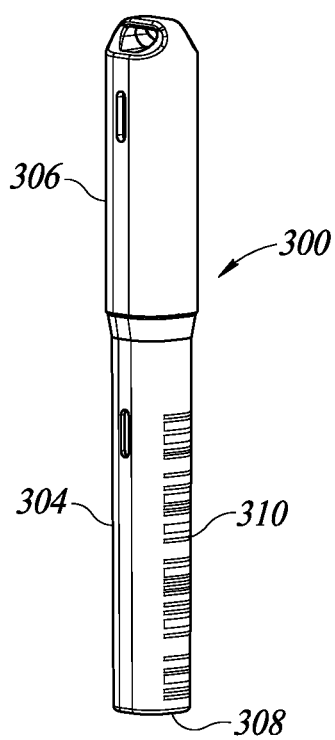
FIG. 4 is a front, elevation view of a specimen container, according to one embodiment.

Referring to FIG. 4, another embodiment of a specimen container 300 is shown. The specimen container 300 may include a vial 304, a cap 306, and one or more wireless transponders (e.g., radio frequency identification (RFID) transponders) 308. The specimen container 300 may include an elongated specimen holder (e.g., straw, rod, spatula) (not shown), which is similar to the specimen holder 209 described in reference to FIG. 3. Additionally, the specimen container 300 may include one or more machine-readable symbols 310.

Figure 5:
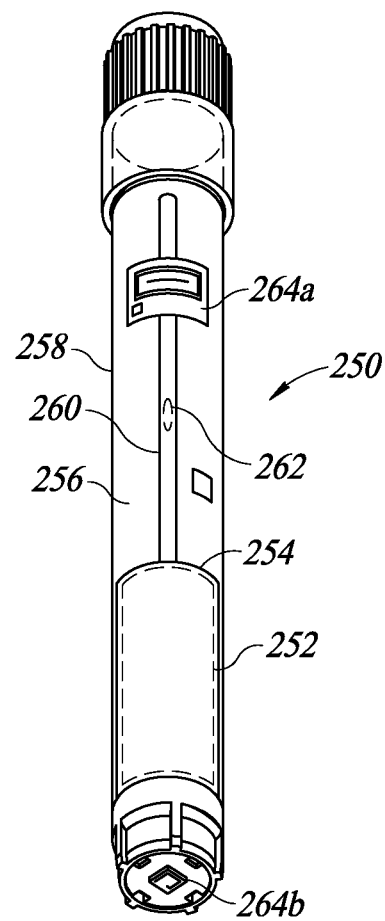
FIG. 5 is a front, elevation view of a specimen container, according to one embodiment.

Referring to FIG. 5, an embodiment of a specimen container 250, similar to the specimen containers 200 and 300, may include a thermal mass 252 and a thermal insulator 254 that at least partially surrounds the thermal mass 252 to prevent or inhibit thermal conduction. The thermal mass 252 may be located in an interior cavity 256 of a vial 258 of the specimen container 250. The thermal mass 252 may have a larger thermal mass than a thermal mass associated with a sample cryopreservation storage device(s) 260 of the specimen container 250 and any biological material(s) 262 held by the sample cryopreservation storage device(s) 260.

The thermal mass 252 may take the form of a piece of non-ferrous metal or a metal impregnated polymer where the metal is in the form of small pieces, particles or strands that are sufficiently small and discontinuous as to prevent or retard the formation of currents therethrough. The thermal insulator 254 may take a variety of forms, including but not limited to an aerogel (e.g., a microporous solid in which the dispersed phase is a gas, a gel in which the liquid component is replaced with a gas, for instance silica-based, alumina-based, chromiabased, tin oxide-based and carbon based aerogels).

The thermal mass 252 may be spaced from one or more wireless transponders carried by the specimen container, for example a first wireless transponder 264a and a second wireless transponder 264*b* by at least a minimum defined distance (e.g., 3 mm) to prevent interference with wireless communications via the wireless transponders 262*a* and 262*b*.

Figure 6:
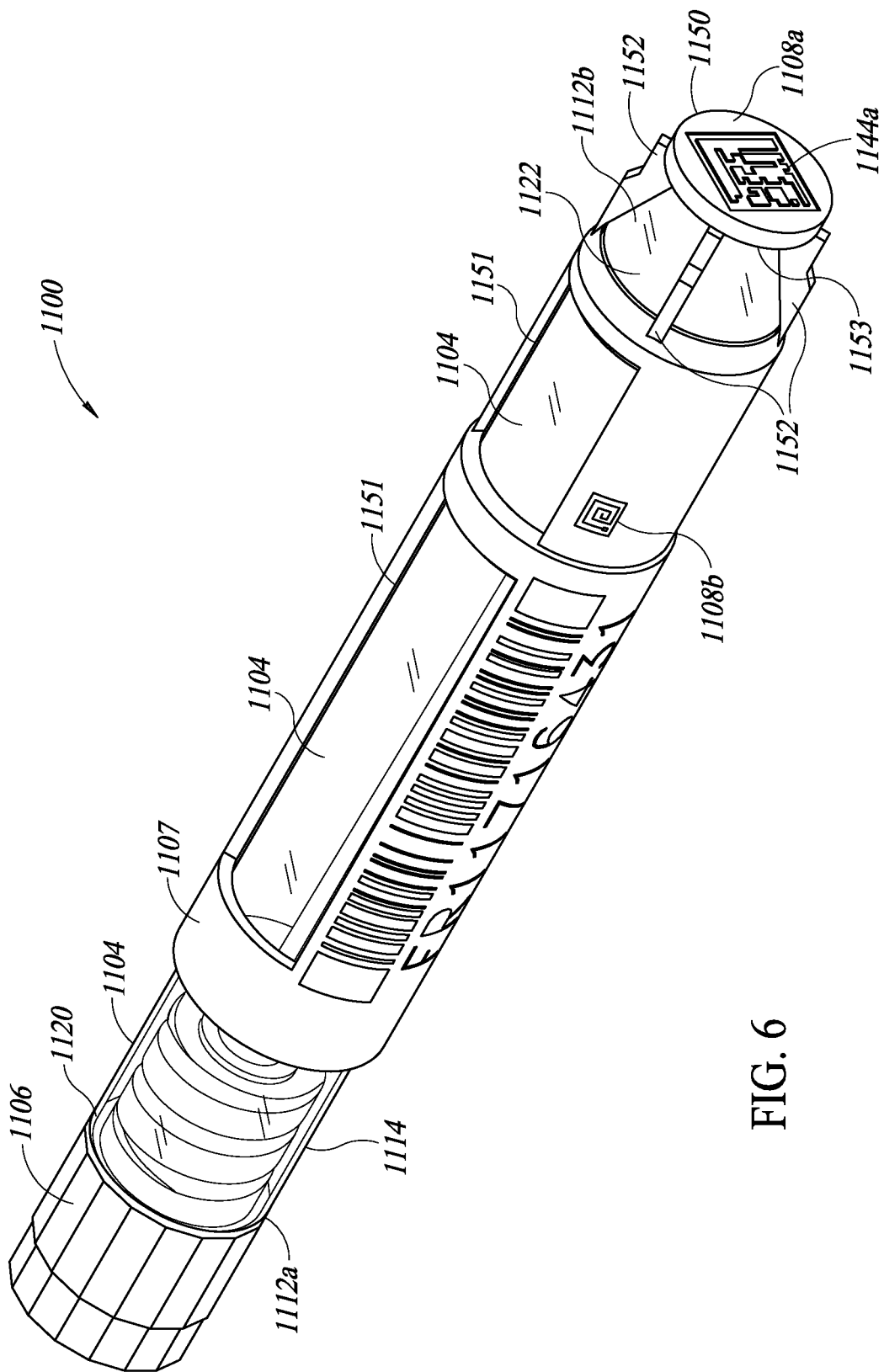
FIG. 6 is an isometric view of a specimen container, according to one embodiment.

Referring to FIG. 6 an embodiment of a specimen container 1100, similar to the specimen container 200, 250, and 300, for holding biological samples. The specimen container 1100 may include a vial 1104, a 1106 cap, and a jacket 1107. As shown, the vial 1104 may be at least partially covered by the outer jacket 1107, also called an outer sleeve or frame. The cap 1106 is sized and shaped to removably close an opening 1120 at a first end 1112*a* of the vial 1104. The vial 1104 includes the first end 1112*a*, a second end 1112*b*, and a side wall 1114. The second end 1112*b* is opposed from the first end 1112*a* across a length of the vial 1104, and the side wall 1114 extends between the first end 1112*a* and the second end 1112*b* to delimit an interior of the vial 1104 from an exterior thereof.

The second end 1112*b* may be closed or sealable. The vial 1104 may take the form of a tube, which may have a circular profile or cross section, or alternatively may have other shapes (e.g., rectangular, hexagonal, octagonal). The opening 1120 of the vial 1104 may, for example, be circular, although the opening 1120 may have other shapes. The second end 1112*b* of the vial 1104 may, for example, terminate in a semi-spherical tip or may be frustoconical, terminating in a flat surface 1122 which is perpendicular to a longitudinal axis of the vial 1104.

The jacket 1107 may cover at least a portion of an exterior surface of the vial 1104, as shown. According to one implementation, the jacket 1107 is shaped and sized to allow the vial 1104 to be received within a top opening of the jacket 1107. Both the vial 1104 and the jacket 1107 may have, for example, a circular cross-section such that the circumference of an exterior surface of the vial 1104 is approximately equal to a circumference of an inner surface of the jacket 1107. Such a configuration allows for a snug fit between the vial 1104 and the jacket 1107. In implementations, the second end 1112*b* of the vial 1104, e.g., the frustoconical tip which terminates in a flat surface 1122, may extend from a bottom opening of the jacket 1107.

The inner surface of the jacket 1107 may be attached to the exterior surface of the vial, e.g., friction fitted, heat fitted, and/or via adhesive, in implementations in which the jacket 1107 is to remain associated with a particular vial throughout the lifecycle of the specimen container 1100. In some implementations, the inner surface of the jacket 1107 may be removably attached to the exterior surface of the vial 1104 to allow removal and replacement of the jacket 1107, e.g., if the jacket 1107 is to be associated with more than one vial 1104 (or vice versa). In such a case, there may be an elastic compression fit and/or a friction fit between the vial 1104 and the jacket 1107.

In implementations, the inner surface of the jacket 1107 and/or the exterior surface of the vial 1104 may include deformable protrusions (not shown) which compress elastically to form a compression fit between the vial 1104 and the outer jacket 1107. In implementations, the inner surface of the jacket 1107 and/or the exterior surface of the vial 1104 may include opposing threads or ridges to secure the vial 1104 within the jacket 1107 (or, in other words, to secure the jacket 1107 to the vial 1104). In implementations, the jacket 1107 may be manufactured separately from the vial 1104 and, for example, retrofitted onto existing vials 1104.

The outer jacket 1107 may have openings 1151 through which the exterior surface of the vial 1104 is visible, thereby allowing the contents of the vial 1104 to be seen in implementations in which the vial 1104 is transparent or translucent. The openings 1151 may have longer sides which run in a direction along a longitudinal axis of the jacket 1107 and shorter sides which run in a direction transverse to the longitudinal axis of the jacket 1107 and curve around the circumference of the vial 1104.

In implementations, an arrangement of arms 1152 may extend from the bottom opening of the jacket 1107 in a longitudinal direction of the jacket 1107 to support a platform 1150, e.g., a solid, disk-shaped platform, which is oriented in a plane which is transverse to the longitudinal axis of the jacket 1107. For example, there may be four arms 1152 at positions which are 90 degrees apart around the circumference of the jacket 1107. The arms 1152 and the platform 1150 may be positioned and sized so that an inner surface of the platform 1150 forms a bottom interior surface 1153 of the jacket 1107. The bottom interior surface 1153 of the jacket 1107 may be in contact with, or nearly in contact with, the bottom portion of the vial 1104 when the vial is received in the outer jacket 1107. The platform 1150 may be attached to the ends of the arms 1152 or may be integrally formed with the arms 1152, such as, for example, in a thermoplastic manufacturing process.

The specimen container 1100 may include one or more wireless transponders, e.g. a first wireless transponder 1108*a*, a second wireless transponder 1108*b*, etc. (collectively 1108). The first wireless transponder 1108*a* may be carried by the platform 1150, according to at least one implementation. The first wireless transponder 1108*a* may be fixed on an outer surface of the platform 1150.

In implementations, at least a portion of the platform 1150 itself may, for example, take the form of a radio frequency identification (RFID) button cell, which is attached to the arrangement of arms 1152 and which serves as the first wireless transponder 1108*a*. In some cases, a portion of the platform, e.g., a thin disk-like plate of a thickness less than that of the platform 1150 discussed above, may be attached to the arrangement of arms 1152 and have an RFID button cell mounted thereon. In either of these configurations, i.e., the transponder being fixed on the platform or at least a portion of the platform itself being an RFID button cell, the first wireless transponder 1108*a* is fixed to the structure of the jacket 1107, as opposed to being received or positioned in a recess formed in the bottom of the vial 1104 or being otherwise directly fixed to the vial 1104.

In implementations, portions of the first wireless transponder 1108*a*, may be at least partially covered by a non-conductive label 1144*a* with machine-readable symbol(s) and/or human-readable information formed thereon so as to be visible on the bottom of the specimen container 1100. In implementations, the label 1144*a* may be applied to the outer surface of the platform 1150 without a wireless transponder being present. The label 1144*a* may be at least partially covered at a later time by attachable wireless transponder circuitry, such as, for example, circuitry formed on a carrier having an adhesive backing or a carrier which is attachable using adhesive, e.g., epoxy. The epoxy may encapsulate the first wireless transponder 1108*a*, or the combination of the platform 1150 and epoxy may encapsulate the first wireless transponder 1108*a*, to securely attach and provide environmental protection thereto. Alternatively, the first wireless transponder 1108*a* may be molded or encapsulated in a portion of the platform 1150 itself.

In implementations, the second wireless transponder 1108*b* may be fixed to a side of the jacket 1107. The second wireless transponder 1108b may be fixed to the jacket 1107 via any of the teachings above in reference to the first wireless transponder 1108a.

Referring to FIGS. 2 to 6, the features of each of the specimen containers 200, 250, 300, 1100 described herein may be combined with any features of others of the specimen containers 200, 250, 300, 1100 as described herein. For example, the specimen container 300 may include the thermal mass 252, the jacket 1107, or both the thermal mass 252 and the jacket 1107.

Figure 7:
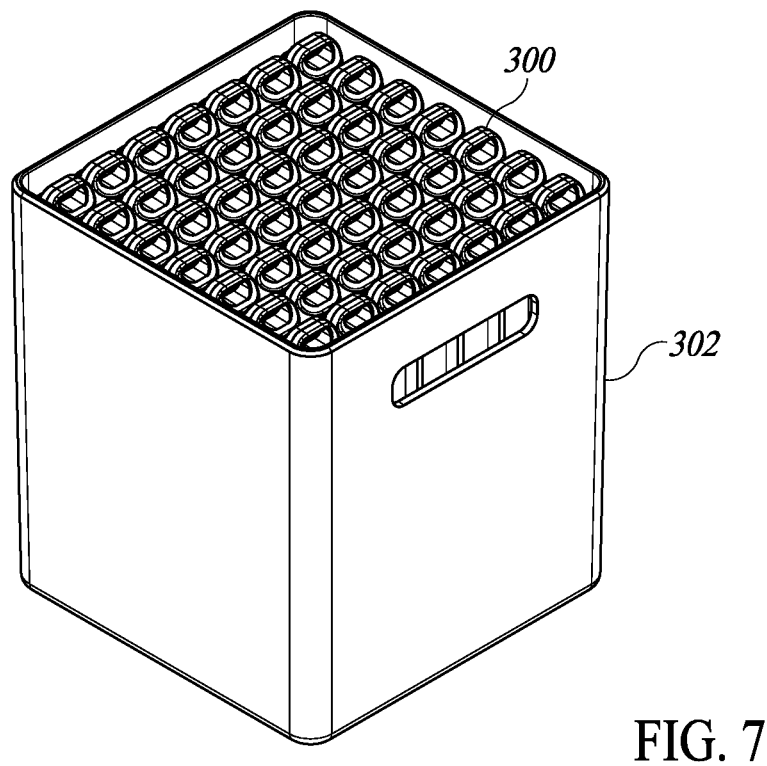
FIG. 7 is an isometric view of a storage cassette supporting a number of the specimen containers illustrated in FIG. 4.
Figure 8:
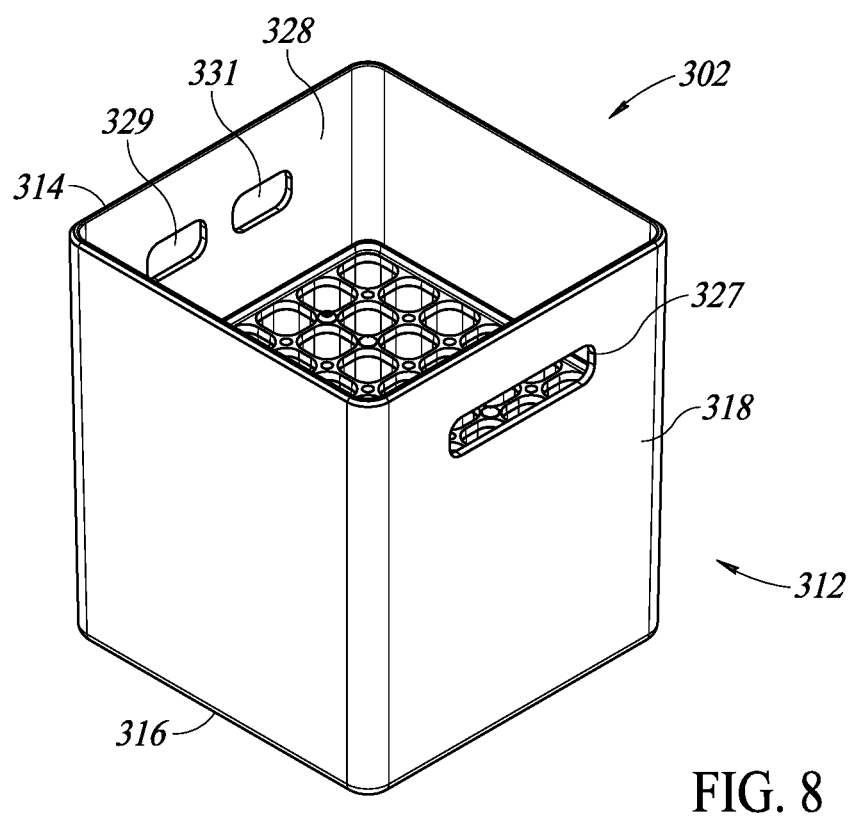
FIG. 8 is an isometric view of the storage cassette illustrated in FIG. 7.
Figure 9:
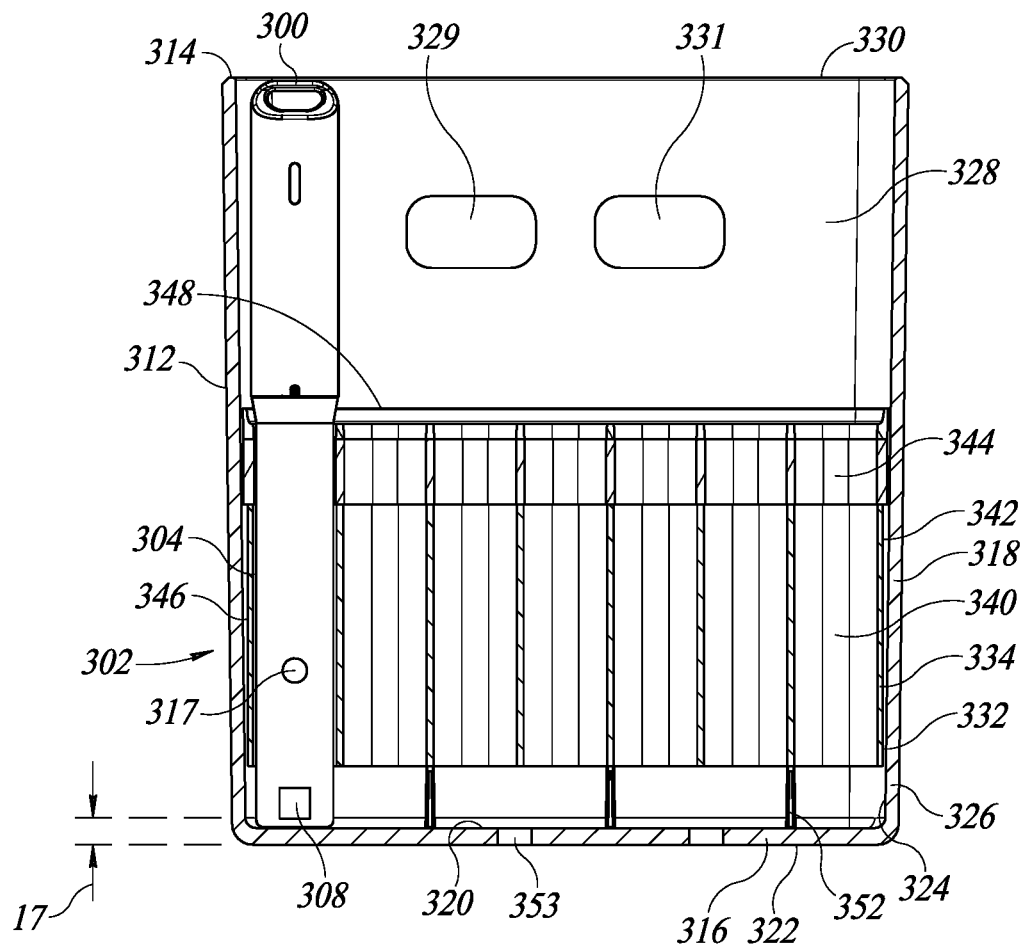
FIG. 9 is a cross-sectional view of the storage cassette illustrated in FIG. 8 supporting one of the specimen containers illustrated in FIG. 4.
Figure 10:
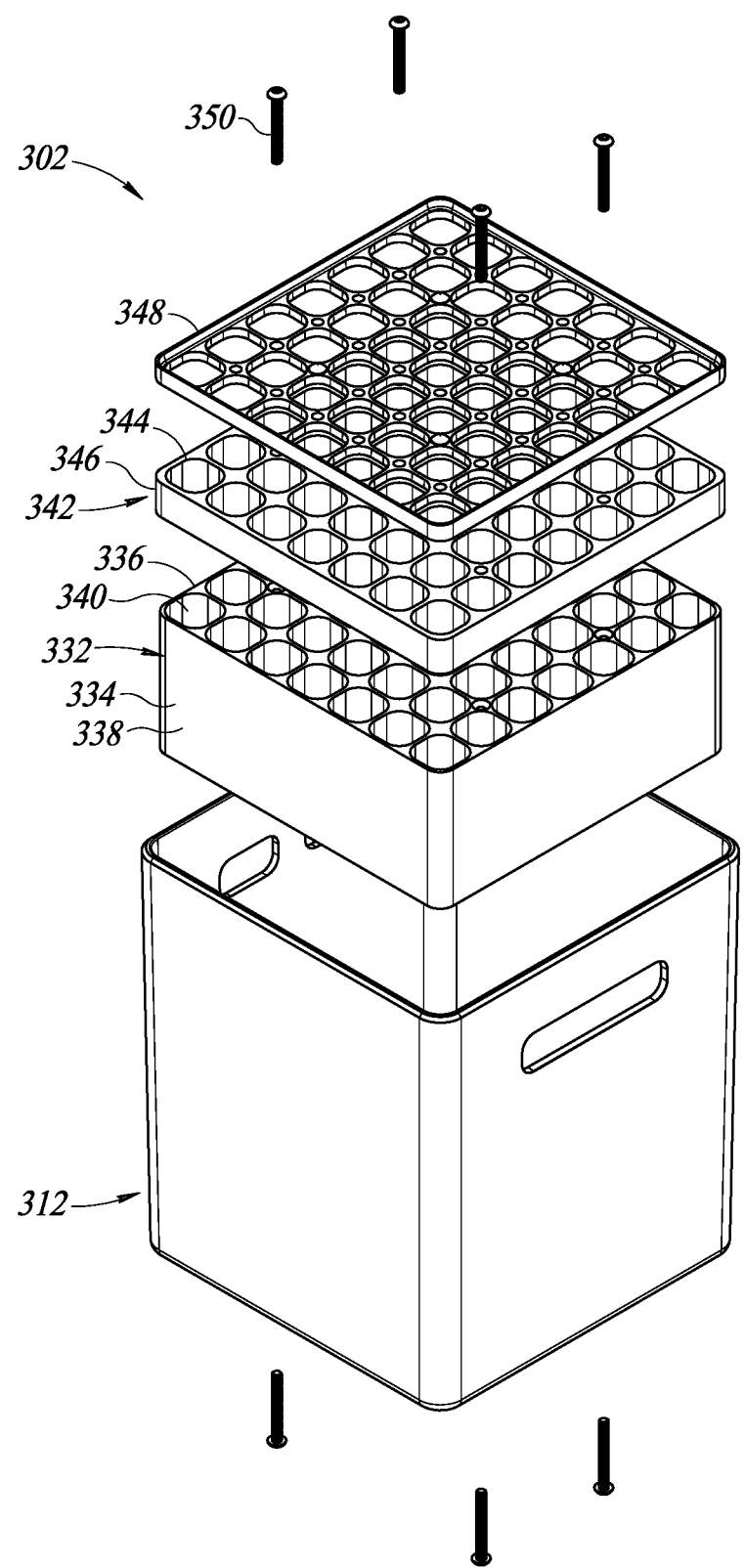
FIG. 10 is an isometric exploded view of the storage cassette illustrated in FIG. 8.

Referring to FIG. 7, the specimen containers 300 (only one called out) may be arrayed in a storage cassette 302 of the cryogenic storage system 100, for example arrayed in a two-dimensional array (e.g., 7 by 7, 10 by 10, 8 by 12, 14 by 14). The storage cassette 302 may be designed to remain in the cryogenic refrigerator expect for brief periods when removal is needed to retrieve a specimen.

Referring to FIGS. 7 to 10, the storage cassette 302 maintains cryogenic conditions for an array of the specimen containers 300, for example 49 separate ones of the specimen containers 300, according to at least one implementation. As shown in the illustrated embodiment, the storage cassette 302 may include a bulk container 312 having a top 314, a bottom 316 and at least one side wall 318. The bottom 316 may have an inner facing surface 320 and an outer facing surface 322. The at least one side wall 318 may have an inner facing surface 324 and an outer facing surface 326.

The bulk container 312 may include at least a first aperture 327 formed in the at least one side wall 318. The bulk container 312 may further include a second aperture 329 in the at least one side wall 318, for example such that the first aperture 327 is opposed to the second aperture 329 across a lateral dimension of the bulk container 312. As shown in the illustrated embodiment, the bulk container 312 may further include a third aperture 331 in the at least one side wall 318, for example such that the third aperture 331 is adjacent to the second aperture 329, and formed by the same at least one side wall 318 as the second aperture 329.

The inner facing surface 320 of the bottom 316 and the inner facing surface 324 of the at least one side wall 318 may delineate an interior compartment 328 of the bulk container 312. The interior compartment 328 may have an interior compartment profile, and the bulk container 312 may have an opening 330 at the top thereof, formed by the top 314, as shown in the illustrated embodiment. The at least one side wall 318 may be thermally insulated.

The storage cassette 302 may further include a thermal shunt 332 with a substrate 334. According to one embodiment, the substrate 334 includes a metal. As shown, the substrate 334 may include a first major face 336 and a second major face 338, the second major face 338 opposed from the first major face 336 across a thickness of the substrate 334. The substrate 334 may have an array of a plurality of through holes 340 that extend through the thickness of the substrate 334. Each of the through holes 340 of the substrate 334 may be shaped and sized to receive at least a portion of a respective vial 304 of the specimen containers 300.

As shown, the substrate 334 may be closely receivable in the interior compartment 328 of the bulk container 312. The thermal shunt 332 may have an outer profile that is asymmetrical to ensure that the thermal shunt 332 is positioned correctly in the interior compartment 328 of the bulk container 312. The thermal shunt 332 may be made of any of a variety of materials, preferably having a relatively large thermal mass as compared to the materials to be stored in the storage cassette 302. Suitable materials for the thermal shunt 332 may include, for example, slabs of non-ferrous metals, or metal impregnated polymers where the metal is a non-ferrous metal or the metal is in the form of small pieces, particles or strands that are sufficiently small and discontinuous as to prevent or retard the formation of currents therethrough. In at least some implementations, the thermal shunt 332 takes the form of an aluminum plate, slab, or slug.

The storage cassette 302 may further include a thermally insulative material 342 closely receivable in the interior compartment 328 of the bulk container 312, the thermally insulative material 342 may have an array of a plurality of through holes 344 that extend there through. The thermally insulative material 342 reduces heat transfer (via conduction, convection, or both) outward from the thermal shunt 332 toward an external environment of the storage cassette 302.

According to one embodiment, each of the through holes 344 of the thermally insulative material 342 may be shaped and sized to receive at least a portion of a respective vial 304 of the specimen containers 300. According to one embodiment, the thermally insulative material 342 may include a first portion 346 and a second portion 348. As shown the first portion 346 and the second portion 348 may be securable to one another, for example with one or more fasteners 350.

The thermally insulative material 342 and the thermal shunt 332 may be stacked in the interior compartment 328 of the bulk container 312 such that each of the through holes 344 of the thermally insulative material 342 is axially aligned with a respective one of the through holes 340 of the thermal shunt 332. The through holes 340 and 344 may have matching shapes, or alternatively, the through holes 340 may have a shape that is different from that of the through holes 344. The through holes 340, the through holes 344, or both the through holes 340 and 344 may be circular. The through holes 340, the through holes 344, or both the through holes 340 and 344 may be square with rounded corners.

The bulk container 312 may include a number of set offs 352 that extend upwardly from the inner facing surface 320 of the bottom 316 into the interior compartment 328. As shown in the illustrated embodiment, the set offs 352 may be positioned to support the thermal shunt 332 such that the thermal shunt 332 is spaced from inner facing surface 320 of the bottom 316 of the bulk container 312.

The storage cassette 302 may include a thickness of: the bottom 316, the thermal shunt 322, the thermally insulative material 342, the set offs 352, or any combination thereof, such that a portion of the specimen container 300, for example the wireless transponder 308, is within a defined distance 17 of the outer facing surface 322 of the bottom 316. According to one embodiment, specimen container 300 is supported directly by (i.e. is in direct contact with) the inner facing surface 320, such that the defined distance 17 is equal to a thickness of the bottom 316 of the bulk container 312 plus a thickness of a bottom of the specimen container 300.

The storage cassette 302 may include a thickness of the thermal shunt 322, the set offs 352, or both, such that a specimen 317 within the specimen container 300, is surrounded by the thermal shunt 332 and the thermal shunt is paced upward and away from the wireless transponder 308.

The bulk container 312 may include at least one aperture 353, which permits ingress and egress of a cryo-fluid into and out of the interior compartment 328 of the bulk container 312. As shown, the at least one aperture 353 may be formed in the bottom 316 of the bulk container 312. The set offs 352 may position the thermal shunt 332 upward and away from the bottom 316 thereby providing improved flow of a cryo-fluid through the at least one aperture 353.

Figure 11:
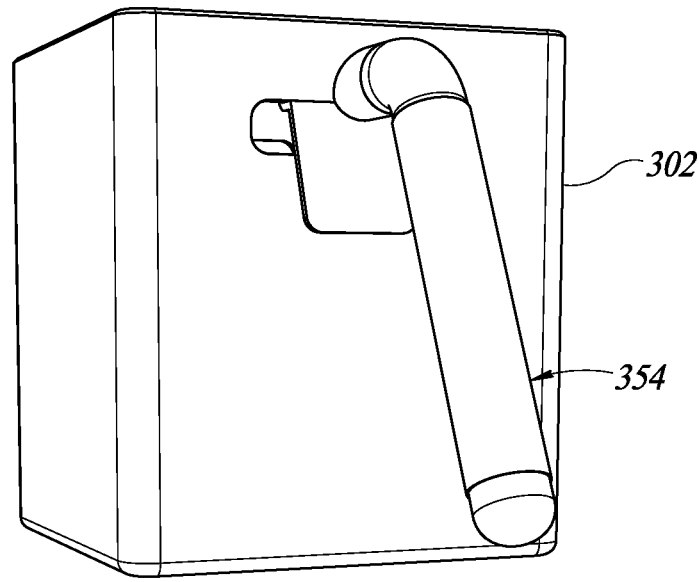
FIG. 11 is an isometric view of the storage cassette illustrated in FIG. 8 and a handle according to one embodiment.

Referring to FIG. 11, the cryogenic storage system 100 may include a specimen transporter 380. The specimen transporter 380 is similar to the storage cassette 302, as described in reference to FIGS. 7 to 10, such that any of the description of the storage cassette 302 is applicable to the specimen transporter 380, with differences called out below.

Rather than carrying a plurality of specimen containers to be stored in the cryogenic storage tank or freezer 102 as the storage cassettes 302, the specimen transporter 380 may hold one or more of the specimen containers as they are transported to or from the cryogenic storage tank or freezer 102, e.g. after harvesting or prior to implantation. As shown, the specimen transporter 380 may include a cover 382 to seal the opening 330. The at least one side wall 318 may be devoid of any apertures, for example the first, second, and third apertures 327, 329, and 331, and the bottom 316 may be devoid of any apertures, for example the at least one aperture 353, such that when the cover 382 seals the opening 330, the interior compartment 328 is completely sealed from the external environment. Thus, the interior compartment 328 of the specimen transporter 380 may be filled with an amount of cryo-fluid and then sealed to maintain an acceptable temperature for any specimen containers contained therein. The specimen transporter 380 may include a double layer wall to ensure thermal stability of the interior compartment 328 when sealed from the external environment. The cover 382 may be permanently, for example pivotally, attached to the bulk container 312. The cover 382 may include a transparent portion 384 that provides visibility to the interior compartment 328 when the cover 382 is closed and sealing the opening 330.

The specimen transporter 380 may further include a thermal shunt that transfers colder air from the bottom of the interior compartment 328 to the top of the interior compartment 328 to maintain an even temperature throughout the interior compartment 328.

Figure 12:
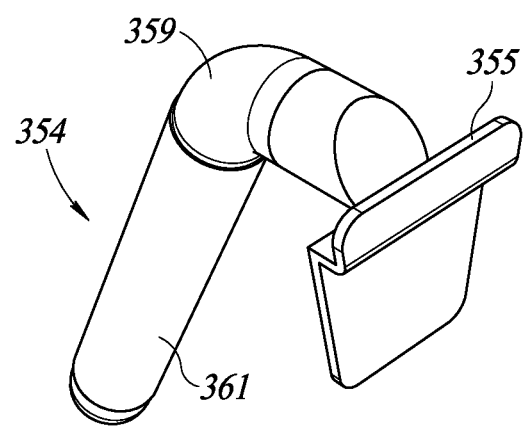
FIG. 12 is an isometric view of the handle illustrated in FIG. 11.
Figure 13:
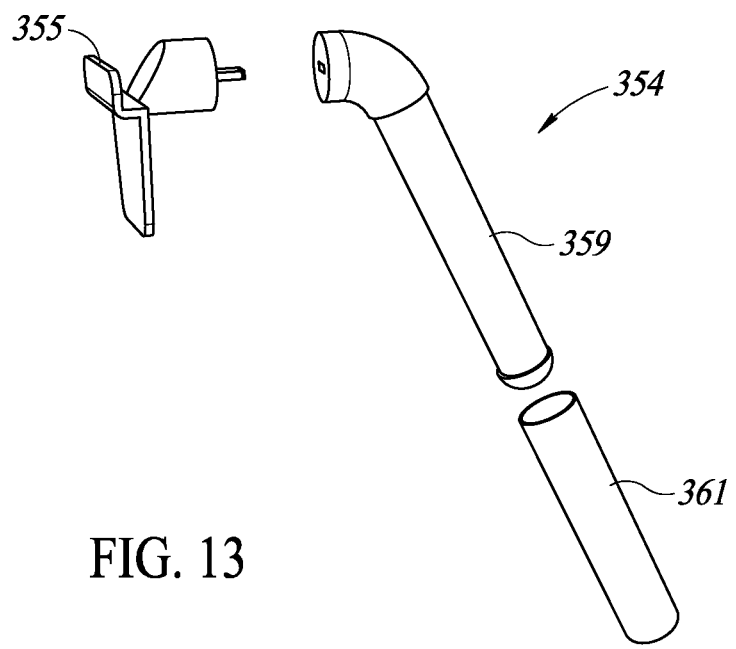
FIG. 13 is an exploded, isometric view of the handle illustrated in FIG. 12.

Referring to FIGS. 7 to 16, the storage cassette 302 may include a handle 354 that is removably coupleable to the bulk container 312, for example via the first aperture 327. As shown in FIGS. 11 to 13, the handle 354 may be used to manipulate the storage cassette 302. According to one embodiment, the handle 354 includes a head portion 355 that engages the storage cassette 302. As shown, the head portion 355 includes a flange 357 insertable through the aperture 327 to releasably couple the handle 354 to the storage cassette 302. The handle 354 includes a grip 359 that is sized to be held in the hand of an operator to facilitate manipulation of the storage cassette 302 via movement of the handle 354.

The head portion 355 and the grip 359 may include separate pieces that are releasably coupleable to one another. The grip 359 may include a removable sheath 361 that has a surface, e.g. a textured surface, which improves friction between the operator's hand and the handle 354.

Figure 14:
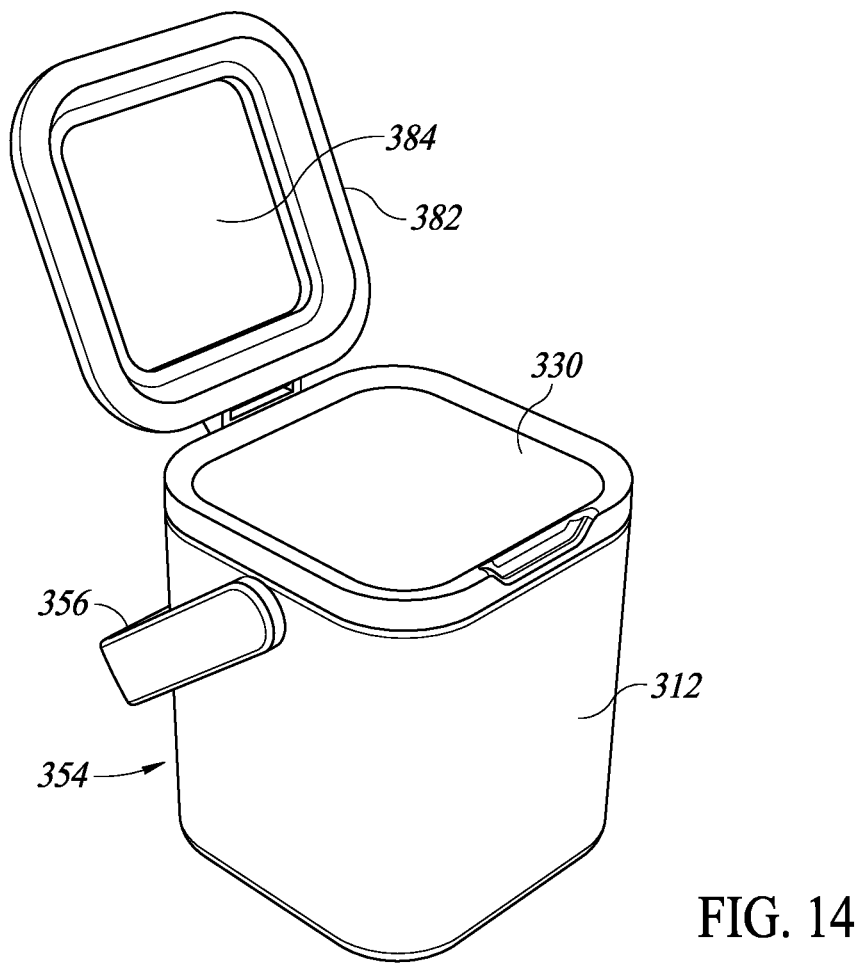
FIG. 14 is an isometric view of a specimen transporter according to one embodiment.
Figure 15:
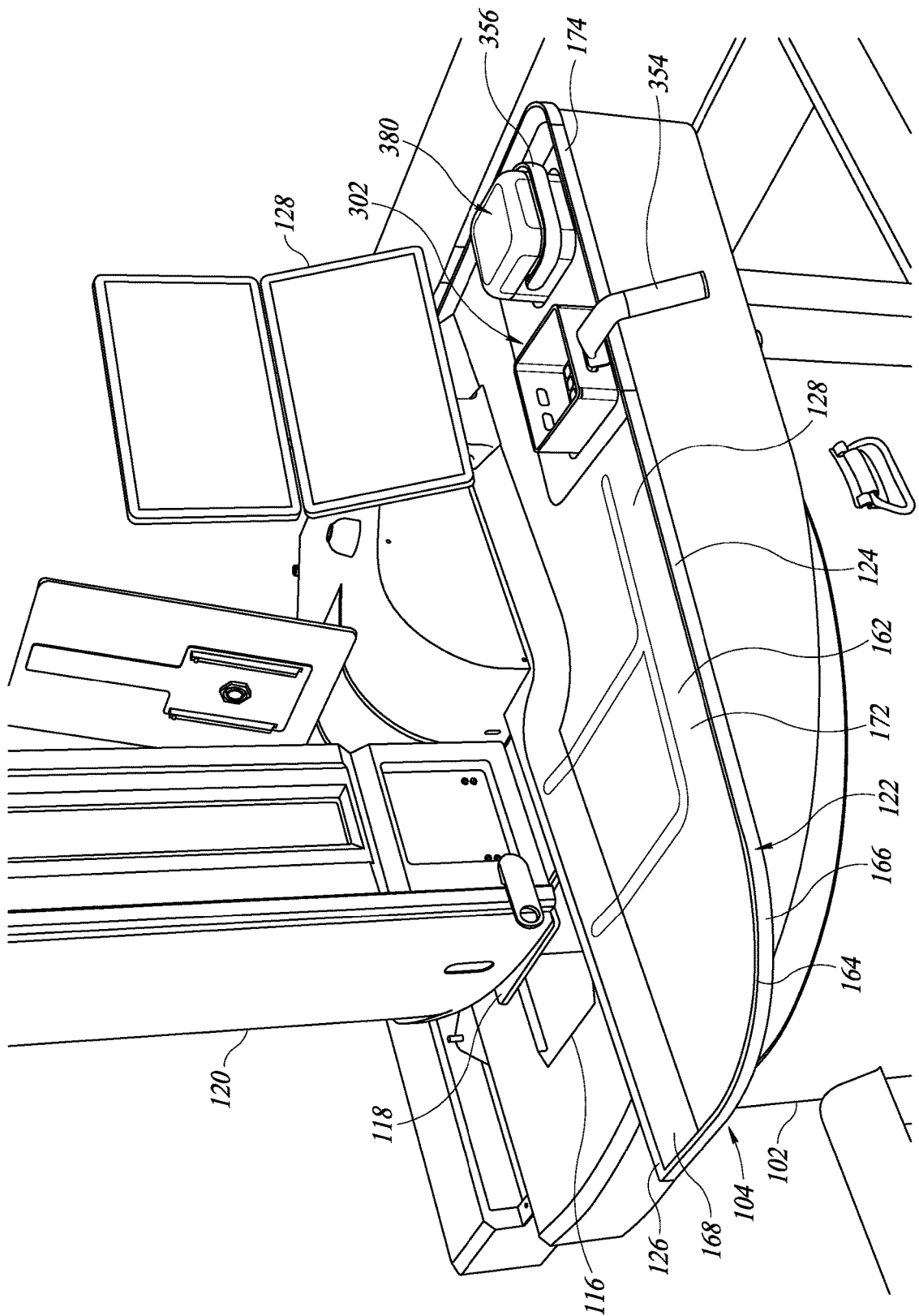
FIG. 15 is a top, front, isometric view of a portion of the cryogenic storage system of FIG. 1, better illustrating the workstation.
Figure 16:
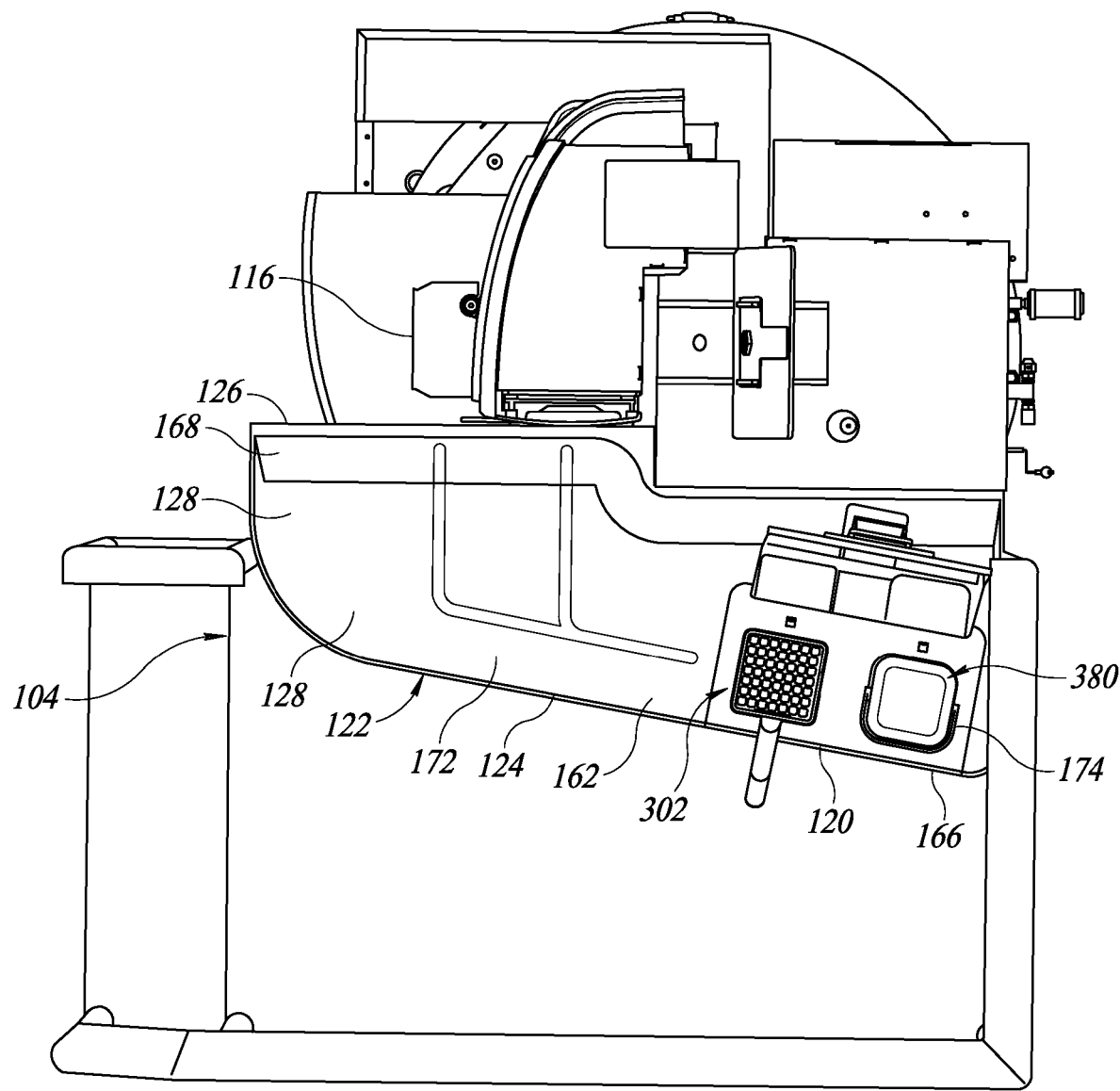
FIG. 16 is a top plan view of the cryogenic storage system of FIG. 1, further illustrating the workstation.

As shown in FIGS. 14 to 16, the specimen transporter 380 may include a handle 356 that is permanently, for example pivotally, coupled to the bulk container 312.

The storage cassettes 302 may be stored in the cryogenic storage tank or freezer 102 in vertical stacks, the vertical stacks also called racks. The stacks or racks of storage cassettes 302 may be annularly arrayed in the cryogenic storage tank or freezer 102 about a central axis of the cryogenic storage tank or freezer 102. The cryogenic storage tank or freezer 102 may include a turntable or conveyer in the interior thereof, on which the stacks or racks of storage cassettes 302 are carried. This allows respective stacks or racks of storage cassettes 302 to be aligned with an opening 116 of the cryogenic refrigerator for placement or removal.

The cryogenic storage tank or freezer 102 may include an opening 116 and a door or cover 118 to selectively open and close the opening 116, to respectively provide access to the interior of the cryogenic storage tank or freezer 102 from an exterior thereof, and to prevent access, as well as seal, for example hermetically seal, the interior from the exterior to maintain the cryogenic temperature in the interior of the cryogenic storage tank or freezer 102.

The stacks or racks of storage cassettes 302 may be selectively placed into the interior of the cryogenic storage tank or freezer 102 for storage at cryogenic temperatures and removed from the interior of the cryogenic storage tank or freezer 102 for use via the opening 116. In some implementations, the storage cassettes 302 are manually removed from the cryogenic storage tank or freezer 102 when needed, and manually placed in the cryogenic storage tank or freezer 102 to store the specimens in the specimen container 300 at cryogenic temperatures.

In other implementations, the cryogenic storage system 100 includes a picker or elevator 120 to automatically remove selected ones of the stacks or racks of storage cassettes 302 from the cryogenic storage tank or freezer 102 when needed, and to automatically place the storage cassettes 302 with the specimen containers 300 in the cryogenic storage tank or freezer 102 to store the specimens in the specimen containers 300 at cryogenic temperatures. The storage and retrieval mechanism (e.g., turntable, picker or elevator) of the cryogenic storage tank or freezer 102 can automatically replicate movements of a human, and hence is denominated as a robot or robotic system. Whether manually moved or automatically moved, it is typically important to minimize exposure of the specimens to temperatures high than about negative 190° C. (e.g., ambient room temperature or about 23° C.).

Referring to FIGS. 15 to 19, the workstation 104 may include a platform 122 that facilitates a transfer of specimen containers, for example the specimen containers 300, into and out of the cryogenic storage tank or freezer 102. For example, the platform 122 may facilitate transfer of one or more of the specimen containers 300 from a vessel with a sealed interior compartment such as the specimen transporter 380, to a storage cassette, for example a storage cassette with an open interior compartment such as the storage cassette 302, or vice versa. According to one embodiment, the workstation 104, including the platform 122, may interface with a conventional commercially available cryogenic automated storage system (e.g., the Bistore III Cryo −190° C. System sold by Brooks Life Sciences)).

As shown in the illustrated embodiment, the platform 122 may include a front 124, a back 126, a work surface 128, and at least one well 130. The at least one well 130 may be recessed in the work surface 128, as shown. The at least one well 130 includes a bottom 132 and at least one sidewall 134 that extends upwardly from the bottom 132. The workstation 104 may include at least a first bucket 136 removably receivable by the at least one well 130 of the platform 122. The first bucket 136 may include a bottom 138, a top 140, at least one sidewall 142 extending from the bottom 138 to the top 140 with an opening 144 at the top 140. The opening 144 may be sized to receive at least partially therein at least one of a cassette or a carrier, for example the storage cassette 302 and/or the specimen transporter 380, that holds an array of specimen containers, for example the specimen containers 300, therein.

The first bucket 136 may include a handle 145 coupled to the least one sidewall 142. The handle 145 may be pivotally coupled such that the handle 145 pivots between a deployed position and an un-deployed position. The first bucket 136 may include at least one stop 147 that limits rotation of the handle 145 at the deployed position. The first bucket 136 may include at least one stop 149 that limits rotation of the handle 145 at the un-deployed position. Alternatively, the handle 145 may be fixed, for example monolithic with, the first bucket 136.

Figure 18:
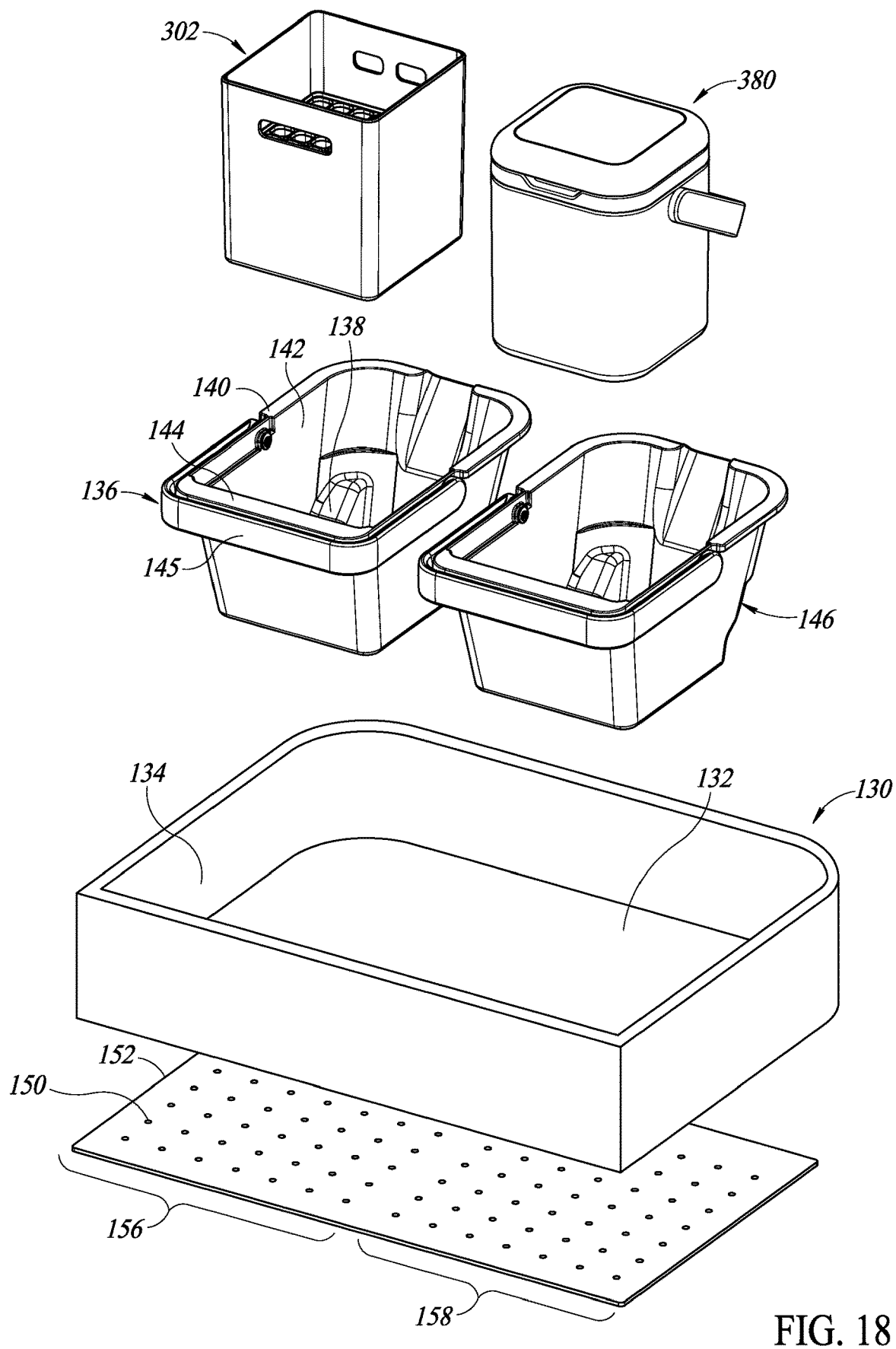
FIG. 18 is an exploded view of a portion of the workstation illustrated in FIG. 17, including the well, the pair of buckets, and arrays of antennas.
Figure 19:
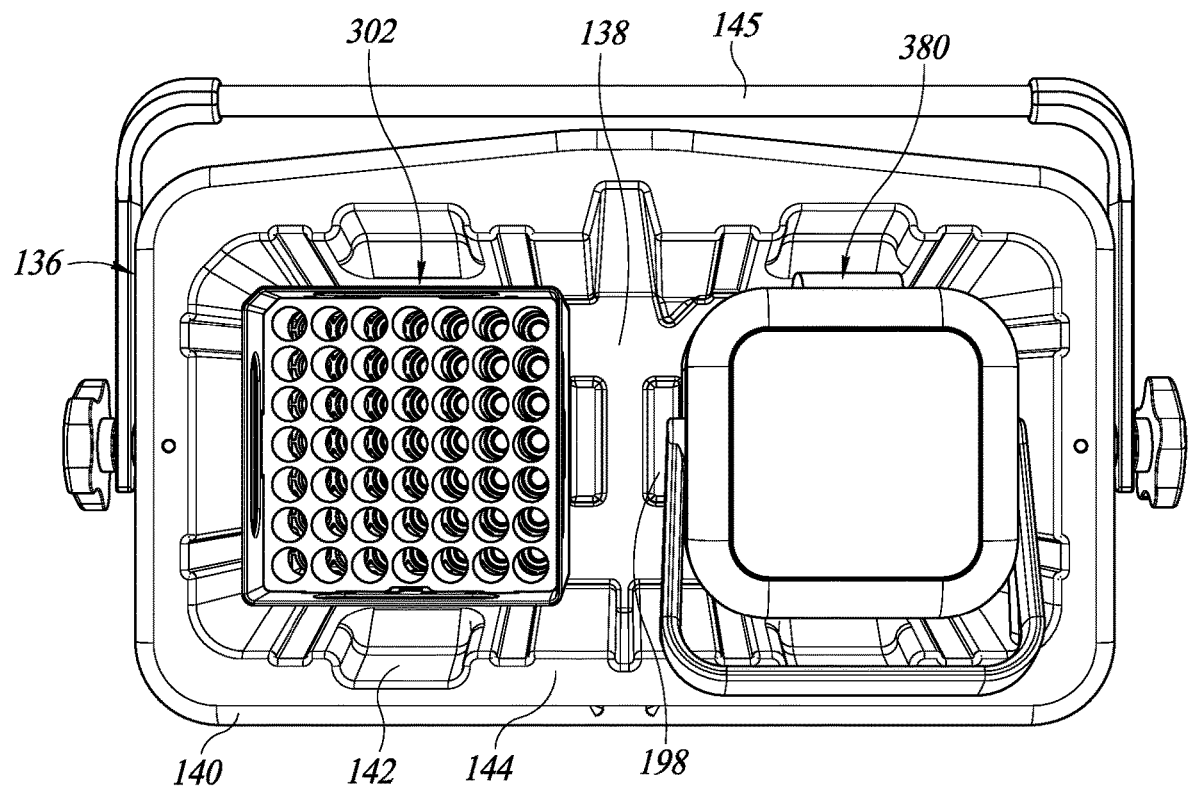
FIG. 19 is a top plan view of a transportation bucket according to one embodiment.

According to one embodiment shown in FIG. 18, the workstation 104 may include the first bucket 136 and a second bucket 146 that are simultaneously, removably, receivable by the at least one well 130 of the platform 122. The first bucket 136 and the second bucket 146 may be identical, and may be able to receive both the storage cassette 302 and the specimen transporter 380 (one at a time each). Alternatively, the first bucket 136 and the second bucket 146 may have different structures, such that the first bucket 136 includes features that correspond to the storage cassette 302 and the second bucket 146 includes features that correspond to the specimen transporter 380. As shown in FIG. 19, the first bucket 136 may be sized to receive multiple storage cassettes, such as one of the storage cassette 302 and one of the specimen transporter 380, simultaneously.

The workstation 104 may include at least one array of antennas 150 positioned beneath the bottom 132 of the at least one well 130. According to one embodiment, the bottom 132 of the at least one well 130 includes an enclosure 154 that receives a printed circuit board 152 that carries the at least one array of antennas 150. Alternatively, the at least one array of antennas 150 may be mounted beneath the at least one well 130 such that the at least one array of antennas 150 is accessible from the surrounding environment, and the bottom 132 of the well 132 may be devoid of the enclosure 154. Alternatively, the enclosure 154 may be attachable to the bottom 132 of the at least one well 130, rather than a part of the bottom 132 of the at least one well 130.

The workstation may include a reader, the reader including the at least one array of antennas 150, such that the reader may perform wireless interrogation of wireless transponders, e.g., passive radio frequency identification (RFID) transponders used to tag respective ones of the specimen containers 300 (shown in FIG. 4). The reader may individually identify the specimen containers 300 via unique identifiers stored by the wireless transponders 308, and locates a respective position of the specimen containers 300 in an arrangement of the specimen containers 300.

The reader may include at least one antenna board positioned under a surface of the workstation 104, such as the bottom 132 of the well 130. The at least one antenna board may include at least one printed circuit board that carries a two-dimensional array of spiral antennas, for example up to a nine-by-nine (9×9) array of spiral antennas (not shown).

As shown, the at least one array of antennas 150 can include a first two-dimensional array 156 of the antennas 150 and a second two-dimensional array 158 of the antennas 150. The antenna board may include a first printed circuit board that carries the first two-dimensional array 156 and a second printed circuit board that carries the second two-dimensional array 158. By virtue of the layout of the first and second arrays of antennas 156, 158 and the mechanical alignment features of the components of the workstation 104 (discussed in detail below), each of the spiral antennas in the first and second two dimensional arrays 156, 158 is positioned to align with a respective position in which a respective specimen container 300 may be located when the workstation 104 is used as described below. The reader may include at least one radio that causes transmission of interrogation signals via the antennas 150 and which decodes unique identifiers from response signals returned by the wireless transponders 308 in response to the interrogation signals.

Figure 20:
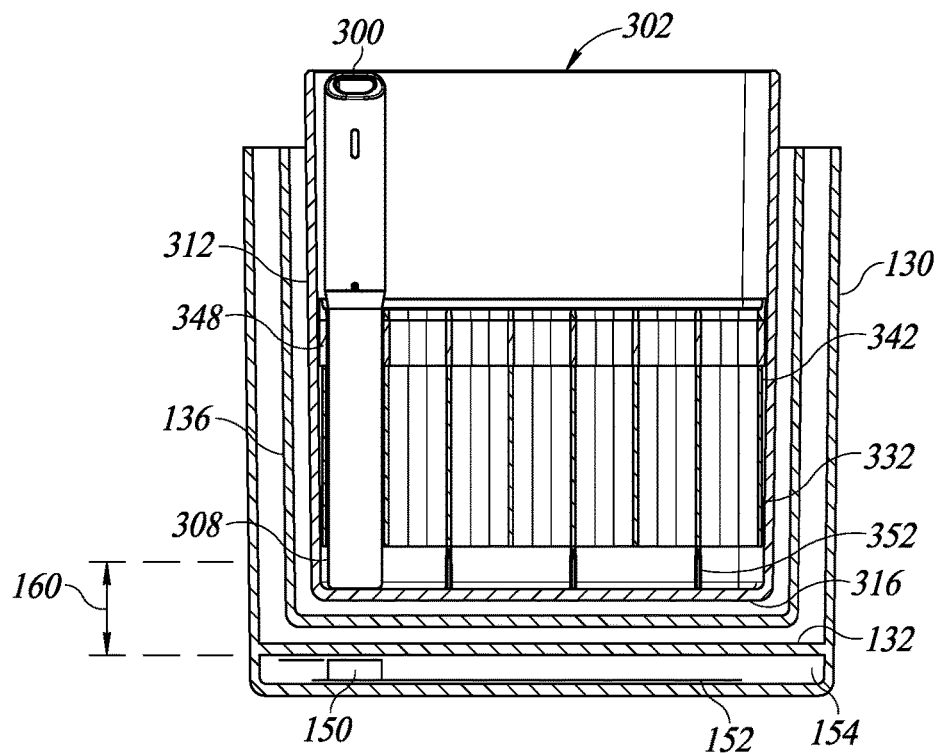
FIG. 20 is a cross-sectional view of the well enclosing the transportation bucket, which encloses the storage container, which supports the specimen container such that the specimen container is aligned with one antenna.

Referring to FIG. 20, the at least one array of antennas 150 (only one shown) may be positioned so as to be within a defined perpendicular distance 160 of a distal end, for example the wireless transponders 308 of the specimen container 300 (only one shown) when the storage cassette 302 or the carrier that supports the specimen container 300 is positioned in the first bucket 136, and the first bucket 136 is positioned within the at least one well 130. The workstation 104 may include a thickness of: the bottom 316 of the bulk container 312, the thermal shunt 332, any support features (such as the set offs 352), the thermally insulative material 342, or any combination thereof, so as to position the specimen container 300 longitudinally such that a bottom portion of the specimen container 300, for example the wireless transponder 308, is within the defined perpendicular distance 160 of a respective one of the antennas 150. According to one embodiment, the defined perpendicular distance 160 is less than 20 mm.

Figure 17:
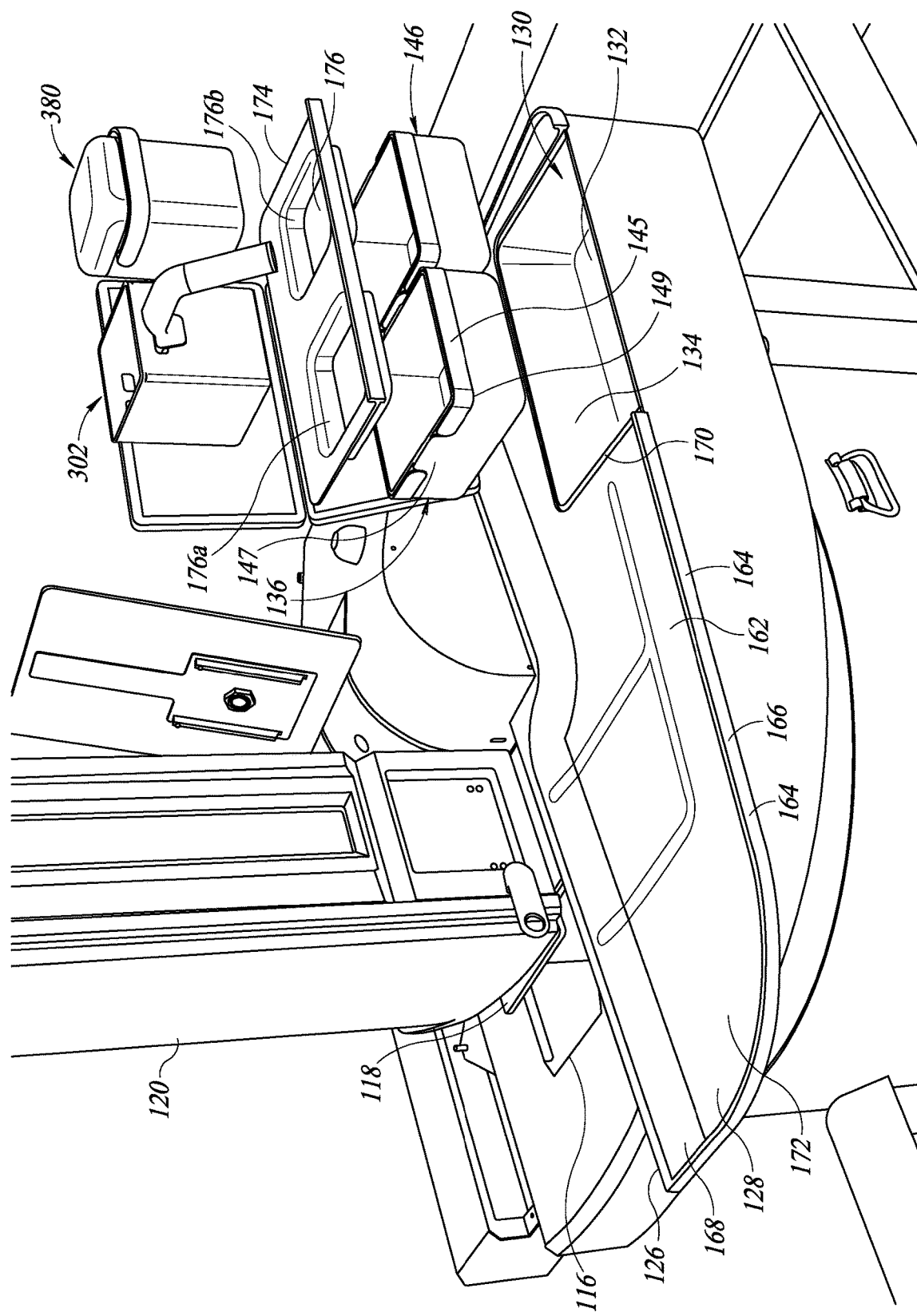
FIG. 17 is a partially exploded top, front, isometric view of the portion of the cryogenic storage system of FIG. 10, better illustrating portions of the workstation including a well, a pair of buckets receivable by the well, and a removable frame.

Referring to FIGS. 15 to 17, the work surface 128 may include a planar portion 162 and a peripheral wall 164 that extends upwardly from the planar portion 162 about at least a portion of a periphery 166 of the work surface 128. A portion of the peripheral wall 164, for example at the back 126 of the platform 122, may include an angled face 168 that slopes downward from the back 126 of the platform 122 towards the front 124 of the platform 122. As shown in the illustrated embodiment, the work surface 128 may provide a path from the opening 116 to the at least one well 130. For example, the storage cassette 302 may exit the cryogenic storage tank or freezer 102 through the opening 116, then slide down the angled face 168, across the planar portion 162 to the at least one well 130, and then be positioned at least partially within the at least one well 130.

The work surface 128 may include a first opening 170. The first opening 170 may serve as an entrance into the at least one well 130. The work surface 128 may include a fixed planar portion 172 and a frame 174. The frame 174 may be selectively removable from the fixed planar portion 172 to expose an interior of the at least one well 130. The frame 174 may include one or more openings 176, for example a first opening 176a and a second opening 176b, that each provide access through the work surface 128 and into the at least one well 130.

As shown, the first bucket 136 and the second bucket 146 may be placed within the at least one well 130 via passage through the at least one opening 170 with the frame 174 removed from the fixed planar portion 172. With the first bucket 136 and the second bucket 146 in position in the at least one well 130, the frame 174 may be positioned adjacent the fixed planar portion 172 such that at least a portion of the first opening 170 is blocked, thereby preventing removal of the first bucket 136 and the second bucket 146 from the at least one well 130. Then a first vessel, for example the storage cassette 302, may be positioned within the first bucket 136 via passage through the first opening 176a, and a second vessel, for example the specimen transporter 380, may be positioned within the second bucket 146 via passage through the second opening 176b.

Figure 21:
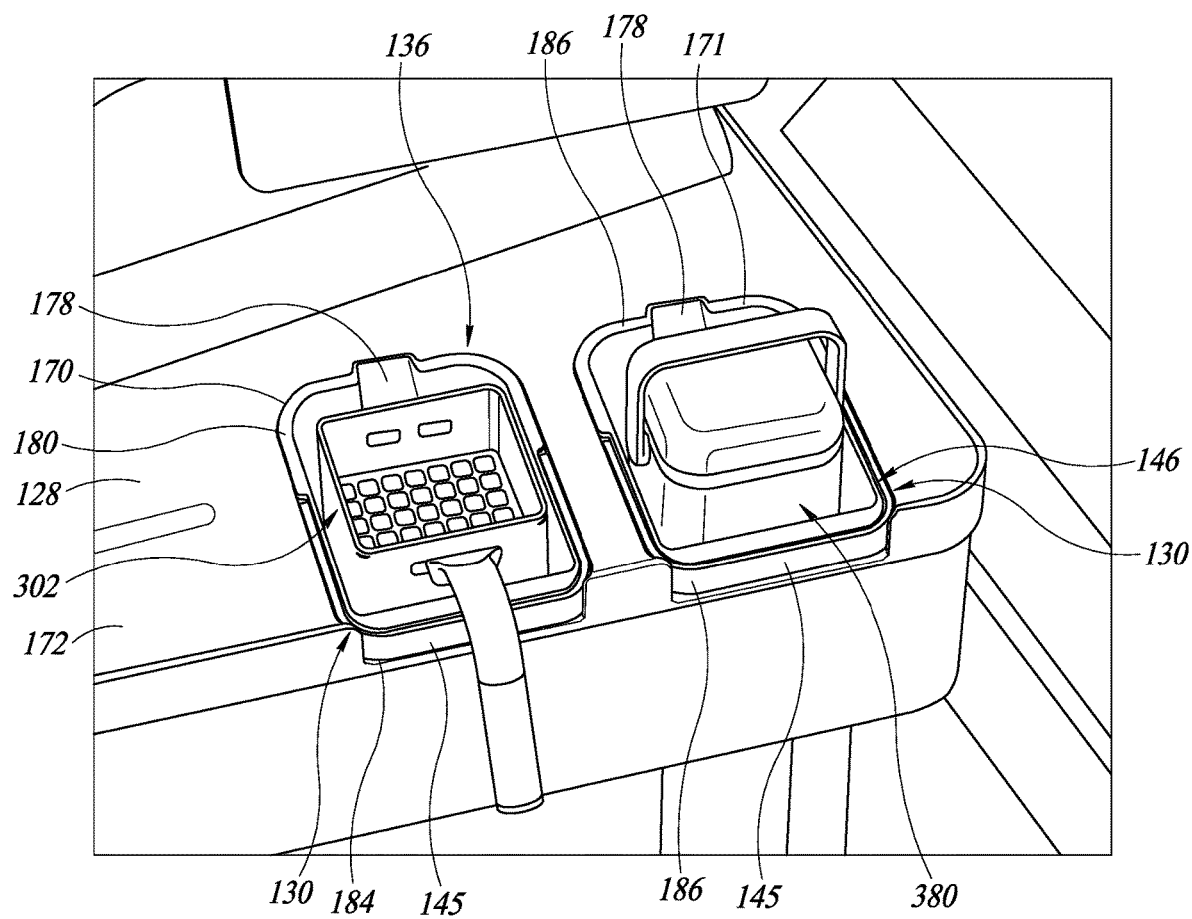
FIG. 21 is a top, front, isometric view of a portion of a cryogenic storage system according to another implementation in which a front peripheral wall includes a pair of breaks therein to accommodate handles of the buckets when the buckets are positioned in the well of the workstation.

Referring to FIG. 21, the work surface 128 may include the first opening 170 and a second opening 171. The first opening 170 and the second opening 171 may be formed in the fixed planar portion 172 of the work surface 128, and the work surface 128 may be devoid of the frame 174 (shown in FIG. 17). The second opening 171 of the work surface 128 may be distinct from the first opening 170 of the work surface 128, as shown. The first opening 170 may be sized to closely receive an outer perimeter of the first bucket 136, and the second opening 171 may be sized to closely receive an outer perimeter of the second bucket 146. The first bucket 136, the second bucket 146, or both may include a spout 178, and the first opening 170, the second opening 171, or both may be shaped so as to correspond to the shape of the spout 178.

As shown, the first bucket 136 may be positioned within a first of the at least one wells 130 via passage through the first opening 170, and the second bucket 146 may be placed within a second of the at least one well 130 via passage through the second opening 171. The first bucket 136 may sit in the first opening 170 such that a top 180 of the first bucket 136 is flush with the work surface 128, and the second bucket 146 may sit in the second opening 171 with a top 182 of the second bucket 146 flush with the work surface 128.

The peripheral wall 164 may have a first opening 184, a second opening 186, or both, each positioned at the front 124 of the platform 122. Each of the first opening 184 and the second opening 186 may be sized to accommodate the handle 145 of a respective one of the first bucket 136 and the second bucket 146 when the respective one of the first bucket 136 and the second bucket 146 is received in the respective one of the at least one well 130 with the respective handles 145 each pivoted to the un-deployed position.

With the first bucket 136 and the second bucket 146 in position in respective ones of the at least one well 130, a first vessel, for example the storage cassette 302, may be positioned within the first bucket 136 via passage through the first opening 170, and a second vessel, for example the specimen transporter 380, may be positioned within the second bucket 146 via passage through the second opening 171.

Referring to FIGS. 22 to 34, the workstation 104 may include one or more alignment structures that facilitate positioning of the specimen containers 300 relative to the one or more array of antennas 150 such that the wireless transponders 308 of each of the specimen containers 300 are readable by a respective one of the antennas 150.

Figure 22:
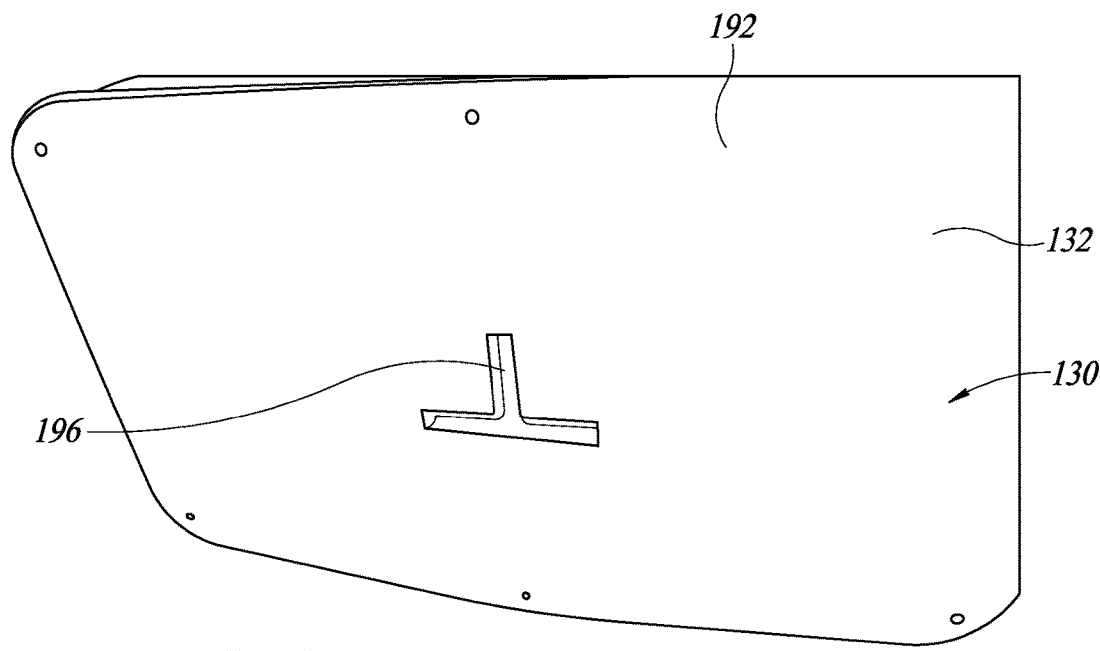
FIG. 22 is a bottom view of the well of the workstation.
Figure 23:
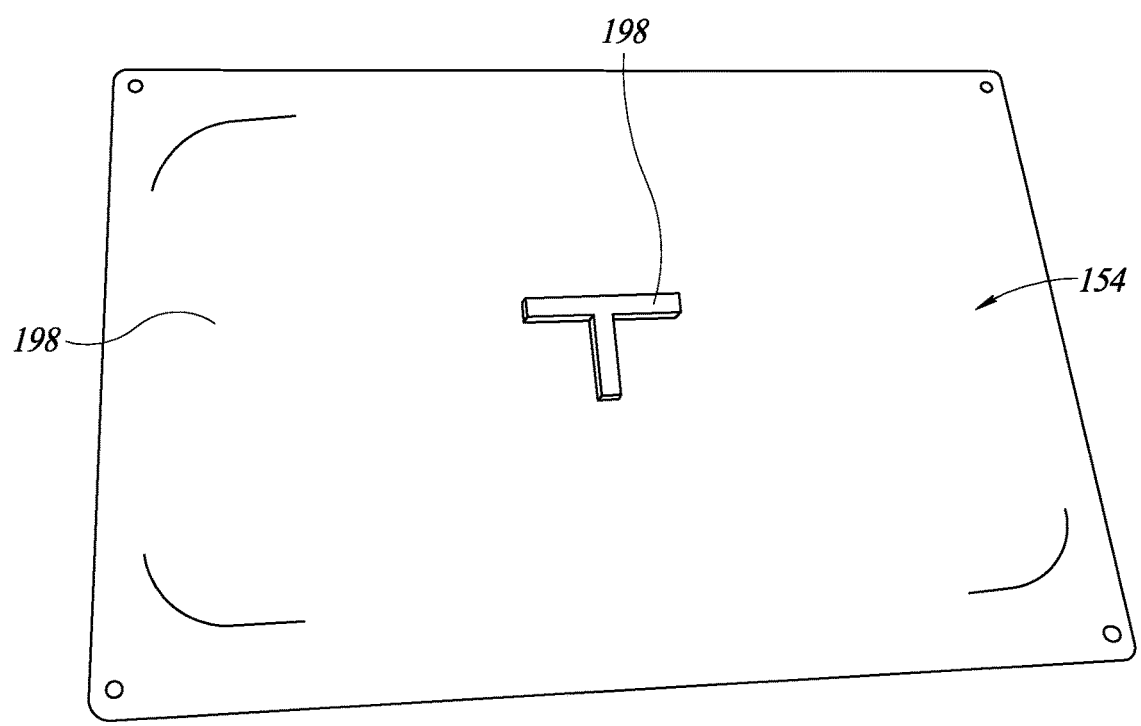
FIG. 23 is a top view of an enclosure for the array of antennas.

Referring to FIGS. 22 and 23 an outer (or top) surface 188 of the enclosure 154, and an outer (or bottom) facing surface 192 of the bottom 132 of the at least one well 130 may include corresponding alignment structures. The alignment structures may be sized and shaped to prevent relative movement between the at least one well 130 and the first bucket 136 along at least one degree of freedom up to six degrees of freedom. For example, the bottom 132 and the outer facing surface 188 may include a projection 194 and corresponding recess 196, such as a T-shaped projection and recess.

Referring to FIGS. 24 to 29, the at least one well 130 may include an alignment structure that corresponds to an alignment structure of the first bucket 136, the second bucket 146, or both. As shown the bottom 132 of the well 130 may include a projection 460, for example in the form of a raised bump, and the bottom 138 of the first bucket 136 may include a corresponding recess 462 that receives the projection 460 and thereby aligns the at least one well 130 and the first bucket 136. If the at least one well 130 is already aligned with the at least one array of antennas 150, the recess 462 that receives the projection 460 will align the first bucket 136 and the at least one array of antennas 150. The projection 460 and the recess 462 may be positioned such that the projection 460 and the recess 462 align the storage cassette 302 with respect to the first bucket 136, and thereby aligns the storage cassette 302 (and any specimen containers within) with the at least one array of antennas 150.

Figure 24:
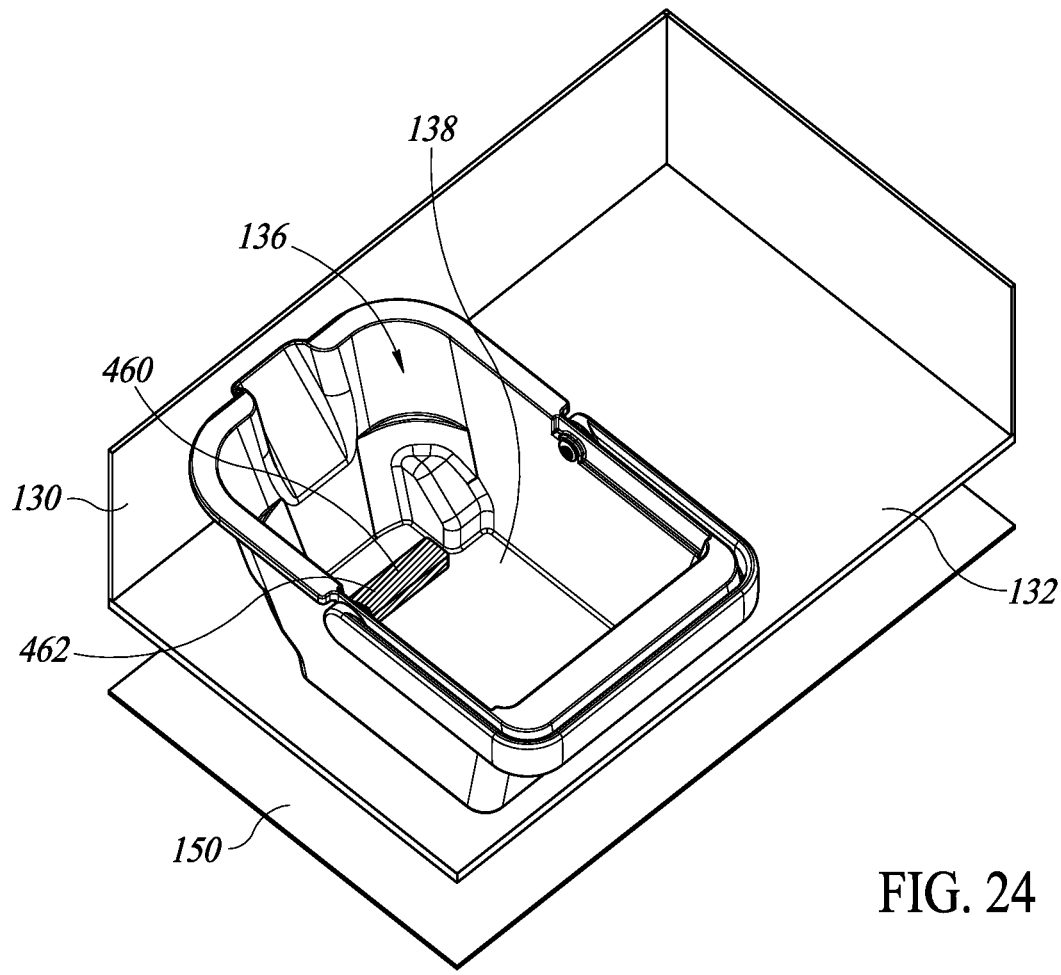
FIG. 24 is an isometric view of a bucket positioned in the well using an alignment structure according to one embodiment.
Figure 25:
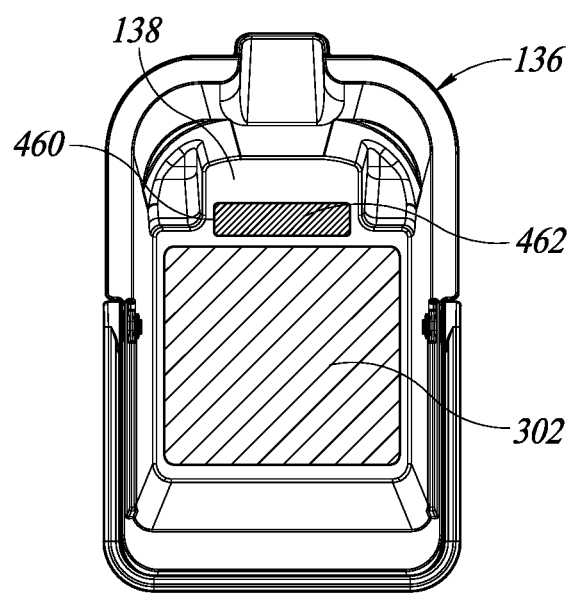
FIG. 25 is a top, plan view of the bucket and alignment structure illustrated in FIG. 24.
Figure 26:
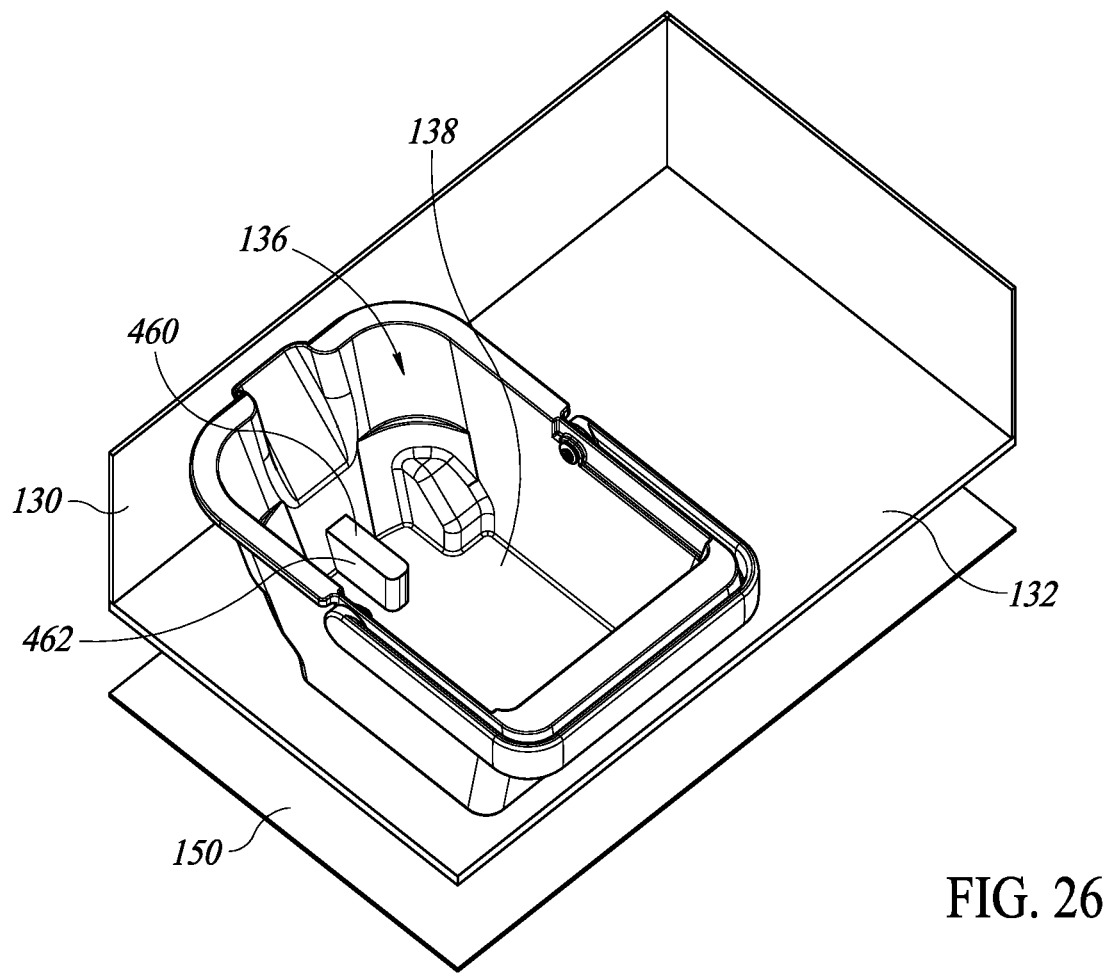
FIG. 26 is an isometric view of a bucket positioned in the well using an alignment structure according to one embodiment.
Figure 27:
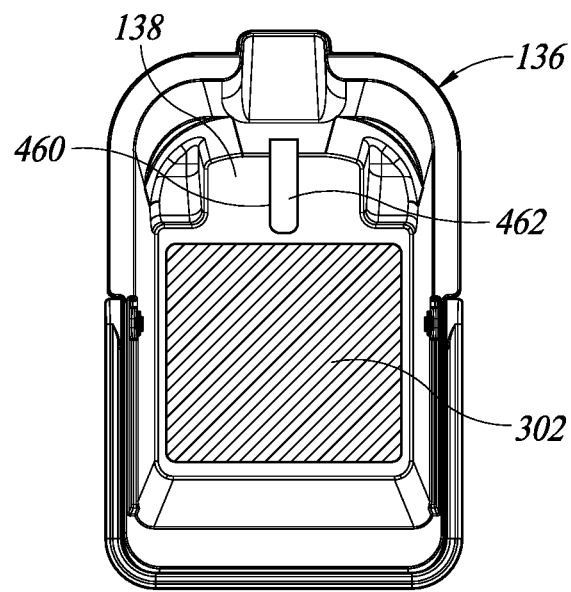
FIG. 27 is a top, plan view of the bucket and alignment structure illustrated in FIG. 26.
Figure 28:
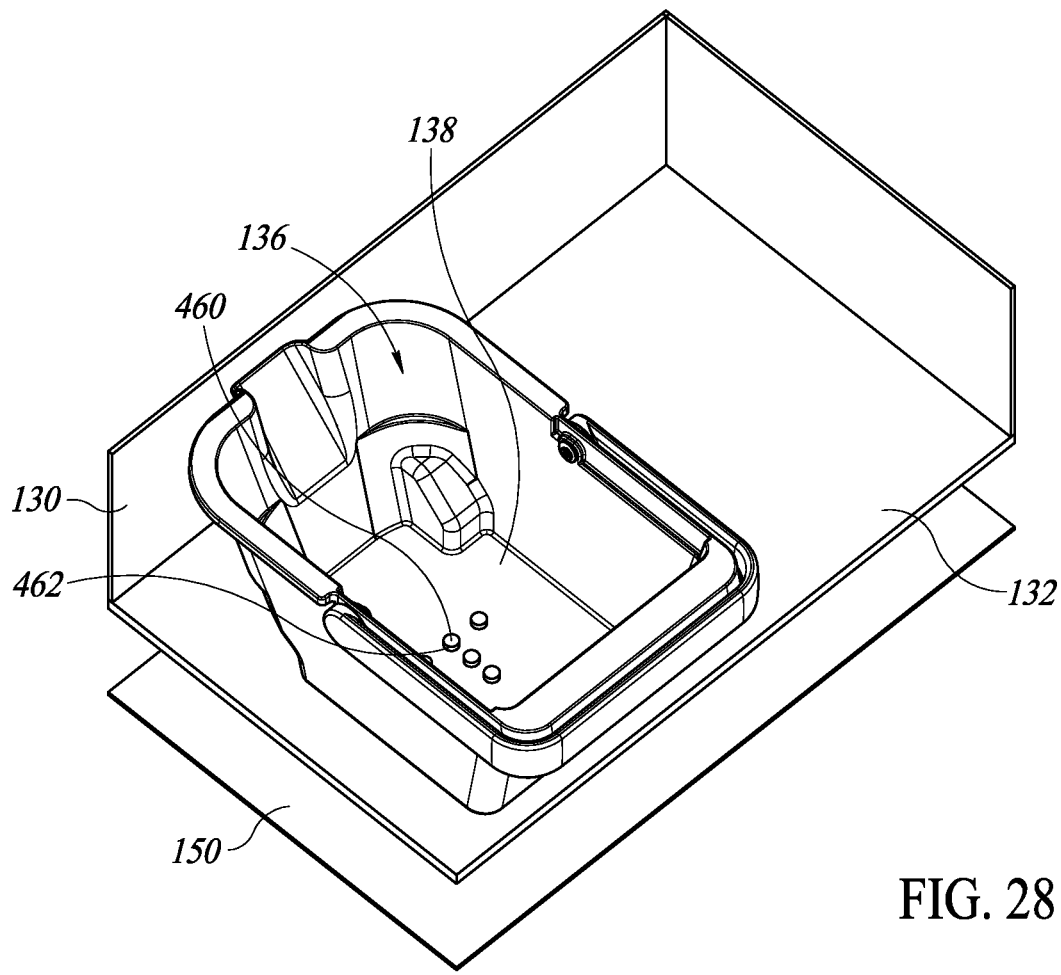
FIG. 28 is an isometric view of a bucket positioned in the well using an alignment structure according to one embodiment.
Figure 29:
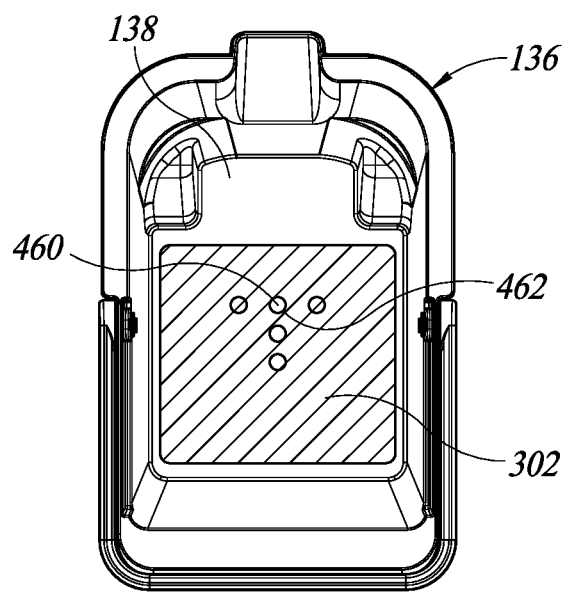
FIG. 29 is a top, plan view of the bucket and alignment structure illustrated in FIG. 28.

As shown in FIGS. 24 and 25, the alignment structure may include a single projection 460 and a single, corresponding recess 462. The projection 460 and the recess 462 may form an "island" surrounded by a planar portion of the bottom 138 of the first bucket 136. As shown in FIGS. 26 and 27, the projection 460 and the recess 462 may form a "peninsula" extending inward from an edge of the bottom 138 with the remaining sides of the projection 460 and the recess 462 surrounded by a planar portion of the bottom 138 of the first bucket 136. As shown in FIGS. 28 and 29, the alignment structure may include a plurality of projections 460 and a corresponding plurality of recesses 462. The projections 460 and the recesses 462 may form a plurality of "islands," for example such that the plurality of projections and recesses form a T-shape.

Referring to FIGS. 18 to 19 and 30 to 31, the first bucket 136, the second bucket 146, or both may include an alignment structure that corresponds to an alignment structure of the storage cassette 302, the specimen transporter 380, or both. As shown, the at least one side wall 142 can be tapered and extend up from the bottom 138 such that an intersection of the at least one side wall 142 and the bottom 138 forms a shape that corresponds to a shape of the outer perimeter of the storage cassette 302, the specimen transporter 380, or both.

As shown in FIGS. 18 and 19, the alignment structure of the first bucket 136, the second bucket 146, or both may include a projection 198 that extends up from the bottom 138. The projection 198 cooperates with the intersection of the at least one side wall 142 and the bottom 138 to form the shape that corresponds to the shape of the outer perimeter of the storage cassette 302, the specimen transporter 380, or both. As shown in the illustrated embodiment, the storage cassette 302 and the specimen transporter 380 may be devoid of a recess that corresponds to the projection 198.

As shown in FIGS. 30 and 31, the alignment structure of the first bucket 136, the second bucket 146, or both may be devoid of the projection 198 (shown in FIGS. 18 and 19) that extends up from the bottom 138. Instead the first bucket 136 may be shaped to block movement of the storage cassette 302 in the direction lacking an abutment at the bottom 138. For example, the first bucket may include a tapered portion 199 that blocks movement of the storage cassette 302 in the direction lacking an abutment at the bottom 138.

Figure 33:
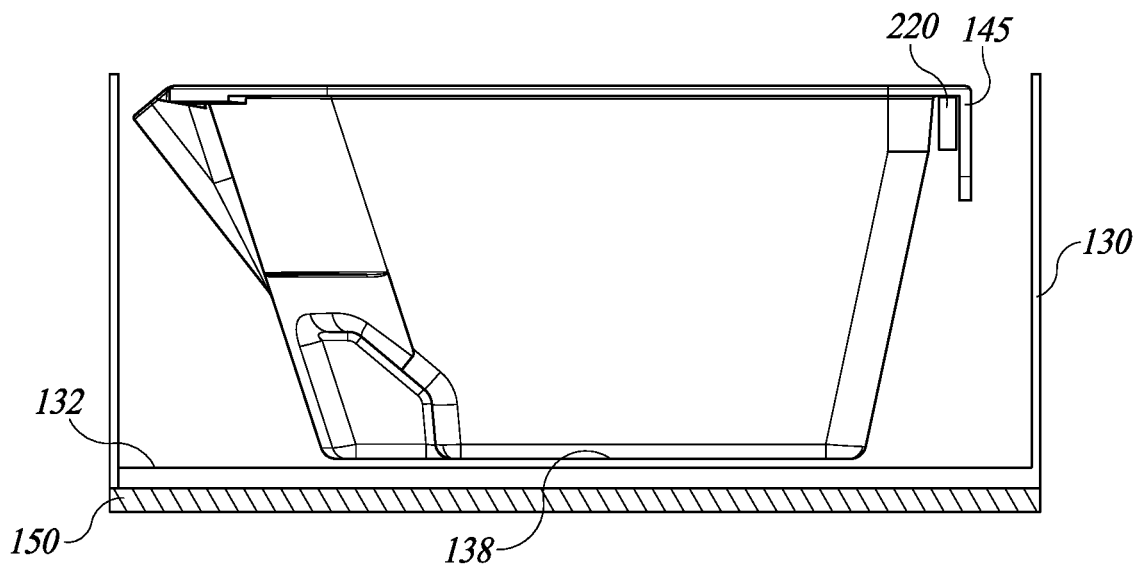
FIG. 33 is a side, elevation view of the bucket positioned in the well using the alignment structure illustrated in FIG. 32.
Figure 34:
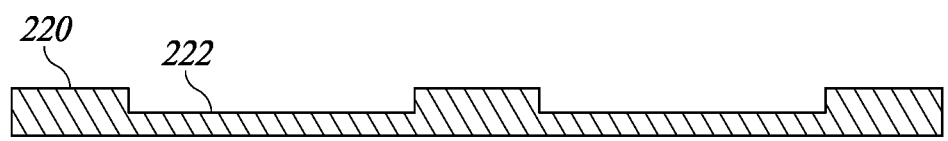
FIG. 34 is a cross-sectional view of the alignment structure illustrated in FIG. 32.
Figure 35:
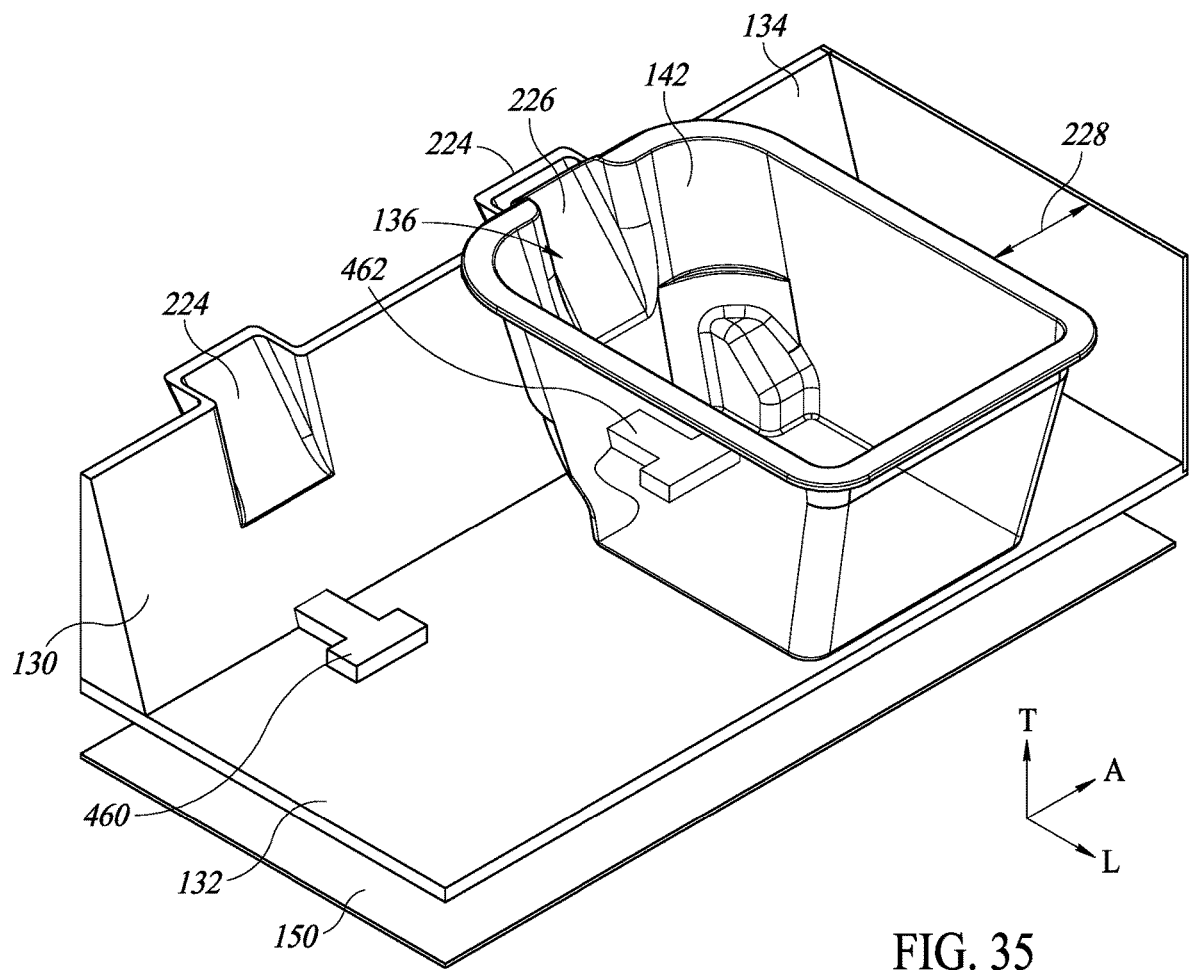
FIG. 35 is an isometric view of a bucket positioned in the well using an alignment structure according to one embodiment.
Figure 36:
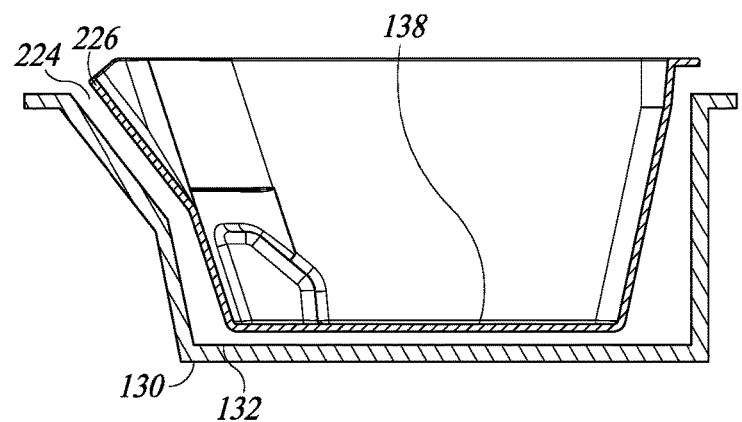
FIG. 36 is a side, elevation view of the bucket positioned in the well using the alignment structure illustrated in FIG. 35.

Referring to FIGS. 32 to 34, the at least one well 130 may include a rail 220 as part of the alignment structure. The rail 220 may be positioned within the at least one well 130, as shown. The rail 220 may include at least one notch 222 that corresponds to a portion of the handle 145 of the first bucket 136. When the portion of the handle 145 is received in the notch 222 the first bucket 136, and any storage cassette contained therein, may be aligned with the array of antennas 150, for example aligned in a first direction L, a second direction A (perpendicular to the first direction L), and a third direction T (perpendicular to both the first direction L and the second direction A).

When the portion of the handle 145 is received in the notch 222, the first bucket 136 may be positioned with respect to the at least one well 130 such that the bottom 138 of the first bucket 136 contacts the bottom 132 of the at least one well 130 and there is no contact between the at least one side wall 142 of the first bucket 136 and the at least one side wall 134 of the at least one well 130. Alternatively, the portion of the handle 145 may be received in the notch 222 such that there is no contact between the bottom 138 of the first bucket 136 and the bottom 132 of the at least one well 130, and there is no contact between the at least one side wall 142 of the first bucket 136 and the at least one side wall 134 of the at least one well 130.

Referring to FIGS. 32 and 33, the at least one sidewall 134 of the at least one well 130 may include an alignment structure, for example a notch 224 that corresponds in shape to a portion of the at least one sidewall 142, for example a spout 226. When the spout 226 is received in the notch 224 the first bucket 136, and any storage cassette contained therein, may be aligned with the array of antennas 150, for example aligned in the first direction L, the second direction A, and the third direction T.

When the spout 226 is received in the notch 224, the first bucket 136 may be positioned with respect to the at least one well 130 such that the bottom 138 of the first bucket 136 contacts the bottom 132 of the at least one well 130 and there is no additional contact between the at least one side wall 142 of the first bucket 136 and the at least one side wall 134 of the at least one well 130, besides the spout 226 and the notch 224. When the spout 226 is received in the notch 224, the first bucket 136 may be positioned with respect to the at least one well 130 such that the bottom 138 of the first bucket 136 contacts the bottom 132 of the at least one well 130 and a portion of the at least one side wall 142 of the first bucket 136, for example a portion opposite the spout 226 with respect to the first direction L, contacts a portion of the at least one side wall 134 of the at least one well 130, for example a portion opposite the notch 224 with respect to the first direction L. Other portions of the at least one side wall 142 and the at least one side wall 134 may be spaced apart by a gap 228.

The alignment structure may include a combination of any of the alignment structures described above. For example, the at least one well 130 may include the notch 224 and the projection 460, for example a T-shaped, "peninsula" projection, and the first bucket 136 may include the spout 226 and the recess 462, for example a T-shaped, "peninsula" recess.

Figure 37:
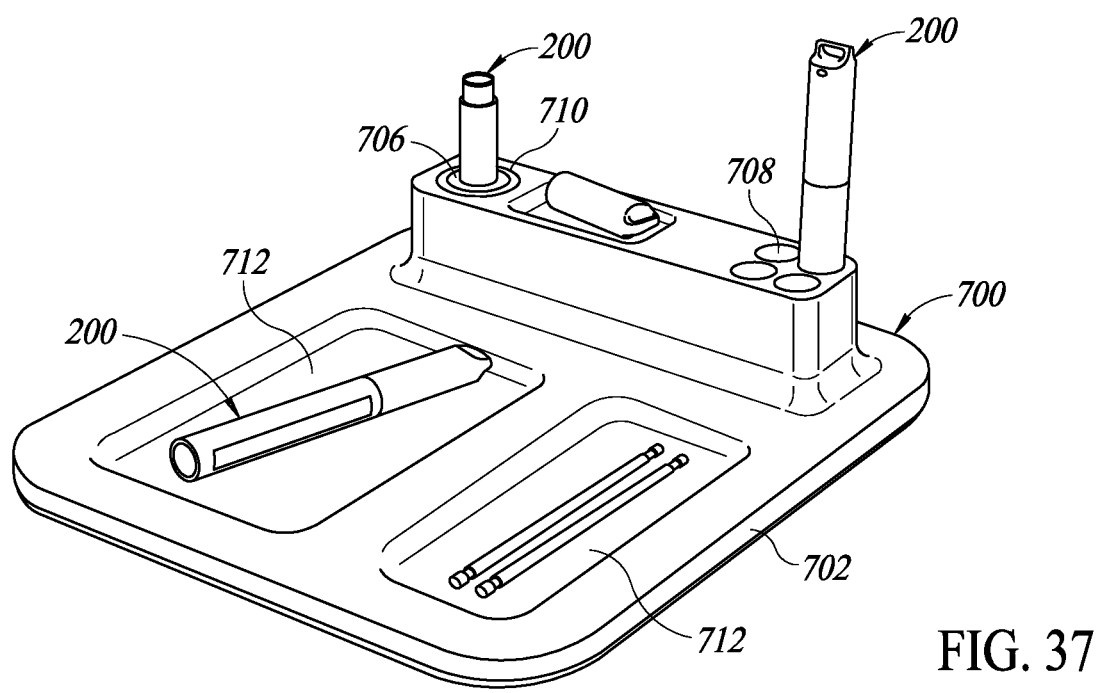
FIG. 37 is an isometric view of a registration tray according to one embodiment.
Figure 38:
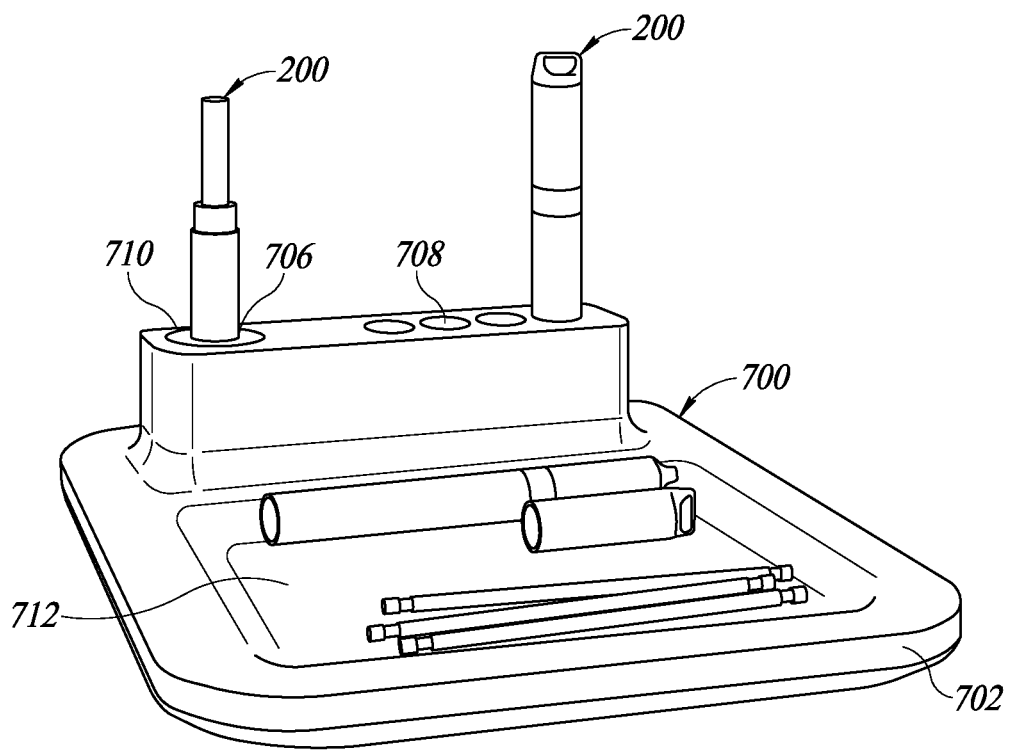
FIG. 38 is an isometric view of a registration tray according to another embodiment.
Figure 39:
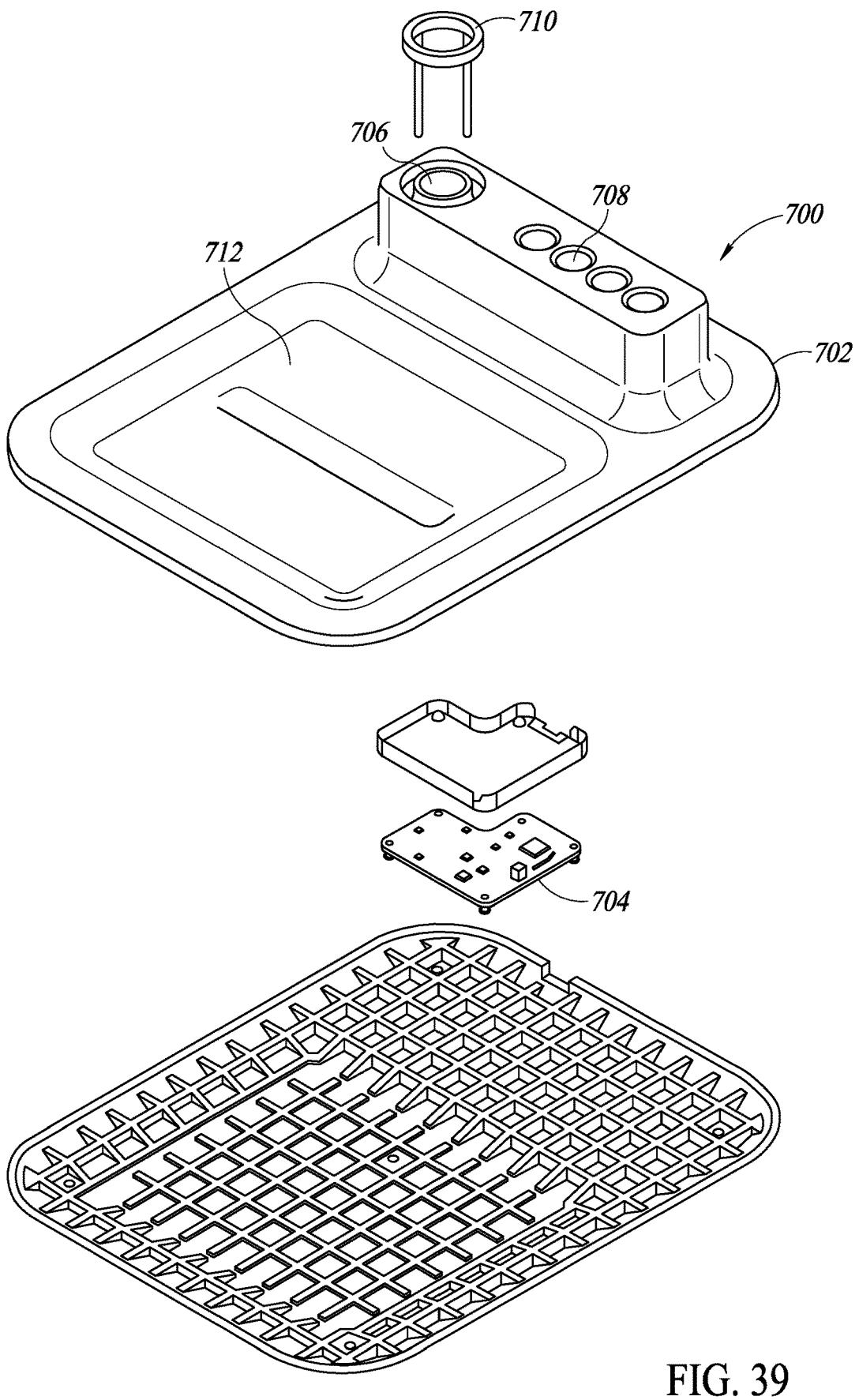
FIG. 39 is an exploded view of a registration tray according to one embodiment.

Referring to FIGS. 37 to 39, the cryogenic storage system 100 may include a registration tray 700 that registers the wireless transponders 208, 308. During a registration process one or more of the wireless transponders 208, 308 (and the respective specimen holders 200, 300, 400 to which the wireless transponders 208, 308 are attached, may be associated with a patient and their biological specimen. The registration tray 700 includes a housing 702 and a printed circuit board assembly 704.

The housing 702 forms a registration recess 706 sized to receive one of the specimen containers 200, 300, 400. The housing 702 encloses the printed circuit board assembly 704 such that the printed circuit board assembly 704 is positioned to identify the wireless transponder 208, 308 of the specimen container 200, 300, 400 that is positioned within the registration recess 706.

The housing 702 may form one or more storage recesses 708 that each hold one of the specimen containers 200, 300, 400 after the specimen holder 200, 300, 400 has been registered. The storage recesses 708 are positioned relative to the printed circuit board assembly 704 so as to not interfere with the registration of the specimen container 200, 300, 400 positioned within the registration recess 706. This allows one or more than one of the specimen containers 200, 300, 400 to kept organized during registration and association with one patient.

The registration tray 700 may include an indicator 710 that visually displays information related to the registration process. For example, the indicator 710 may include a light ring, e.g. positioned around the periphery of the registration recess 706. The light ring may have multiple states which represent different stages of the registration process. The light ring may display a first color when a specimen container is positioned within the registration recess 706, but the specimen container is not yet registered and associated with a patient. The light ring may display a second color when a specimen container is positioned within the registration recess 706, and the specimen container has been registered and associated with a patient.

The registration tray 700 may include one or more depressions 712 formed in the housing 702 to hold portions of a specimen container prior to assembly, registration, or both of the specimen container. The registration tray 700 may be communicatively coupleable, for example via USB, to a processor that assists in the registration process.

Figure 40:
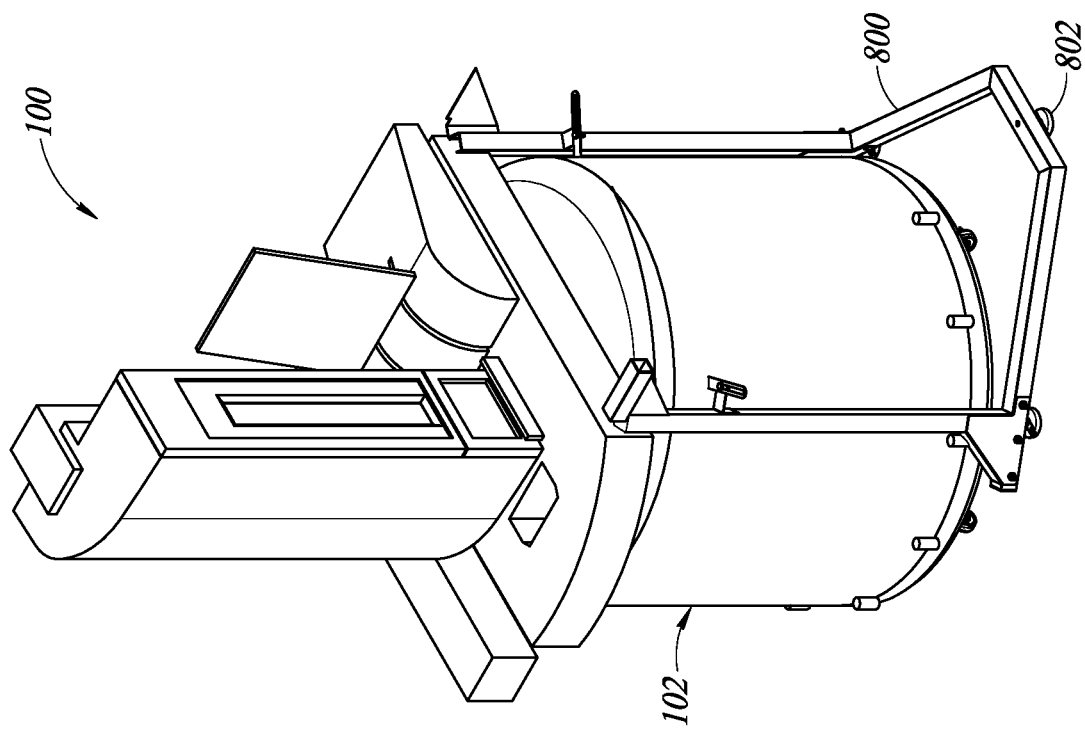
FIG. 40 is an isometric view of the cryogenic storage system illustrated in FIG. 1 during one phase of assembly.

Referring to FIGS. 40 to 46 a method of installing the cryogenic storage system 100 is described. As shown in FIG. 40, the method of installing the cryogenic storage system 100 may include locating a base frame 800 adjacent to the cryogenic storage tank or freezer 102. The base frame 800 may include one or more feet 802 adjustable to level the base frame 800. The base frame 800 may be secured relative to the cryogenic storage tank or freezer 102, e.g. using connectors such as bolts, screws, rivets, etc. or other means such as welding.

For example, the cryogenic storage tank or freezer 102 may include a first bracket 805a mounted to an exterior surface of the cryogenic storage tank or freezer 102. The workstation 104, for example the base frame 800, may include a second bracket 805b. The cryogenic storage system 100 may include a connection pin 807 receivable by the first bracket 805a and the second bracket 805b to releasably secure the workstation 104 to the cryogenic storage tank or freezer 102. According to one embodiment, the first bracket 805a, the second bracket 805b, and the connection pin 807 when received within the first bracket 805a and the second bracket 805b are positioned such that the connection pin 807 is insertable and removable from the first bracket 805a and the second bracket 805b at any stage during the method of installing the cryogenic storage system 100.

The cryogenic storage system 100 may include multiple sets of the first bracket 805a, the second bracket 805b, and the connection pin 807. According to one embodiment, the cryogenic storage system 100 may include two each of the first bracket 805a, the second bracket 805b, and the connection pin 807. According to one embodiment, the cryogenic storage system 100 may include four each of the first bracket 805a, the second bracket 805b, and the connection pin 807.

Thus, the base frame 800 may be coupled to the cryogenic storage tank or freezer 102 and then the rest of the workstation 104 may be assembled as described below. Additionally, the workstation 104 may be assembled while remote from the cryogenic storage tank or freezer 102 and then the assembled workstation 104 may be secured to the cryogenic storage tank or freezer 102, for example via the first bracket 805a, the second bracket 805b, and the connection pin 807. Additionally, a fully assembled workstation 104 may be removed from one cryogenic storage tank or freezer 102 and secured to another cryogenic storage tank or freezer 102.

Figure 41:
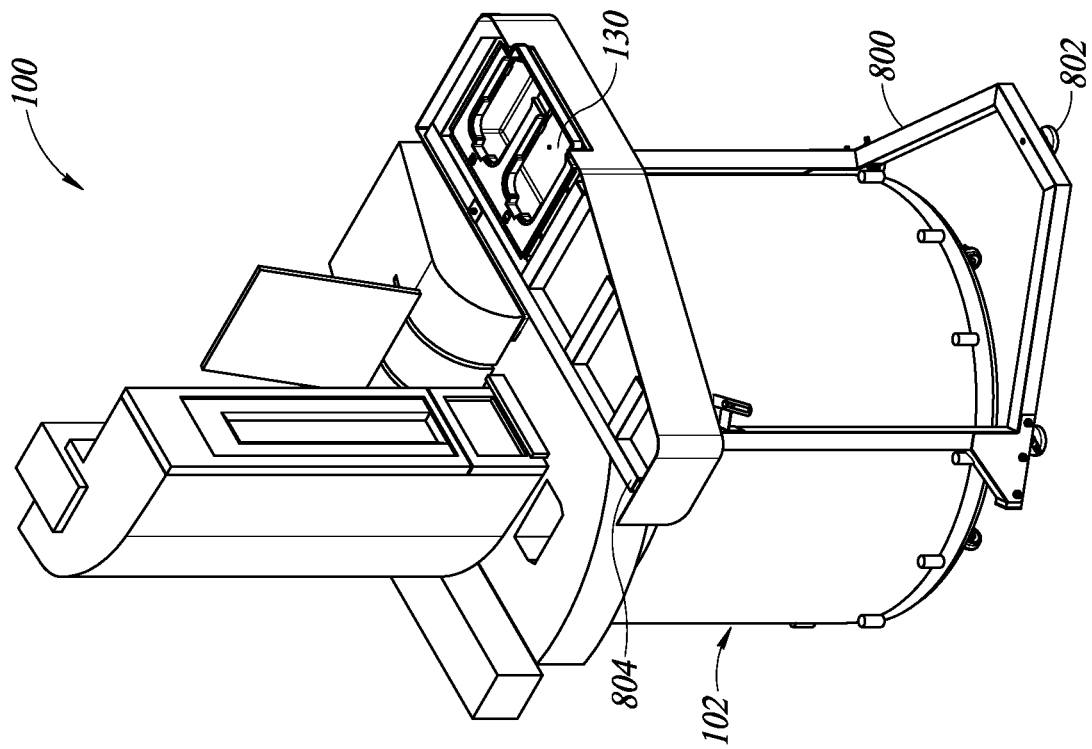
FIG. 41 is an isometric view of the cryogenic storage system illustrated in FIG. 1 during another phase of assembly.
Figure 42:
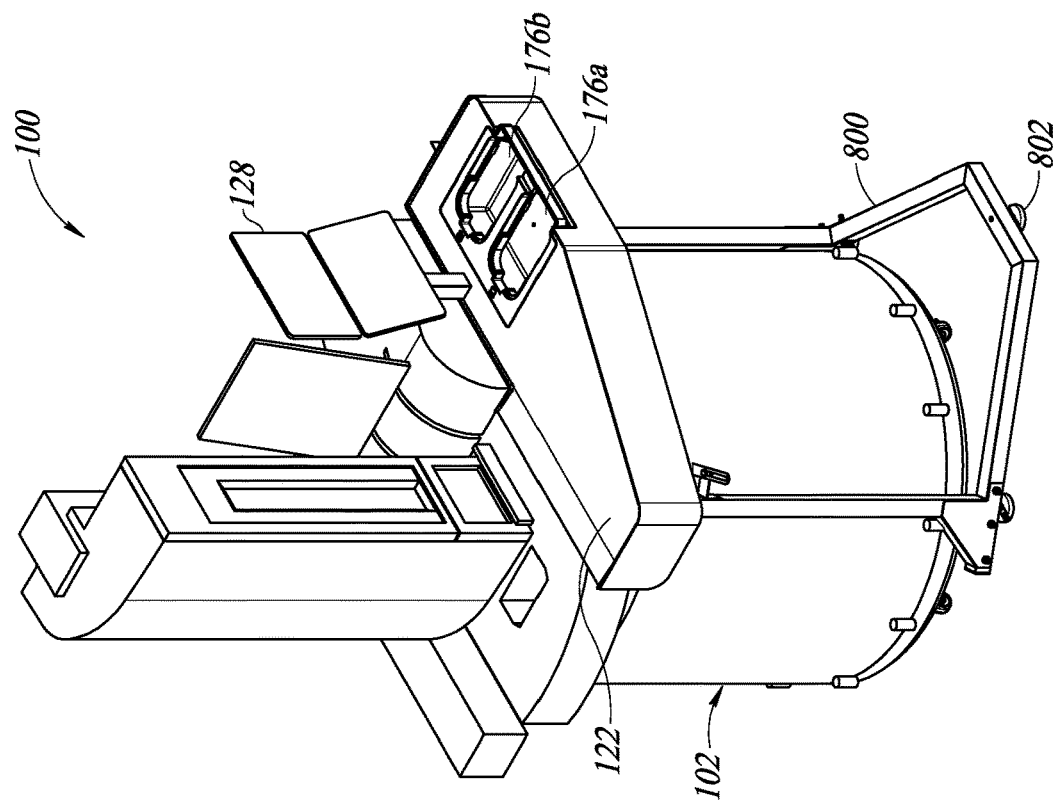
FIG. 42 is an isometric view of the cryogenic storage system illustrated in FIG. 1 during another phase of assembly.

As shown in FIG. 41, the method may include coupling a console frame 804 to the base frame 800. The console frame 804 may include the wells 130. As shown in FIG. 42, the method may include securing the platform 122 to the console frame 804 such that the first opening 176a and the second opening 176b each provide access through the work surface 128 and into the at least one well 130. The display 128 may be secured to the platform 122.

Figure 43:
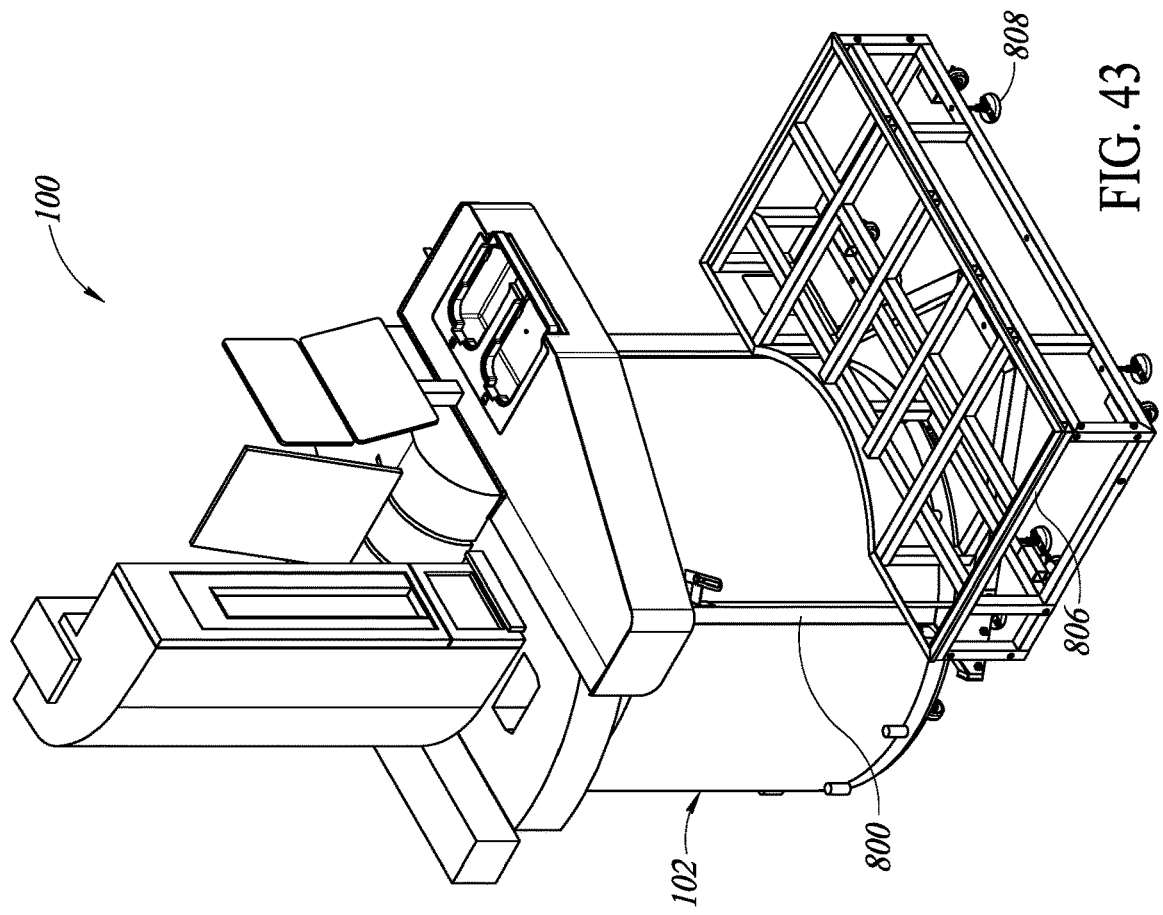
FIG. 43 is an isometric view of the cryogenic storage system illustrated in FIG. 1 during another phase of assembly.
Figure 44:
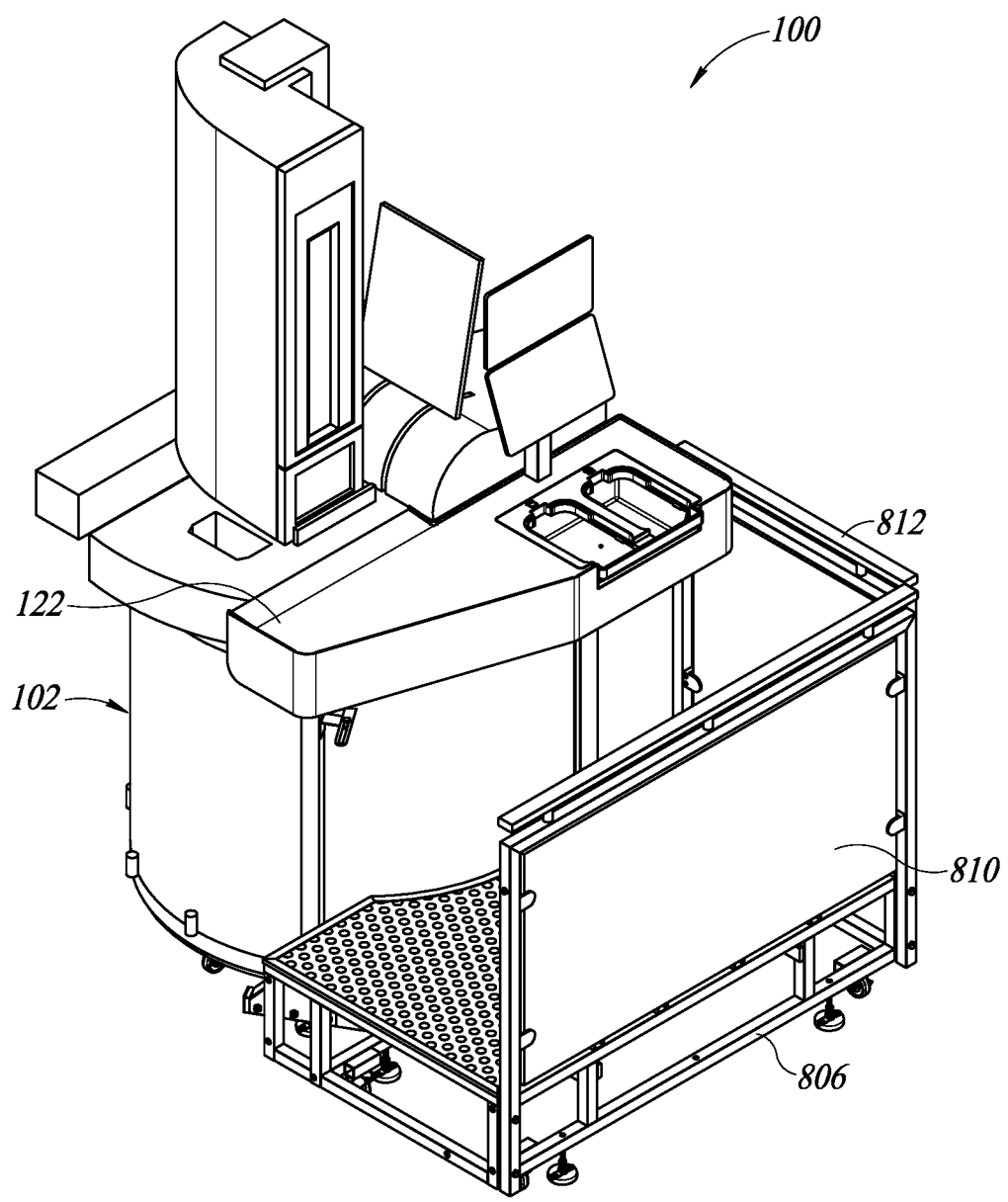
FIG. 44 is an isometric view of the cryogenic storage system illustrated in FIG. 1 during another phase of assembly.
Figure 45:
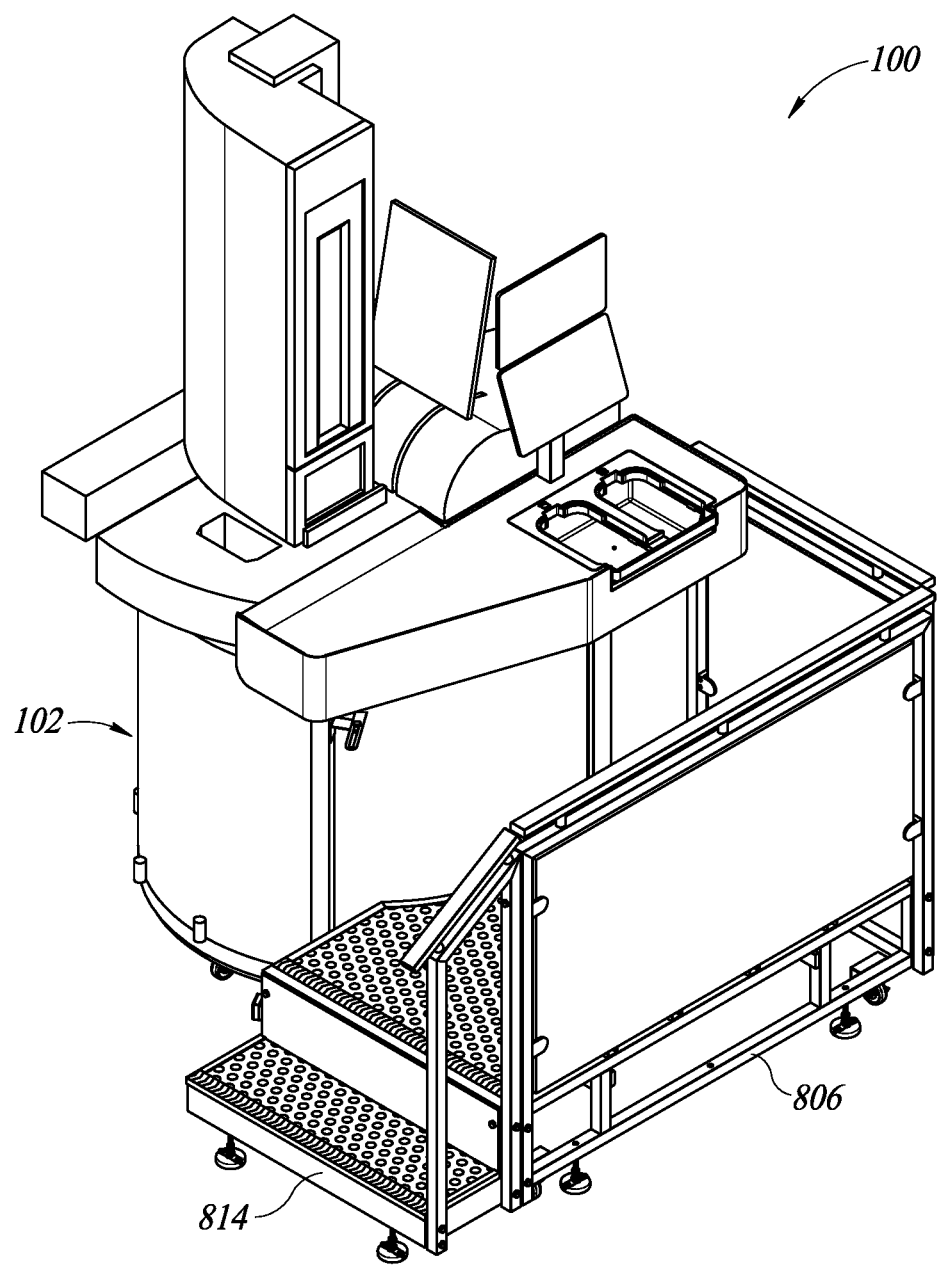
FIG. 45 is an isometric view of the cryogenic storage system illustrated in FIG. 1 during another phase of assembly.
Figure 46:
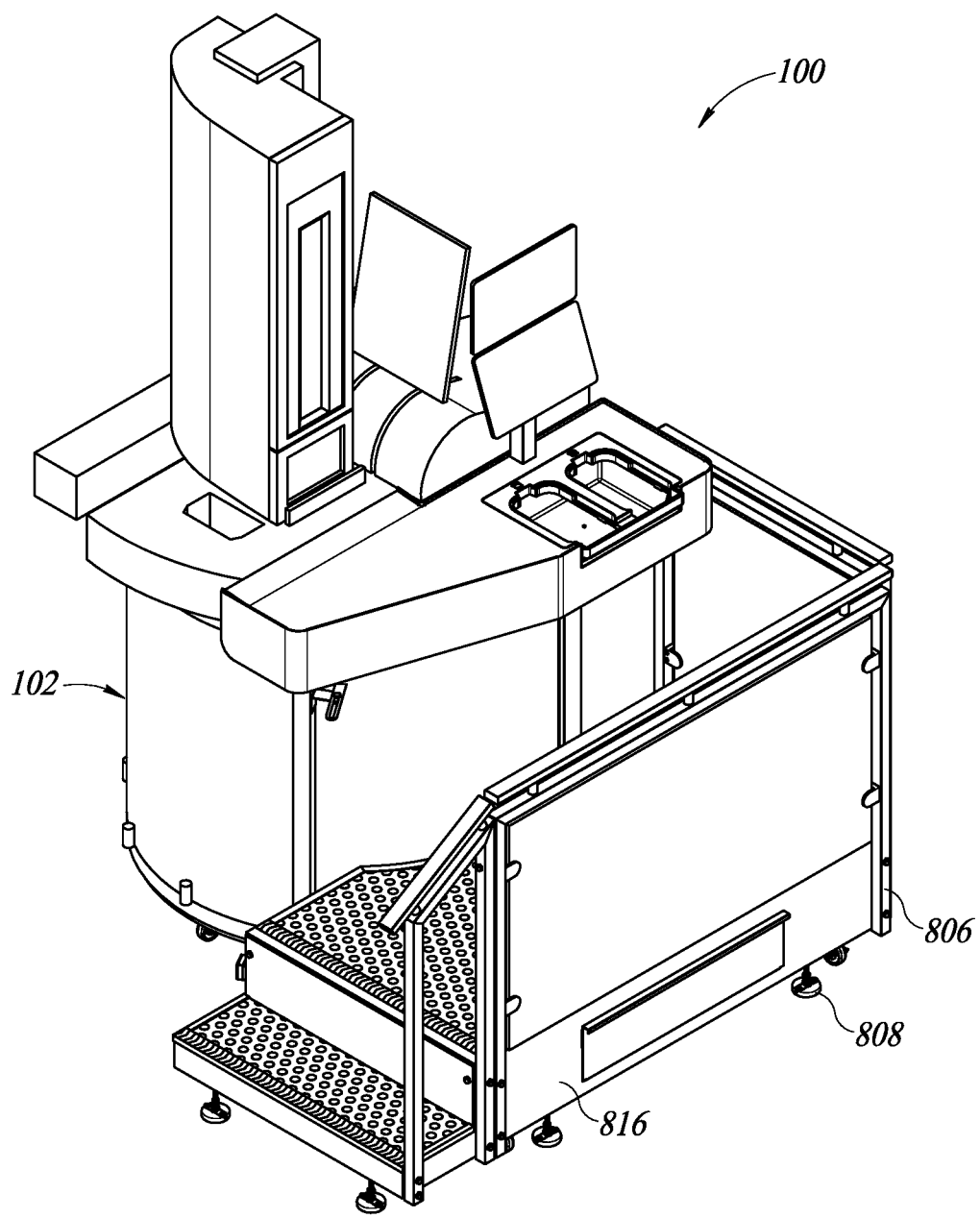
FIG. 46 is an isometric view of the cryogenic storage system illustrated in FIG. 1 during another phase of assembly.

As shown in FIG. 43, a base platform 806 may be coupled to the frame 800 such that an operator standing on the base platform 806 has access to the platform 122. The base platform 806 may include one or more feet 808 adjustable to level the base platform 806. As shown in FIG. 44, the base platform 806 may include a floor 810 that supports the operator accessing the platform 122. One or more guide rails 812 may be secured to the base platform 806 to prevent an operator from falling off of the base platform 806. As shown in FIG. 45, a step 814 may be coupled to the base platform 806. As shown in FIG. 46, side skirts 816 may be coupled to the base platform 806 to enclose the feet 808.

Referring to FIGS. 1 to 40, at least one array of antennas 150 may be operable to read information from one or more wireless transponders physically associated with respective specimen containers 300, storage cassettes 302, and/or specimen transporters 380. As explained in detail herein, the at least one array of antennas 150 may include a two-dimensional array of antennas, and one or more transmitters, receivers, transceivers (collectively radios), operable to cause the antennas 150 to emit interrogation signals and to receive response signals in response to the interrogations signals.

The workstation 104 may include one or more dedicated user interface components (e.g., touch screen display, speakers, microphones), or may employ a user interface component of the cryogenic storage system 100, for example a touch screen display 128.

Portions of the cryogenic storage system 100 may be of a conventional design. For example, the cryogenic storage tank or freezer and/or the picker or elevator may take the form of a commercially available automated storage system (e.g., the Bistore III Cryo −190° C. System sold by Brooks Life Sciences).

Figure 47:
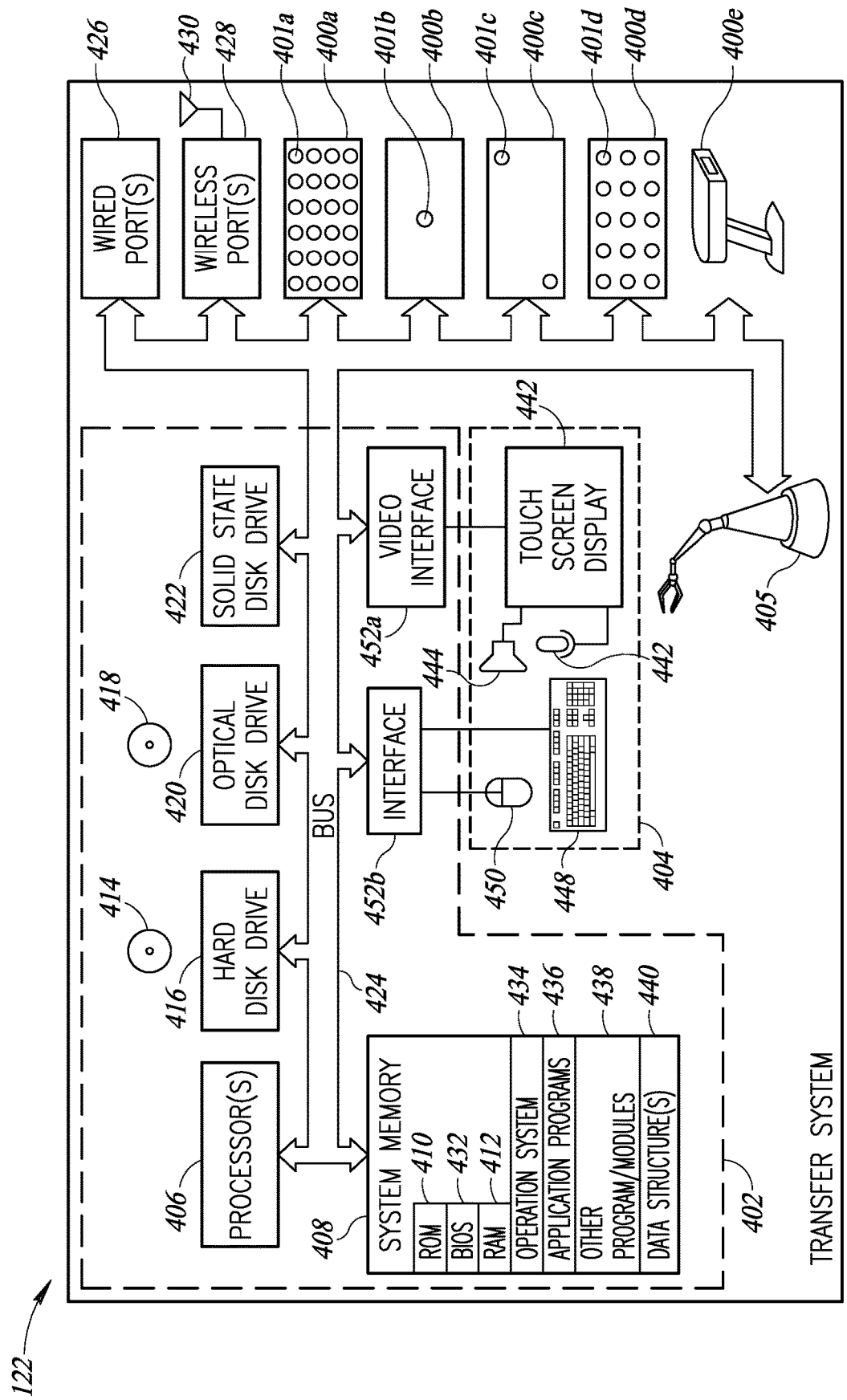
FIG. 47 is a functional block diagram of a processor-based workstation of a cryogenic storage system, according to at least one embodiment.

FIG. 47 shows a processor-based transfer system 122 of, or that interfaces with, the cryogenic storage system 100 of FIG. 1. The processor-based transfer system 122 facilitates transfers, whether automated or manual, of the specimen containers 300 between the storage cassettes 302 and the specimen transporters 380.

The storage cassettes 302 may be designed for long term storage in cryogenic refrigerators (e.g., tanks or dewars), which are typically large and heavy fixtures. The specimen transporters 380 may be designed for temporary storage, in a format that is portable.

Examples of suitable storage cassettes 302, and of the specimen transporters 380, which can temporarily maintain cryogenic materials at cryogenic temperatures, as wells as the specimen containers 200 for use therewith, are described in U.S. patent application 62/900,281, filed Sep. 13, 2019; U.S. patent application 62/880,786, filed Jul. 31, 2019; U.S. patent application 62/879,160, filed Jul. 26, 2019; U.S. patent application 62/741,986, filed Oct. 5, 2018; and U.S. patent application 62/741,998, filed Oct. 5, 2018.

The processor-based transfer system 122 includes one or more readers 400a-400e (five shown, collectively 400), a control subsystem 402, and a user interface system 404. The processor-based transfer system 122 optionally includes one or more robots, for example one or more co-robots 405 (only one shown) that interface with the picker or elevator 120 (FIG. 1) of the cryogenic storage system 100.

The readers 400 may take any of a variety of forms. For example, the processor-based transfer system 122 includes one or more readers 400a-400d that wireless read information stored in the wireless transponders 208, 308 physically associated with the specimen containers 300 and/or the storage cassettes 302 and/or the specimen transporters 380. Such readers 400a-400d each include one more transmitters, receivers or transceivers, collectively and individually referred to herein as radios. Such readers 400 each include one or more antenna 401a-401d (only one antenna called out for each, to prevent clutter of drawing) communicatively coupled to the respective radios, and operable to emit wireless signals (e.g., interrogation signals) and/or to receive wireless signals (e.g., response signals) returned from the wireless transponders 208, 308. The wireless signals are typically in the radio or microwave frequency bands of the electromagnetic spectrum.

Also for example, one or more readers 400e (i.e., machine-readable symbol reader or scanner) may optically read information stored or encoded in one or more machine-readable symbols 210, 310 (e.g., one-dimensional or barcode symbols, two-dimensional or area code symbols) carried by, printed on, or inscribed in the specimen containers 200, 300, the storage cassettes 302, and the specimen transporters 380.

The readers 400a-400e may each include one or more processors, for example, one or more of: one or more microcontrollers, one or more microprocessors, one or more central processing units, one or more digital signal processors (DSPs), one or more graphics processing units (GPUs), one or more application specific integrated circuits (ASICs), one or more field programmable gate arrays (FPGAs), and/or one or more programmable logic controllers (PLCs). The readers 400a-400e may each include one or more nontransitory storage media, for example, one or more nonvolatile storage media and/or one or more volatile storage media, for example one or more of: one or more read only memories (ROMs), one or more random access memories (RAMs), one or more FLASH memory, one or more magnetic disk drives, one or more optical disk drives, one or more solid state drives, one or more cache memories, and/or one or more registers of one or more processors.

In some implementations, the processor-based transfer system 122 includes: a mapping or box reader 400a and associated antenna(s) 401a, a signal specimen container reader 400b and associated antenna(s) 401b, a cassette identification reader 400c and associated antenna(s) 401c, and a bulk reader 400d and associated antenna 401d. The mapping or box reader 400a may include a two-dimensional array of antennas 401a and allows the scanning of a two-dimensional array of positions, which can be used to query or audit the contents of the storage cassette 302, and/or the specimen transporter 830.

The antenna array 150 may, for example, be formed or carried on one side of the printed circuit board 152, while various electrical or electronic components (e.g., inductors, resistors, capacitors) may be carried on the other side if the printed circuit board, thereby providing a substantially flat planner surface that faces the specimen containers during use, and minimizing a distance therebetween (e.g., less than or equal to 2 mm). The signal specimen container reader 400b may be fixed or more preferably handheld, and is operable to read information from the wireless transponders 208, 308 of individual specimen containers 200, 300 for example when the specimen container 200, 300 is removed from one of the storage cassettes, 202, 302.

The antenna(s) 401c of the cassette identification reader 400c are positioned to read cassette identifiers from wireless transponders 208, 308 physically associated with (e.g., attached or fix to or on) the carrier or storage cassettes, 202, 302, for example when the storage cassettes 202, 302, are positioned at one or more stations. The bulk reader 400d may, for example be a handheld, and is operable to read information from respective wireless transponders 208, 308 of all of the specimen containers 200, 300 held by one of the storage cassettes, 202, 302, respectively.

The control subsystem 402 may include one or more processors 406, for example, one or more of: one or more microcontrollers, one or more microprocessors, one or more central processing units, one or more digital signal processors (DSPs), one or more graphics processing units (GPUs), one or more application specific integrated circuits (ASICs), one or more field programmable gate arrays (FPGAs), and/or one or more programmable logic controllers (PLCs). The control subsystem 402 may include one or more nontransitory storage media, for example, one or more nonvolatile storage media and/or one or more volatile storage media, for example a system memory 408 that includes one or more of: one or more read only memories (ROMs) 410, one or more random access memories (RAMs) 412, one or more FLASH memory, one or more magnetic disk 414 and associated drives 416, one or more optical disk drives 418 and associated drives 420, one or more solid state drives 422, one or more cache memories, and/or one or more registers of one or more processors 406. The control subsystem 402 may include one or more communications channels 424 (e.g., buses) that communicatively couple the processor(s) with the storage media. The control subsystem 402 may include one or more communications ports, for example one or more wired communications ports 426, wireless communications ports 428 (e.g., Wi-Fi and/or Bluetooth radios and associated antennas 430; infrared transceivers) that provide for communications between the control subsystem 402 and external devices (e.g., dedicated control system of conventional cryogenic refrigerator system with, or without picker or elevator 120).

The processor(s) 406 of the control subsystem 402 are operable to execute logic, for example to execute one or more algorithms stored as process-executable instructions by the one or more nontransitory storage media. Suitable algorithms are set out herein. Process-executable instructions may, for example, include a basic input/output operating system (BIOS) 432, for example stored in ROM 410. Process-executable instructions may, for example, include an operating system (OS) 434, for example stored in RAM 412 during execution. Process-executable instructions may, for example, include one or more application programs 436, which provide the logic to collect user information, map transfers between storage and carrier cassettes, verify that the specimen containers are at the correct positions in the carrier or storage cassettes, and establish evidence of a chain-of-custody for the same, the applications program(s) stored, for example, in RAM 412 during operation.

Process-executable instructions may include one or more other programs or modules 438, for example to provide for communications with external devices and/or to control operation of co-robot(s) 405, and which may be stored, for example, in RAM 412 during execution. One or more data structures 440 may store information, for example information that identifies specific users, identifies specific clinicians, identifies specific patients, identifies specific procedures, identifies specific specimen containers and associates the specific specimen containers with specific patients, and that maps specimen containers to respective storage cassettes and/or carrier cassettes. The data structures 440 may take a variety of forms including databases, data sets, records and fields, tables, linked lists, trees, binary trees, etc. The data structures 440 may be stored, for example, in RAM 412 during execution.

The processor(s) 406 of the control subsystem 402 are communicatively coupled operable (e.g., wired, optical, wireless or radio) to receive information from the readers 400a-400e, and optionally to control operation of one or more of the readers 400a-400e. The processor(s) 406 of the control subsystem 402 are also operable to receive user input from, and provide user out to, one or more user interface devices of the user interface system 404, to allow a human user to interact with the processor-based transfer system 122.

The user interface system 404 may, for example, include one or more of: one or more display screens, one or more touch-sensitive display screens 442, one or more speakers 444, one or more microphones 446, one or more keyboards 448, one or more pointer devices 450 (e.g., computer mouse, trackpad, trackball), one or more haptic interfaces. The user interfaces 406 are communicatively coupled (e.g., wired, optical, wireless or radio) with the processor(s) via one or more peripheral interfaces 452a, 452b to provide user input to the processor(s) 406 and to receive output from the processor(s) 406 to be presented to a user. In particular, the processor(s) 406 may execute processor-executable instructions that cause the processor(s) to cause devices to present a user interface (e.g., a graphical user interface), for instance via a touch screen display 442. Various user interface elements are illustrated and described herein.

In at least some implementations, the cryogenic storage system 100 may be designed to operate with existing lab equipment, for example with conventional specimen containers (e.g., FluidX™ 24-Format tubes, FluidX™ 48-Format tubes FluidX™ 96-Format tubes available from Brooks Life Sciences) or with plates or racks (e.g., 5¼ inch by 5¼ inch plates or wells, Vision Plate™ 96 Well plate, Vision Plate™ 24 Well plate, 10×10 Cryo Rack rack, 14×14 Cryo Rack rack available from Brooks Life Sciences). Designing the cryogenic storage system 100 to operate with existing lab equipment places a number of constraints on the structure as well as the operation. For example, a two-dimensional array of antennas must be designed to successfully interrogate RFID transponders array in the various available formats. This can place limits on the size (e.g., coil size) of the antennas used to interrogate and received response signals from RFID transponders.

Smaller antennas typically reduce the range, which may require higher transmit power to compensate for the loss of range. This may be particularly true where the antennas of the wireless transponders are subject to extremely cold temperatures, for instance when the wireless transponders are immersed in a liquid nitrogen bath, while antennas of a reader are at room temperature. Also, relatively close spacing dictated by conventional equipment formats can increase the amount of cross-talk during interrogation, where an interrogation signal from one antenna excites and elicits response signals from more than one wireless transponder. Cross-talk may also increase with increasing transmit power, for instance where antenna size must be small, for instance to accommodate a spacing dictated by conventional spatial formats. The user of existing wireless transponders and readers (e.g., RFID interrogators or RFID readers) can also require specific accommodations to be made in structure and/or operation. For example, RFID readers typically employ automatic gain control.

The cryogenic storage system 100 comprise: a plurality of antennas spatially arrayed in a two-dimensional array of antennas, the two-dimensional array of antennas having a set of dimensions or orders (e.g., 2×2, 3×3, 5×5, 4×6, 7×7, 9×9, 8×12). One or more radios are communicatively coupled to drive the antennas to emit interrogation signals to interrogate the wireless transponders and to receive response signals from any of the wireless transponders in a range of one or more of the antennas. There may for example be a single radio which is multiplexed to the various antennas. Alternatively, there may be one radio per antenna. Alternatively, the antennas may be grouped into sets, for instance four sets, and one radio per set, multiplexed to the antennas of the respective sets.

In some instances the radios are transmitters, in some the radios are receivers, and in yet other instances the radios are transceivers. A processor-based control system is communicatively coupled to the radio(s). The processor-based control system determines, based on response signals received in response to a given interrogation, whether at least one of the wireless transponders is located at an expected position of one of the storage or the transfer cassettes. In response to a determination that the at least one of the wireless transponders is not located at the expected position of one of the storage or the transfer cassettes the processor-based control system causes a signal indicative of an occurrence of an unexpected condition to be provided. To cause a signal indicative of an occurrence of an unexpected condition to be provided, the processor-based control system may cause a visual prompt to be presented and/or cause a signal to be provided to a robot that causes the robot to make a movement.

For each response signal received in response to a given interrogation, the processor-based control system may determine which response signal was returned from one of the wireless transponders that is closest wireless transponder to the antenna that emitted the respective interrogation signal to which the wireless transponders are responding. For example, for each response signal received in response to a given interrogation, at least one of the processor-based control system or the at least one radio may normalize a respective received signal strength indicator (RSSI) value that indicates a received signal strength of the response signal to account for any automatic gain adjustment introduced by the at least one radio.

For instance, for each interrogation, the processor-based control system determines which of the respective normalized RSSI values for the response signals received in response to a given interrogation has the largest absolute value. To determine which of the respective normalized RSSI values for the response signals received in response to a given interrogation has the largest absolute value for each interrogation, the processor-based control system may compare the respective normalized RSSI values for the received response signals to one another.

To determine which response signal was returned from one of the wireless transponders that is closest wireless transponder to the antenna that emitted the respective interrogation signal to which the wireless transponders are responding, the processor-based control system may further compare a respective read rate to one another for each of the wireless transponders that respond, the respective read rate representative of a total number of times the respective wireless transponder is read per a unit of time. To determine which response signal was returned from one of the wireless transponders that is closest wireless transponder to the antenna that emitted the respective interrogation signal to which the wireless transponders are responding, the processor-based control system may additionally or alternatively further compare a respective response time to one another for each of the wireless transponders that respond, the respective response time representative of an amount of time the respective wireless transponder takes to initially respond to the interrogation.

Before the processor-based control system determines whether at least one of the wireless transponders is located at an expected position of one of the storage or the transfer cassettes, the processor-based control system may further cause a prompt to be presented which indicates a position of one of the storage or the transfer cassettes from which to transfer one of the specimen containers along with the wireless transponder associated therewith and a position of the other of the storage or the transfer cassettes to which to transfer the specimen container, the expected position being the position of the other of the storage or the transfer cassettes to which the specimen container is to be transferred.

The processor-based control system may further determine, based on response signals received in response to one or more interrogations, whether there are any specimen containers marked by respective ones of the wireless transponders in an unexpected position in one of the storage or the transfer cassettes, and in response to a determination that there is at least one specimen container marked by respective one of the wireless transponders in an unexpected position in one of the storage or the transfer cassettes, cause a signal indicative of an occurrence of an unexpected condition to be provided.

The processor-based control system may further determine, based on response signals received in response to one or more interrogations, whether there are any specimen containers marked by respective ones of the wireless transponders that are missing from the one of the storage or the transfer cassettes, and in response to a determination that there is at least one specimen containers marked that is missing from the one of the storage or the transfer cassettes, cause a signal indicative of an occurrence of an unexpected condition to be provided. To cause a signal indicative of an occurrence of an unexpected condition to be provided, the processor-based control system may cause a presentation of a signal to be provided that is indicative of the occurrence of the unexpected condition and indicative of at least one of an incorrect location and a correct location for the specimen container in the at least one of the storage or the transfer cassettes.

Additionally, speed is typically important to commercial operation. To increase speed, antennas may be grouped into a plurality of sets, the sets which are operated in parallel with one another. For example, a two-dimensional array of antennas 96 antennas, arranged as a 8×12 array, may be grouped to four sets denominated A, B, C D, and corresponding to four quadrants of the two-dimensional array (e.g., sets A, B, C D arranged clockwise starting with A in an upper left quadrant). The position in each quadrant may be represented by a pair of integers representing a row and column. In operation, a first antenna 1,1 of a first set A, a first antenna 1,1 of a second set B, a first antenna 1,1 of a third set C, and a first antenna 1,1 of a fourth set D, may be operated to concurrently transmit respective interrogation signals (e.g., carrier waves) during a first interrogation cycle.

The other antennas of the first set A, second set B, third set C, and fourth set D may be monitored for response signals as part of the first interrogation cycle. Subsequently, a second antenna 1,2 of the first set A, a second antenna 1,2 of the second set B, the second antenna 1,2 of a third set C, and the second antenna 1,2 of the fourth set D, may be operated to concurrently transmit respective interrogation signals (e.g., carrier waves) during a second interrogation cycle. The other antennas of the first set A, second set B, third set C, and fourth set D may be monitored for response signals as part of the second interrogation cycle.

Subsequent interrogation cycles may cycle through the remaining antennas of the sets, operating one of the antennas from each set to transmit interrogations currently with one another. In some implementations, operation may result in there being a fixed distance between the transmitting antennas of any two sets. For instance, during any given interrogation cycle the transmitting antenna in one set may be in the same relative position within its own set as the relative position of the other transmitting antennas in the other sets. This is similar to the operation described above, where the row/column pair of the transmitting antenna of each set match one another during each interrogation cycle.

Alternatively, operation may result in there being a maximum achievable distance between the concurrently transmitting antennas during any given interrogation cycle. For instance, a first antenna 1,1 of a first set A, a sixth antenna 1,6 of a second set B, a nineteenth antenna 4,1 of a third set C, and a twenty-fourth antenna 4,6 of a fourth set D, may be operated to concurrently transmit respective interrogation signals (e.g., carrier waves) in a first interrogation cycle. Thus, during the first interrogation cycle antennas at the opposite four corners of the two-dimensional array concurrently transmit interrogation signals. During subsequent interrogation cycles, the antennas in each set A, B, C, D may be stepped through in an order that matches one another, for example transmitting interrogation signals from antennas successively along a row, then successively from a next row, etc.

While four sets are described, any number of sets of antennas may be employed. While two patterns of antenna activation are described, other patterns may be employed. Also, while generally described as employing all antennas to monitor for a response signal except the antenna that most recently emitted the interrogation signal, other approaches may be employed. For example, all antennas may be monitored, including the antenna that most recently emitted the interrogation signal. In such implementations, delay will typically be employed to allow resonance in the transmitting antenna to decay sufficiently as to allow detection of a response signal. Alternatively, only a select one or select ones of the antennas may be employed to monitor for response signals. For instance, in some implementation, only the antenna that most recently transmitted the interrogation signal is monitored for a receipt of a response signal, typically after a delay time.

Figure 48:
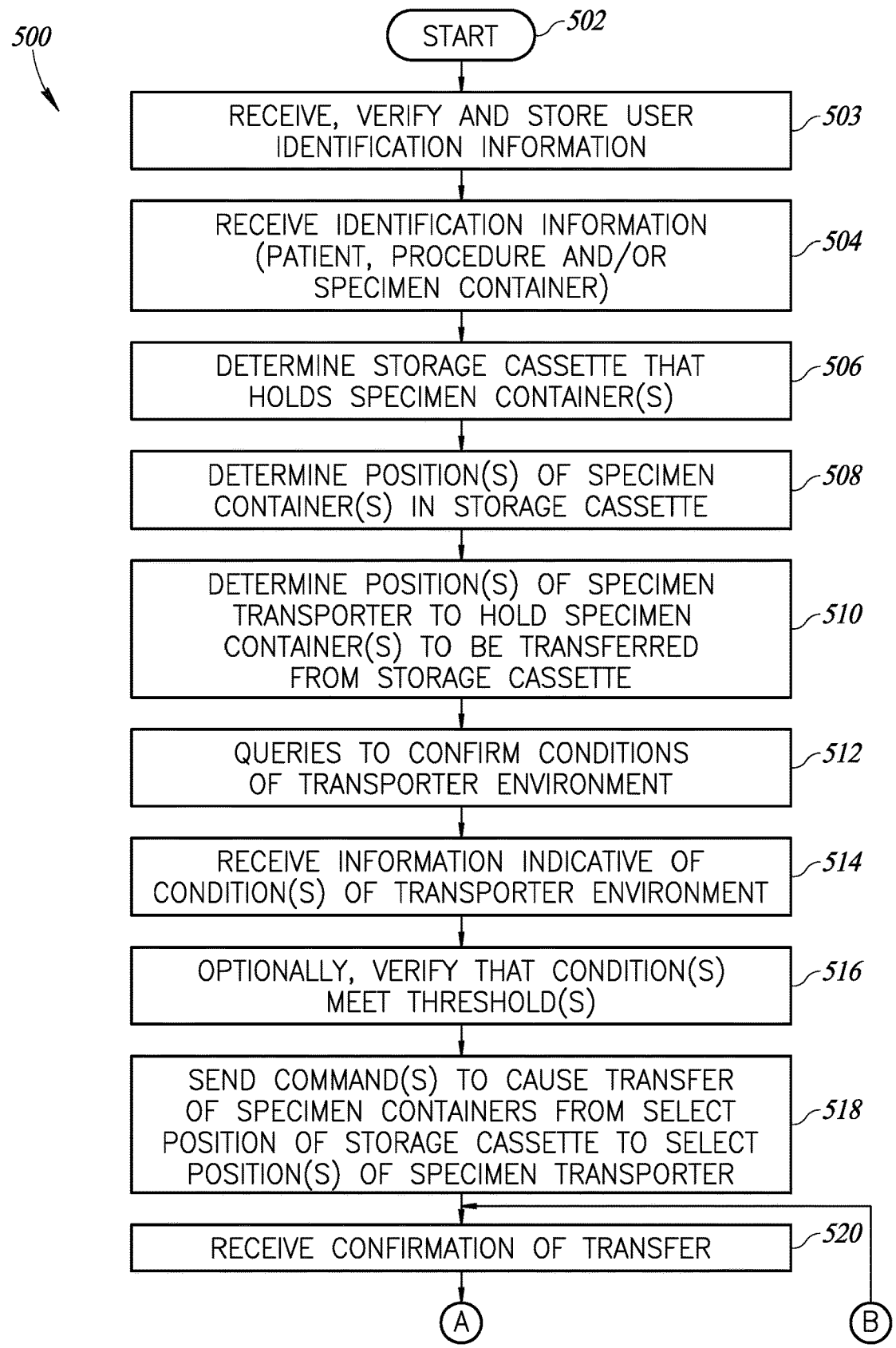
FIG. 48 is a first portion of a flow diagram showing a method of operation in a transfer system to transfer specimen containers that hold biological specimens from positions in a storage cassette, which can be stored in a cryogenic refrigerator, to positions in a portable thermally insulated carrier, according to at least one embodiment.
Figure 49:
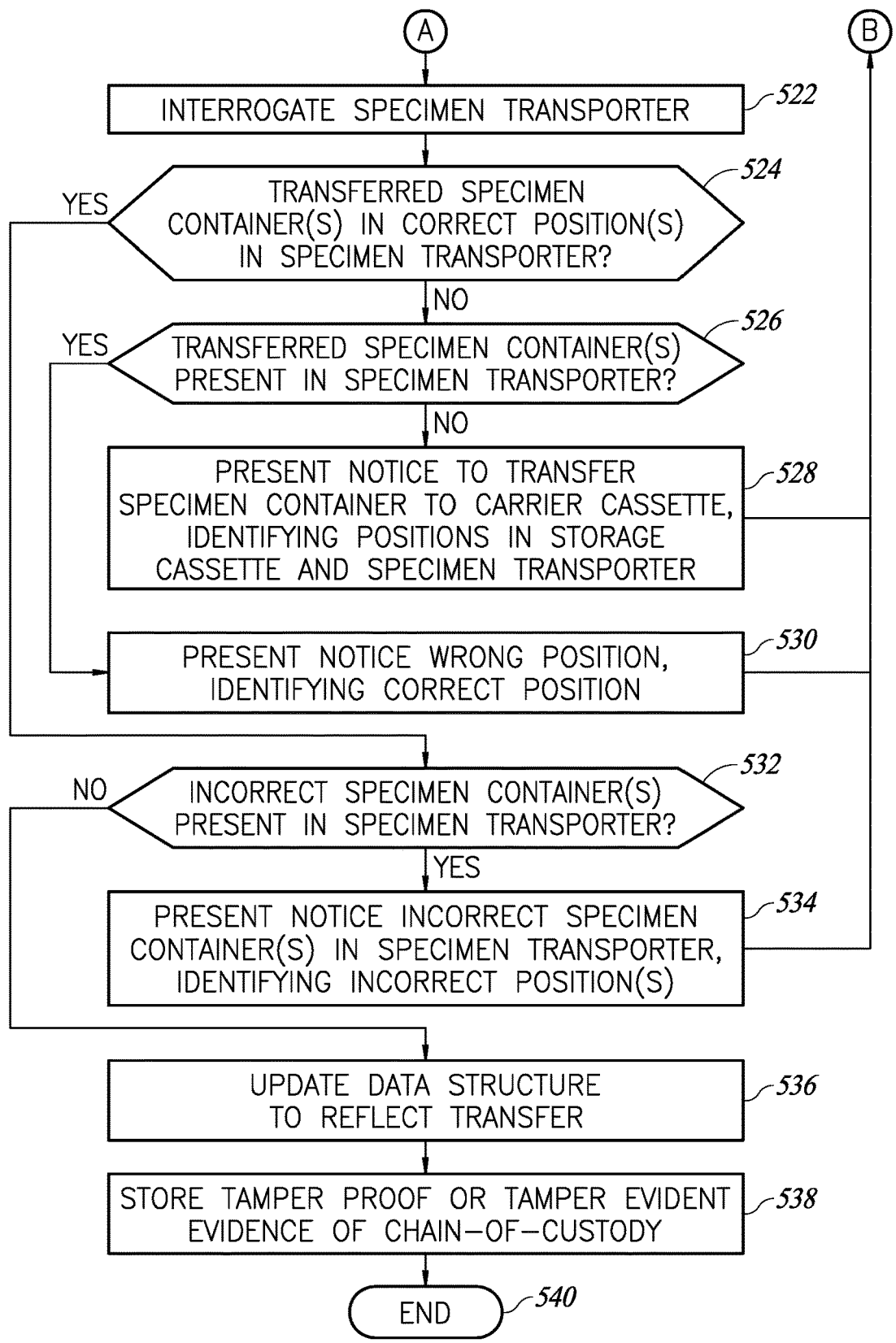
FIG. 49 is a second portion of the flow diagram illustrated in FIG. 48.

FIGS. 48 and 49 show a method 500 of operation to transfer specimen containers 200, 300 from the storage cassette 302, which can be stored in a cryogenic freezer 102, to the specimen transporter 380, for example a portable thermally insulated cryogenic carrier, according to at least one illustrated implementation. The method 500 may be performed when the storage cassette 302 and the specimen transporter 380 are each located in the at least one well 130 of the workstation.

The method 500 starts at 502. For example, the method may start in response to a powering on of the processor-based transfer system 122 or a component thereof, in response to detection of the storage cassette 302 and/or the specimen transporter 380 at a reader, receipt of a user input, or a call from a calling routine or program.

At 503, the processor-based transfer system 122 receives, verifies and stores user identification information. The user identification information may take a variety of forms, for example a user identifier, a password or passphrase, and/or biometric data (e.g., digital fingerprint, digital iris scan, facial features).

At 504, the processor-based transfer system 122 receives identification information. The identification information may, for example, be received as user input via a user interface, or as an electronic transfer of information from another system, for instance from a clinical procedure management processor-based system. The identification information may, for example, include a patient name, unique patient identifier, patient data of birth, procedure type or unique procedure identifier, specimen container identifier, and/or specimen identifier.

At 506, the processor-based transfer system 122 determines which of the storage cassettes 302 that holds the one or more specimen containers 200, 250, 300, 1100 to be retrieved. For example, one or more of the specimen containers 200, 250, 300, 1100 may hold biological specimens or tissue to be used in a given procedure on a given patient. The processor-based transfer system may, for example, query a data structure using the identification information.

At 508, the processor-based transfer system 122 determines one or more positions of the identified specimen containers 200, 250, 300, 1100 in the storage cassette 302. The processor-based transfer system may, for example, query a data structure using the identification information.

At 510, the processor-based transfer system 122 determines position(s) of the specimen transporter 380 to hold specimen container(s) 200, 250, 300, 1100 transferred from the storage cassette 302. The processor-based transfer system may, for example, query a data structure using the identification information.

At 512, the processor-based transfer system 122 causes a presentation of queries to confirm conditions of carrier environment. Queries may be presented visually or aurally via a user interface. Queries may include a request that the user confirm that the specimen transporter 380 is ready, that there is adequate fluid (e.g., liquid nitrogen) in the specimen transporter 380, and that the fluid is adequately cold (e.g., at or below approximate 190° C.).

At 514, the processor-based transfer system 122 receives information indicative of condition(s) of an environment of the specimen transporter 380. The information may, for example, be received via a user interface.

Optionally at 516, the processor-based transfer system 122 verifies that one or more conditions meet one or more thresholds. For example, a user may enter a fluid level and/or a temperature of the fluid, which can be compared to a threshold level and/or threshold temperature.

At 518, the processor-based transfer system 122 sends one or more commands to cause transfer of the specimen containers 200, 250, 300, 1100 from select position of the storage cassette 302 to select position(s) of the specimen transporter 380. In the case of manual transfers, the commands may be presented to a user as prompts via the user interface. In the case of automated transfers, the commands can be in the form of a motion plan for execution by a robot or other mechanical conveyance.

At 520, the processor-based transfer system 122 receives a confirmation of transfer. Confirmation may be received from a user via a user interface. Alternatively, confirmation may come from a processor-based system, for example a robot, indicating that a series of operations have been completed.

At 522, the processor-based transfer system 122 interrogates the specimen transporter 380. For example, a reader may sequentially interrogate each position in the specimen transporter 380, determining which positions have a wireless transponder tagged specimen container, and even the identity of each specimen container at each position that has a specimen container. Such may, for example, be implemented via an RFID reader or interrogator, with a two-dimensional array of antennas which are arranged to be in registration with respective positions of the specimen transporter 380.

At 524, the processor-based transfer system 122 determines whether the transferred specimen container(s) are in correct the position(s) in the specimen transporter 380. The processor-based transfer system 122 can query a data structure to determine, for each position of the specimen transporter 380 that is supposed to have a specimen container, the identity of the specimen container that is supposed to be at that position. The processor-based transfer system 122 compares the actual mapping, as determined via interrogation, with the intended mapping, to verify that each specimen container is in the correct position, to identify specimen containers in incorrect positions, to identify missing specimen containers and/or specimen containers that should not be in the specimen transporter 380, as described below.

If it is determined at 524 that the transferred specimen container(s) are not in correct position(s) in the specimen transporter 380, then the processor-based transfer system 122 attempts to determine what specific errors have occurred. For example, at 526 the processor-based transfer system 122 determines whether the transferred specimen container(s) are present in the specimen transporter 380. If it is determined at 526 that the transferred specimen container(s) are not present in the specimen transporter 380, then at 528 the processor-based transfer system 122 causes a user interface to present a prompt to transfer the specimen container from the storage cassette 302 to the specimen transporter 380, identifying the specific positions in the storage cassette 302 and the specimen transporter 380, and control returns to 520 to await receipt of a confirmation that the transfer has been completed.

Alternatively, the processor-based transfer system 122 provides instructions to a robot to implement the transfer of the specimen container(s) 200, 250, 300, 1100. If it is determined at 526 that the transferred specimen container(s) is (are) present in the specimen transporter 380, then at 530 the processor-based system 122 causes the user interface to present a notification or prompt to move the specimen container(s) to the correct position(s) in the specimen transporter 380, including an identification of the position from which the specimen container should be moved from and the position to which the specimen container should be moved. Control then returns to await receipt of a confirmation that the transfer has been completed at 520.

If it is determined at 524 that the transferred specimen container(s) are in correct position(s) in the specimen transporter 380, then optionally at 532 the processor-based transfer system 122 determines whether there are any incorrect specimen container(s) present in the specimen transporter 380. If it is determined at 532 that there are incorrect specimen container(s) present in the specimen transporter 380, then at 534 the processor-based transfer system 122 causes the user interface to present a notification that there are incorrect specimen container(s) in the specimen transporter 380, identifying incorrect position(s). Control then returns to await receipt of a confirmation that the transfer has been completed at 520. If it is determined at 532 that there are not incorrect specimen container(s) present in the specimen transporter 380, then control passes to 536.

At 536, the processor-based transfer system 122 updates a data structure to reflect transfer. The data structure can, for example take the form of a database, table, tree structure or linked list.

At 538, the processor-based transfer system 122 stores evidence of chain-of-custody, preferably in a tamper proof or tamper evident form. The evidence of chain-of-title may, for example be stored in a block-chain form.

The method 500 terminates at 540, for example until invoked again.

Figure 50:
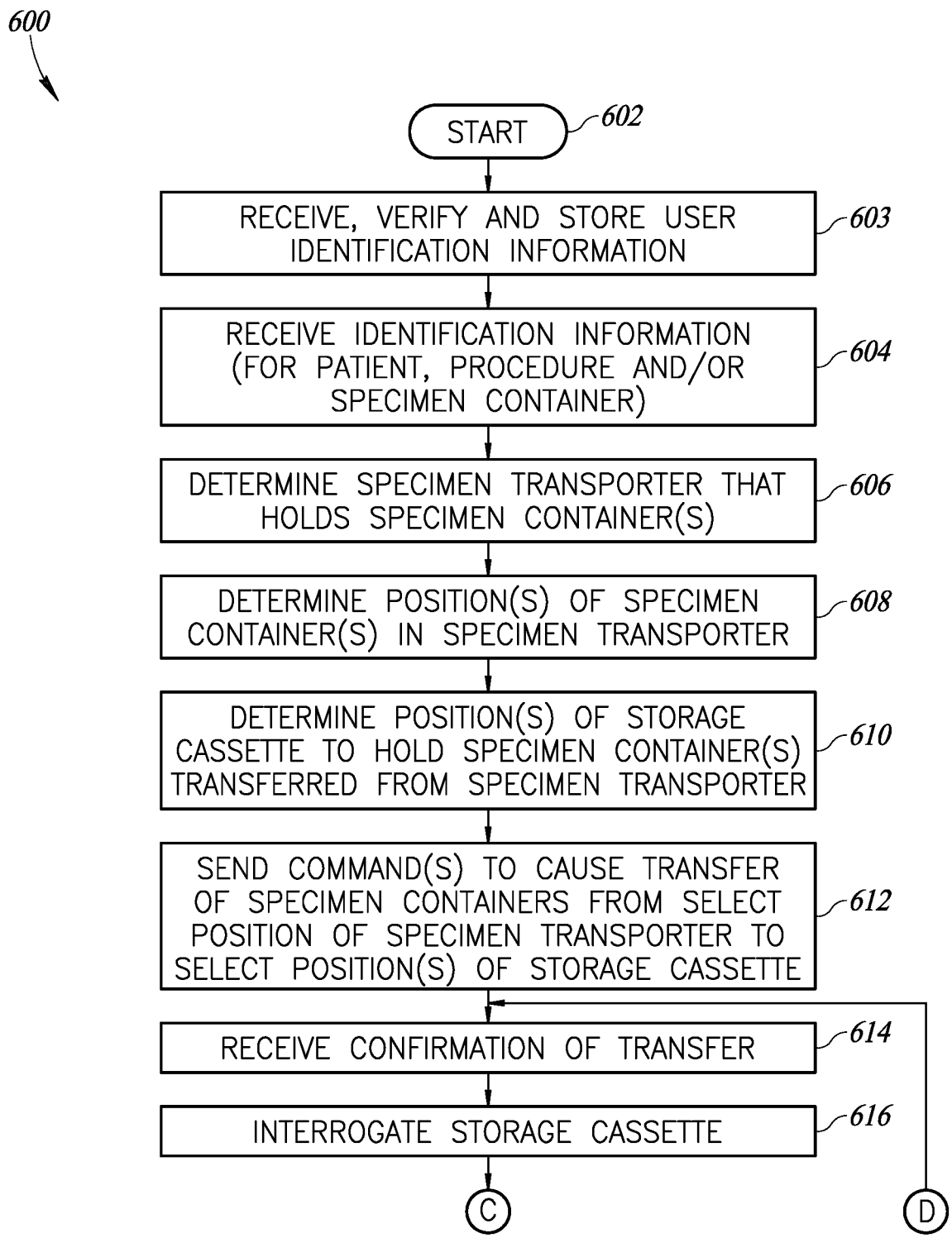
FIG. 50 is a first portion of a flow diagram showing a method of operation in a transfer system to transfer specimen containers that hold biological specimens from positions in a portable thermally insulated carrier, to positions in a storage cassette, which can be stored in a cryogenic refrigerator, according to at least one embodiment.
Figure 51:
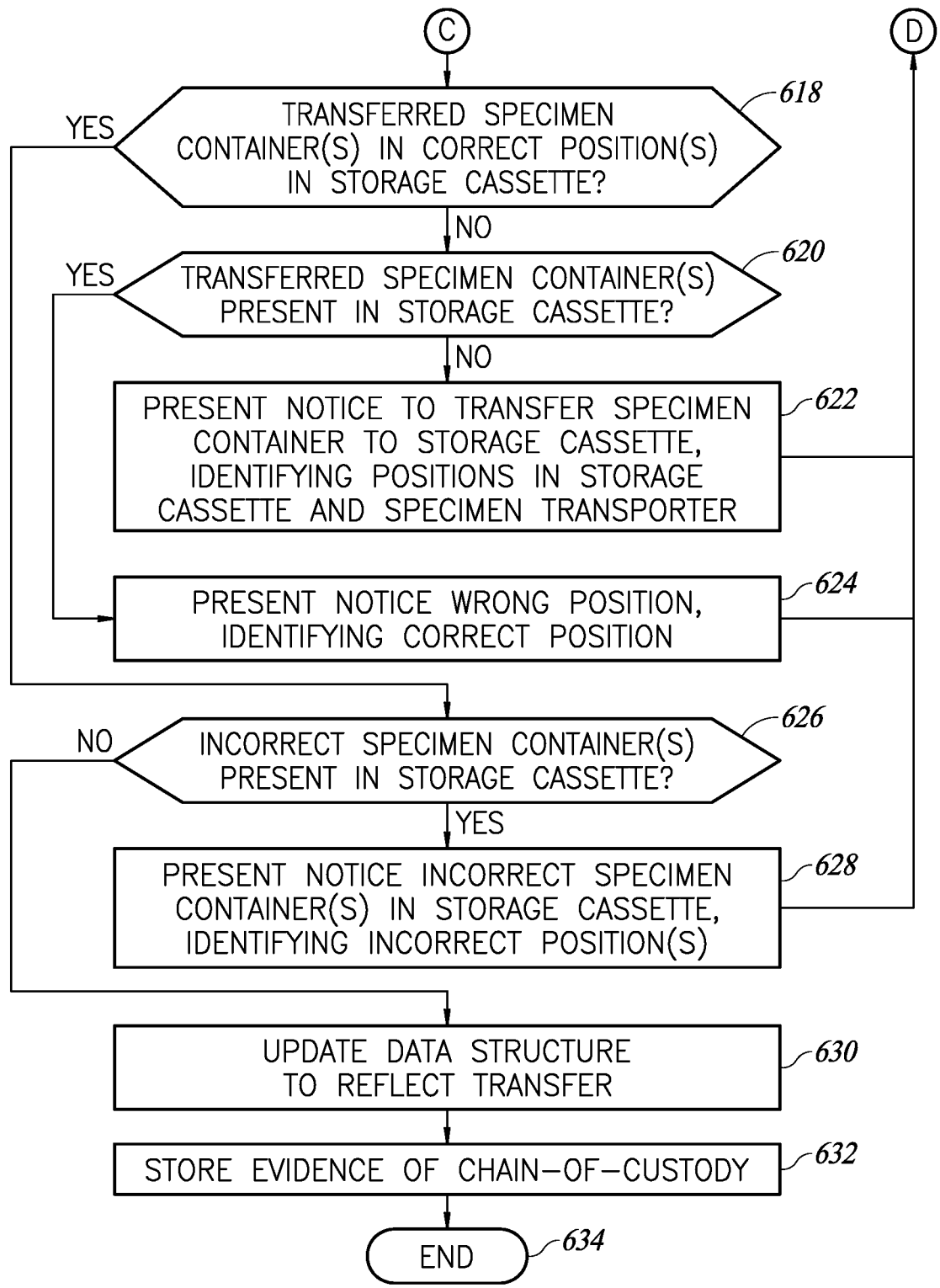
FIG. 51 is a second portion of the flow diagram illustrated in FIG. 50.

FIGS. 50 and 51 show a method 600 of operation to transfer specimen containers 200, 250, 300, 1100 from the specimen transporter 380, for example a portable thermally insulated cryogenic carrier, to the storage cassette 302 for storage in a cryogenic freezer 102, according to at least one illustrated implementation. The method 500 may be performed when the storage cassette 302 and the specimen transporter 380 are each located in the at least one well 130 of the workstation.

The method 600 starts at 602. For example, the method may start in response to a powering on of the processor-based transfer system 122 or a component thereof, in response to detection of the storage cassette 302 and/or the specimen transporter 380 at a reader, receipt of a user input, or a call from a calling routine or program.

At 603, the processor-based transfer system 122 receives, verifies and stores user identification information. The user identification information may take a variety of forms, for example a user identifier, a password or passphrase, and/or biometric data (e.g., digital fingerprint, digital iris scan, facial features).

At 604, the processor-based transfer system 122 receives identification information. The identification information may, for example, be received as user input via a user interface, or as an electronic transfer of information from another system, for instance from a clinical procedure management processor-based system. The identification information may, for example, include a patient name, unique patient identifier, patient data of birth, procedure type or unique procedure identifier, specimen container identifier, and/or specimen identifier.

At 606, the processor-based transfer system 122 determines which specimen transporter 380 holds the one or more specimen containers 200, 250, 300, 1100 to be stored in the cryogenic storage tank or freezer 102. For example, one or more specimen containers may hold biological specimens or tissue collected from a given procedure on a given patient. The processor-based transfer system 122 may, for example, query a data structure using the identification information.

At 608, the processor-based transfer system 122 determines one or more positions of the identified specimen containers in the specimen transporter 380. The processor-based transfer system 122 may, for example, query a data structure using the identification information.

At 610, the processor-based transfer system 122 determines position(s) of storage cassette to hold specimen container(s) transferred from the specimen transporter 380. The processor-based transfer system 122 may, for example, query a data structure using the identification information.

At 612, the processor-based transfer system 122 sends one or more commands to cause transfer of specimen containers from select position of the specimen transporter 380 to select position(s) of the storage cassette 302. In the case of manual transfers, the commands may be presented to a user as prompts via the user interface. In the case of automated transfers, the commands can be in the form of a motion plan for execution by a robot or other mechanical conveyance.

At 614, the processor-based transfer system 122 receives a confirmation of transfer. Confirmation may be received from a user via a user interface. Alternatively, confirmation may come from a processor-based system, for example a robot, indicating that a series of operations have been completed.

Optionally at 616, the processor-based transfer system 122 interrogates the storage cassette 302. For example, a reader may sequentially interrogate each position in the storage cassette 302, determining which positions have a wireless transponder tagged specimen container, and even the identity of each specimen container at each position that has a specimen container. Such may, for example, be implemented via an RFID reader or interrogator, with a two-dimensional array of antennas which are arranged to be in registration with respective positions of the storage cassette 302.

Optionally at 618, the processor-based transfer system 122 determines whether the transferred specimen container(s) are in correct the position(s) in the storage cassette 302. The processor-based transfer system 122 can query a data structure to determine, for each position of the storage cassette 302 that is supposed to have a specimen container, the identity of the specimen container that is supposed to be at that position. The processor-based transfer system 122 compares the actual mapping, as determined via interrogation, with the intended mapping, to verify that each specimen container is in the correct position, to identify specimen containers in incorrect positions, to identify missing specimen containers and/or specimen containers that should not be in the storage cassette 302, as described below.

If it is determined at 618 that the transferred specimen container(s) are not in correct position(s) in storage cassette 302, then at 620 the processor-based transfer system 122 determines whether the transferred specimen container(s) are present in storage cassette 302. If it is determined at 620 that the transferred specimen container(s) are not present in storage cassette 302, then at 622 the processor-based transfer system 122 causes a user interface to present a prompt to transfer the specimen container from the specimen transporter 380 to the storage cassette 302, identifying the specific positions in the specimen transporter 380 and the storage cassettes 302. Alternatively, the processor-based transfer system 122 provides instructions to a robot to implement the transfer of the specimen container(s). Control then returns to await receipt of a confirmation that the transfer has been completed at 614. If it is determined at 620 that the transferred specimen container(s) is (are) present in the storage cassette 302, then at 624 the processor-based system 122 causes the user interface to present a notification or prompt to move the specimen container(s) to the correct position(s) in the storage cassette 302, including an identification of the position from which the specimen container should be moved from and the position to which the specimen container should be moved. Control then returns to await receipt of a confirmation that the transfer has been completed at 614.

If it is determined at 618 that the transferred specimen container(s) are in correct position(s) in the storage cassette 302, then optionally at 626 the processor-based transfer system 122 determines whether there are incorrect specimen container(s) present in the storage cassette 302. If it is determined at 620 that there are incorrect specimen container(s) present in the storage cassette 302, then at 628 the processor-based transfer system 122 causes the user interface to present a notification that there are incorrect specimen container(s) in the storage cassette 302, identifying incorrect position(s). Control then returns to await receipt of a confirmation that the transfer has been completed at 614. If it is determined at 620 that there are not incorrect specimen container(s) present in the storage cassette 302, then control passes to 630.

At 630, the processor-based transfer system 122 updates a data structure to reflect transfer. The data structure can, for example take the form of a database, table, tree structure or linked list.

At 632, the processor-based transfer system 122 stores evidence of chain-of-custody, preferably in a tamper proof or tamper evident form. The evidence of chain-of-title may, for example be stored in a block-chain form.

The method 600 terminates at 634, for example until invoked again.

The various implementations and embodiments described above can be combined to provide further implementations and embodiments. All of the commonly assigned US patent application publications, US patent applications, foreign patents, and foreign patent applications referred to in this specification and/or listed in the Application Data Sheet, including but not limited U.S. patent application 62/900,281, filed Sep. 13, 2019; U.S. patent application 62/880,786, filed Jul. 31, 2019; U.S. patent application 62/879,160, filed Jul. 26, 2019; U.S. patent application 62/741,986, filed Oct. 5, 2018; U.S. patent application 62/741,998, filed Oct. 5, 2018; and U.S. patent application 62/927,566, filed Oct. 29, 2019, are each incorporated herein by reference, in their entirety. These and other changes can be made to the embodiments in light of the above-detailed description.

In general, in the following claims, the terms used should not be construed to limit the claims to the specific implementations and embodiments disclosed in the specification and the claims, but should be construed to include all possible implementations and embodiments along with the full scope of equivalents to which such claims are entitled. Accordingly, the claims are not limited by the disclosure.

The invention claimed is:

1. A system for handling cryogenic frozen specimens, the system comprising:
a workstation comprising:
a platform having a front, a back, a work surface and at least one well, the at least one well recessed in the work surface and having a bottom and at least one sidewall that extends upwardly from the bottom of the at least one well;
at least a first bucket removably receivable by the at least one well of the platform, the first bucket having a bottom, a top, at least one sidewall extending from the bottom of the first bucket to the top of the first bucket with an opening at the top of the first bucket, the opening at the top of the first bucket sized to receive a least partially therein at least one of a cassette or a carrier that holds an array of specimen containers therein; and
at least one array of antennas positioned beneath the bottom of the at least one well and spaced to be within a defined perpendicular distance of a distal end of the specimen containers when the cassette or the carrier that holds the specimen containers is positioned in the first bucket.

2. The system of claim 1 wherein the work surface includes a planar portion.

3. The system of claim 2 wherein the work surface includes a peripheral wall that extends upwardly from the planar portion about at least a portion of a periphery of the work surface.

4. The system of claim 3 wherein a portion of the peripheral wall at the back of the platform has an angled face the slopes downward from the back of the platform towards the front of the platform.

5. The system of claim 1 wherein the work surface defines a first opening and a second opening therethrough, the second opening of the work surface distinct from the first opening of the work surface, the first opening of the work surface sized to removably receive the first bucket therein and the second opening of the work surface sized to removably receive a second bucket therein.

6. The system of claim 5 wherein the first bucket sits in the first opening with a top of the first bucket flush with the work surface when the first bucket is received in the first well via the first opening of the work surface, and the second opening of the work surface sized to removably receive a second bucket therein, and the second bucket sits in the second opening with a top of the second bucket flush with the work surface when the second bucket is received in the first well via the second opening of the work surface.

7. The system of claim 6 wherein the work surface includes a planar portion and a peripheral wall that extends upwardly from the planar portion about at least a portion of a periphery of the work surface, the peripheral wall having a first opening and a second opening each positioned at a front of the platform, each of the first and second openings of the peripheral wall sized to accommodate a handle of a respective one of the first and the second buckets when the first and the second buckets are received in the first well via the first and the second openings of the work surface with the respective handles each pivoted to an un-deployed position.

8. The system of claim 5 wherein the work surface includes a fixed planar portion and a frame, the frame selectively removable from the fixed planar portion to expose an interior of the at least one well.

9. The system of claim 8 wherein the first opening of the work surface and the second opening of the work surface are each formed in the frame.

10. The system of claim 5 wherein the first opening of the work surface is sized to closely receive an outer perimeter of the first bucket and the second opening of the work surface is sized to closely receive an outer perimeter of the second bucket.

11. The system of claim 1 wherein the first bucket has a spout.

12. The system of claim 11 wherein the first bucket has a handle pivotally coupled to the least one sidewall to pivot between a deployed position and an un-deployed position.

13. The system of claim 12 wherein the first bucket has at least one stop that limits rotation of the handle at the deployed position.

14. The system of claim 1, further comprising:
the cassette or the carrier, wherein the cassette or the carrier is sized to hold a two-dimensional array of specimen containers.

15. The system of claim 14 wherein the cassette or the carrier comprises:
a first bulk container having a top, a bottom, and at least one side wall, the bottom having an inner facing surface and an outer facing surface, the at least one side wall having an inner facing surface and an outer facing surface, the inner facing surface of the bottom and the inner facing surface of the at least one side wall delineating an interior compartment of the first bulk container having an interior compartment profile, the first bulk container having an opening at the top thereof;
a first thermal shunt, the first thermal shunt comprising a substrate comprising a metal and having a first major face and a second major face, the second major face opposed from the first major face across a thickness of the substrate, the substrate having an array of a plurality of through holes that extend through the thickness of the substrate, each of the through holes of the substrate shaped and sized to receive at least a portion of a respective vial of a first number of vials therethrough, the substrate closely receivable in the interior compartment of the first bulk container; and
a first spacer closely receivable in the interior compartment of the first bulk container, the first spacer having an array of a plurality of through holes that extend therethrough, each of the through holes of the first spacer shaped and sized to receive at least a portion of a respective vial of the first number of vials therethrough, and
wherein, when the first spacer and the first thermal shunt are stacked in the interior compartment of the first bulk container, each of the through holes of the first spacer is axially aligned with a respective one of the through holes of the first thermal shunt.

16. The system of claim 15 wherein the first bulk container has a number of set offs that extend upwardly from the bottom in an interior of the first bulk container and the first thermal shunt are supported by the set offs to set the first thermal shunt off from the bottom of the first bulk container.

17. The system of claim 15 wherein the substrate of the thermal shunt is a heat sink in the form of a block of non-ferrous metal.

18. The system of claim 15 wherein the substrate of the thermal shunt is a heat sink in the form of a block of aluminum.

19. The system of claim 15 wherein the substrate of the thermal shunt is a heat sink in the form of a block of non-ferrous metal impregnated polymer.

20. The system of claim 15 wherein the through holes of the spacer and the thermal shunt are each circular.

21. The system of claim 15 wherein the through holes of the spacer and the thermal shunt are square with rounded corners.

22. The system of claim 15 wherein the first bulk container is part of the cassette and the first bulk container includes at least a first aperture in a first side and at least a second aperture in a second side, the second side opposed to the first side across a lateral dimension of the first bulk container.

23. The system of claim 15 wherein the first bulk container is part of the cassette, and the cassette further comprises:
a handle that is removably coupleable to the first bulk container.

24. The system of claim 15 wherein the first bulk container is part of the carrier, and the carrier further comprises:
a cover coupleable to the first bulk container to seal the opening in the top of the first bulk container while the spacer and the thermal shunt are stacked in the interior compartment of the first bulk container.

25. The system of claim 15 wherein the first bulk container is part of the carrier, and the carrier further comprises:
a handle that is pivotally coupled to the first bulk container.

26. The system of claim 15 wherein the at least one side wall of the first bulk container is a thermally insulated side wall.

27. The system of claim 15 wherein a combination of any of a thickness of the bottom of the first bulk container, the thermal shunt, any support features, and the spacer positions the vials longitudinally to space a bottom of the vials within a defined distance of an exterior surface of the bottom.

28. The system of claim 15 wherein a combination of any of a thickness of the bottom of the first bulk container, the thermal shunt, any support features, and the spacer positions the vials longitudinally to space a bottom of the vials within a distance of less than 20 mm or more preferably less than 15 mm of an exterior surface of the bottom.

29. The system of claim 15 wherein a combination of any of a thickness of the bottom of the first bulk container, the thermal shunt, any support features, and the spacer positions the vials longitudinally to space a bottom of the vials within the defined perpendicular distance of the antenna array.

30. The system of claim 15 wherein a combination of any of a thickness of the bottom of the first bulk container, the thermal shunt, any support features, and the spacer positions the vials longitudinally to space a bottom of the vials within a distance of less than 20 mm or more preferably less than 15 mm of the antenna array.

31. The system of claim 15 wherein a combination of any of: the at least one well, the first bucket, and the cassette or the carrier positions the specimen containers to longitudinally to space a bottom of the specimen containers within the defined perpendicular distance of the antenna array.

32. The system of claim 15 wherein a combination of any of: the at least one well, the first bucket, and the cassette or the carrier positions the specimen containers to longitudinally space a bottom of the specimen containers within the defined perpendicular distance of less than 20 mm or more preferably less than 15 mm of the antenna array.

33. The system of claim 1, further comprising:
a cryogenic storage dewar having an interior and an opening via which specimen containers are transferred into and out of the interior of the cryogenic storage dewar, wherein a portion of the platform is located immediately adjacent the cryogenic storage dewar.

34. The system of claim 33, further comprising:
an elevator positioned and operable to place cassettes into the interior of the dewar and to retrieve cassettes from the interior of the dewar, the elevator including at least one port, wherein a rear portion of the platform is located immediately adjacent the at least one port of the elevator with no open gap therebetween.

35. The system of claim 34 wherein the at least one well of the platform is spaced from the at least one port of the elevator along a first axis that extends perpendicularly from the at least one port and laterally with respect thereto along a second axis that is orthogonal to the first axis.

36. The system of claim 33 wherein the workstation and the cryogenic storage dewar include corresponding fasteners that releasably secure the workstation and the cryogenic storage dewar.

37. The system of claim 36, wherein the corresponding fasteners include a first bracket of the workstation, a second bracket of the cryogenic storage dewar and a connection pin receivable within both the first bracket and the second bracket to releasably secure the workstation and the cryogenic storage dewar.

* * * * *